US007681183B2

(12) United States Patent
Yamamoto

(10) Patent No.: US 7,681,183 B2
(45) Date of Patent: Mar. 16, 2010

(54) METHOD, SYSTEM, AND PROGRAM PRODUCT FOR CHECKING CONTROL MODEL AND/OR CONTROL PROGRAM

(75) Inventor: Hirotaka Yamamoto, Okazaki (JP)

(73) Assignee: DENSO Corporation, Kariya (JP)

( * ) Notice: Subject to any disclaimer, the term of this patent is extended or adjusted under 35 U.S.C. 154(b) by 1485 days.

(21) Appl. No.: 11/015,676

(22) Filed: Dec. 20, 2004

(65) Prior Publication Data

US 2005/0138605 A1 Jun. 23, 2005

(30) Foreign Application Priority Data

Dec. 19, 2003 (JP) ............................. 2003-423584
Oct. 15, 2004 (JP) ............................. 2004-302268

(51) Int. Cl.
G06F 9/44 (2006.01)

(52) U.S. Cl. ........................ 717/135; 717/106; 717/134

(58) Field of Classification Search ................. 717/124, 717/129, 134–135
See application file for complete search history.

(56) References Cited

U.S. PATENT DOCUMENTS

| 6,571,204 | B1 * | 5/2003 | Meyer ........................ 703/22 |
| 6,587,995 | B1 * | 7/2003 | Duboc et al. ................... 716/4 |
| 6,610,968 | B1 * | 8/2003 | Shajii et al. .................. 219/497 |
| 6,708,329 | B1 * | 3/2004 | Whitehill et al. ............ 717/136 |
| 6,859,892 | B2 * | 2/2005 | Bolding et al. ................ 714/34 |
| 6,996,811 | B2 * | 2/2006 | Nishioka et al. ............ 717/135 |
| 7,490,596 | B2 * | 2/2009 | Yasui et al. .................. 123/697 |
| 2002/0087343 | A1 * | 7/2002 | Reid ............................. 705/1 |
| 2004/0148151 | A1 * | 7/2004 | Menter et al. ................. 703/22 |

FOREIGN PATENT DOCUMENTS

| EP | 1111483 A1 | 6/2001 |
| JP | 2000-20291 | 1/2000 |
| JP | 2003-15910 | 1/2003 |

* cited by examiner

Primary Examiner—Wei Y Zhen
Assistant Examiner—Phillip H Nguyen
(74) Attorney, Agent, or Firm—Nixon & Vanderhye P.C.

(57) ABSTRACT

A check system aims at checking at least one of a control model in which requested specifications for controlling a target are described and a control program generated based on the control model. The system has a first establishing unit configured to establish a first monitor section at a first location in the one of the control model and the control program. The system has a first identifying unit configured to automatically identify a second location in the other of the control model and the control program to establish a second monitor section at the second location in the other thereof. The second location corresponds to the first location of the first monitor section in the one of the control model and the control program.

44 Claims, 22 Drawing Sheets

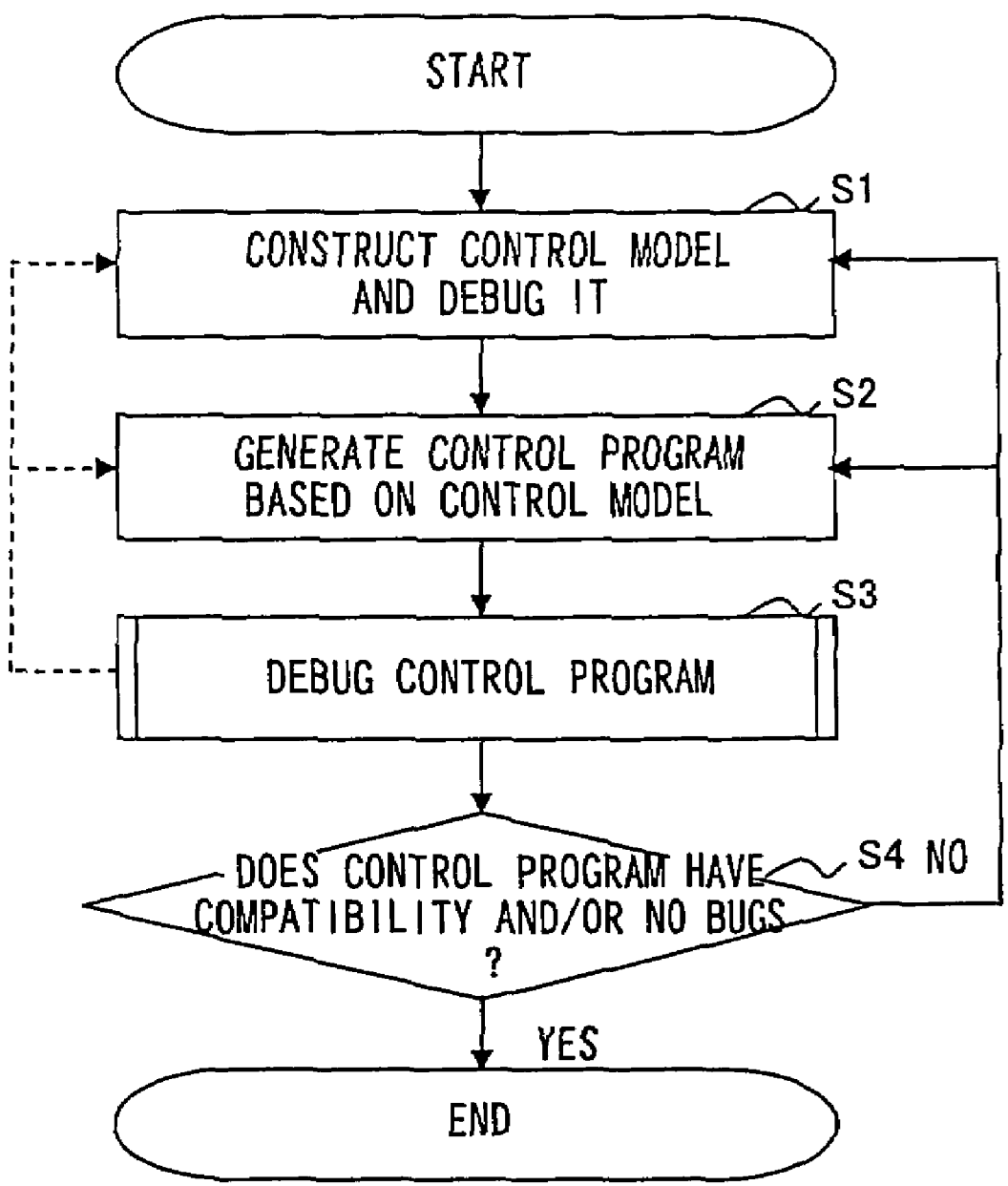

FIG. 4

L1:
  //DETERMINE BASIC INJECTION VOLUME (B2)
  v1←⋯;
L2:WRITE (m1, v1) ; //WRITE BASIC INJECTION VOLUME (B3)

L3:
  //DETERMINE CORRECTION AMOUNT (B6)
  v2←⋯;
L4: v3←READ(m1) ; //READ OUT BASIC INJECTION VOLUME (B5)

L5:
//DETERMINE START AND END OF INJECTION (B7)
      v4←⋯(v2, v3) ;
      v5←⋯(v2, v3) ;

| EXECUTION ADDRESS CORRESPONDENCE INFORMATION (CI1) | | VARIABLE CORRESPONDENCE INFORMATION (CI2) | |
|---|---|---|---|
| BLOCK | LABEL | BLOCK VARIABLE | PROGRAM VARIABLE |
| DETERMINATION OF BASIC INJECTION VOLUME (B2) | L1 | BASIC INJECTION VOLUME | v1 |
| WRITING OF BASIC INJECTION VOLUME (B3) | L2 | BASIC INJECTION VOLUME | v1 |
| | | STORED VALUE OF BASIC INJECTION VOLUME | m1 |
| DETERMINATION OF CORRECTION AMOUNT (B6) | L3 | CORRECTION AMOUNT | v2 |
| READOUT OF BASIC INJECTION VOLUME (B5) | L4 | BASIC INJECTION VOLUME | v3 |
| | | STORED VALUE OF BASIC INJECTION VOLUME | m1 |
| DETERMINATION OF START AND END OF INJECTION (B7) | L5 | CORRECTION AMOUNT | v2 |
| | | BASIC INJECTION VOLUME | v3 |
| | | START OF INJECTION | v4 |
| | | END OF INJECTION | v5 |

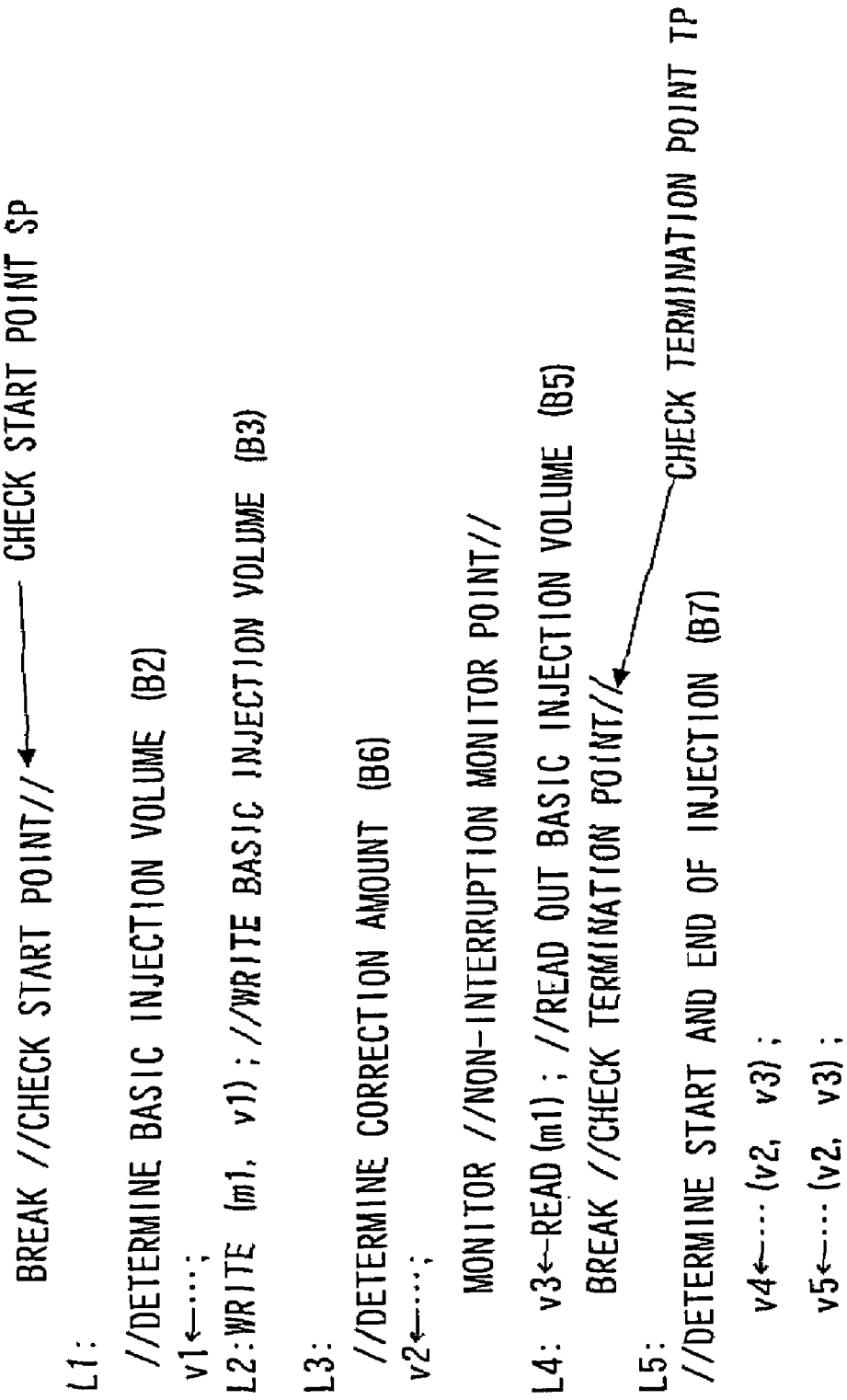

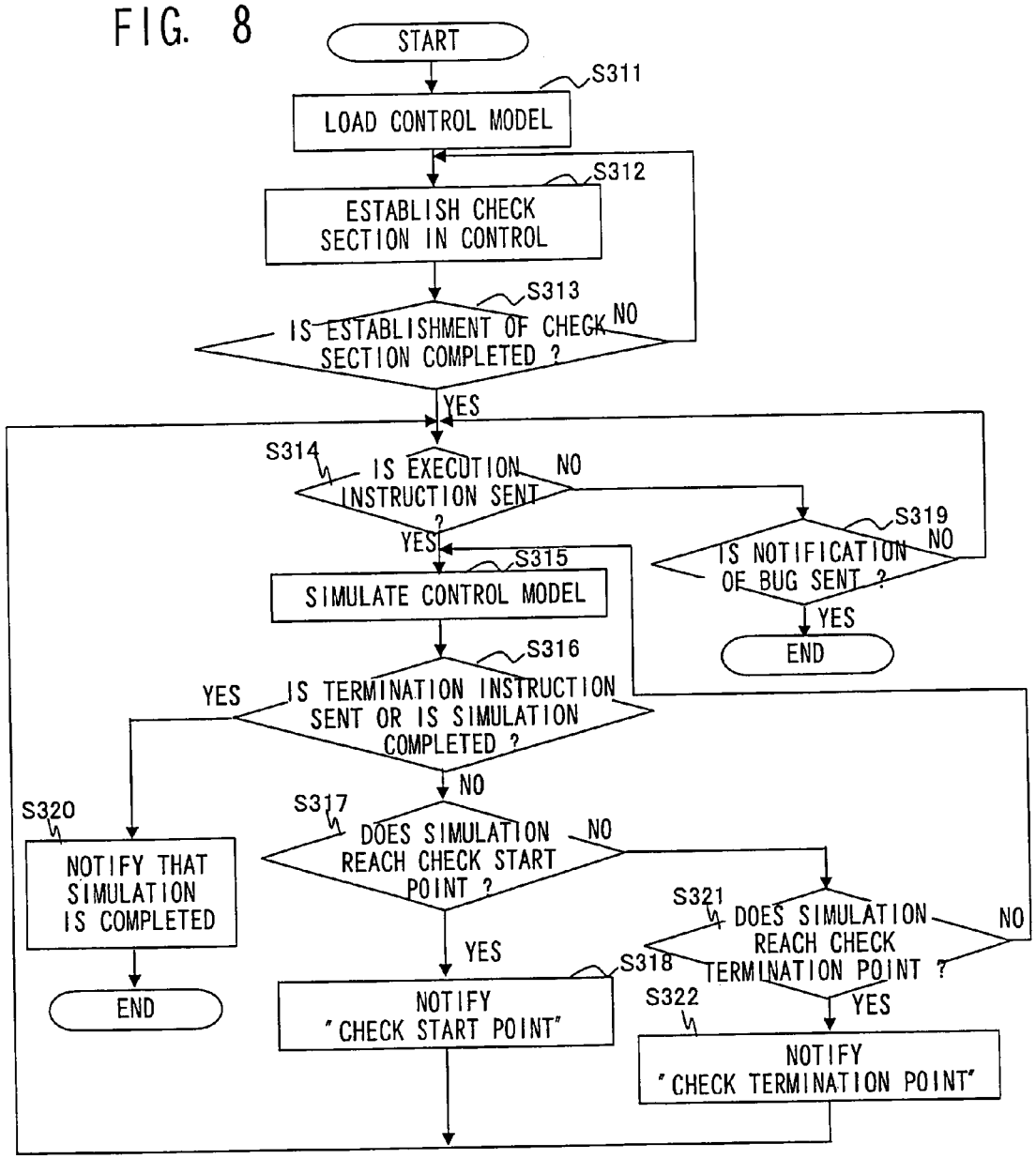

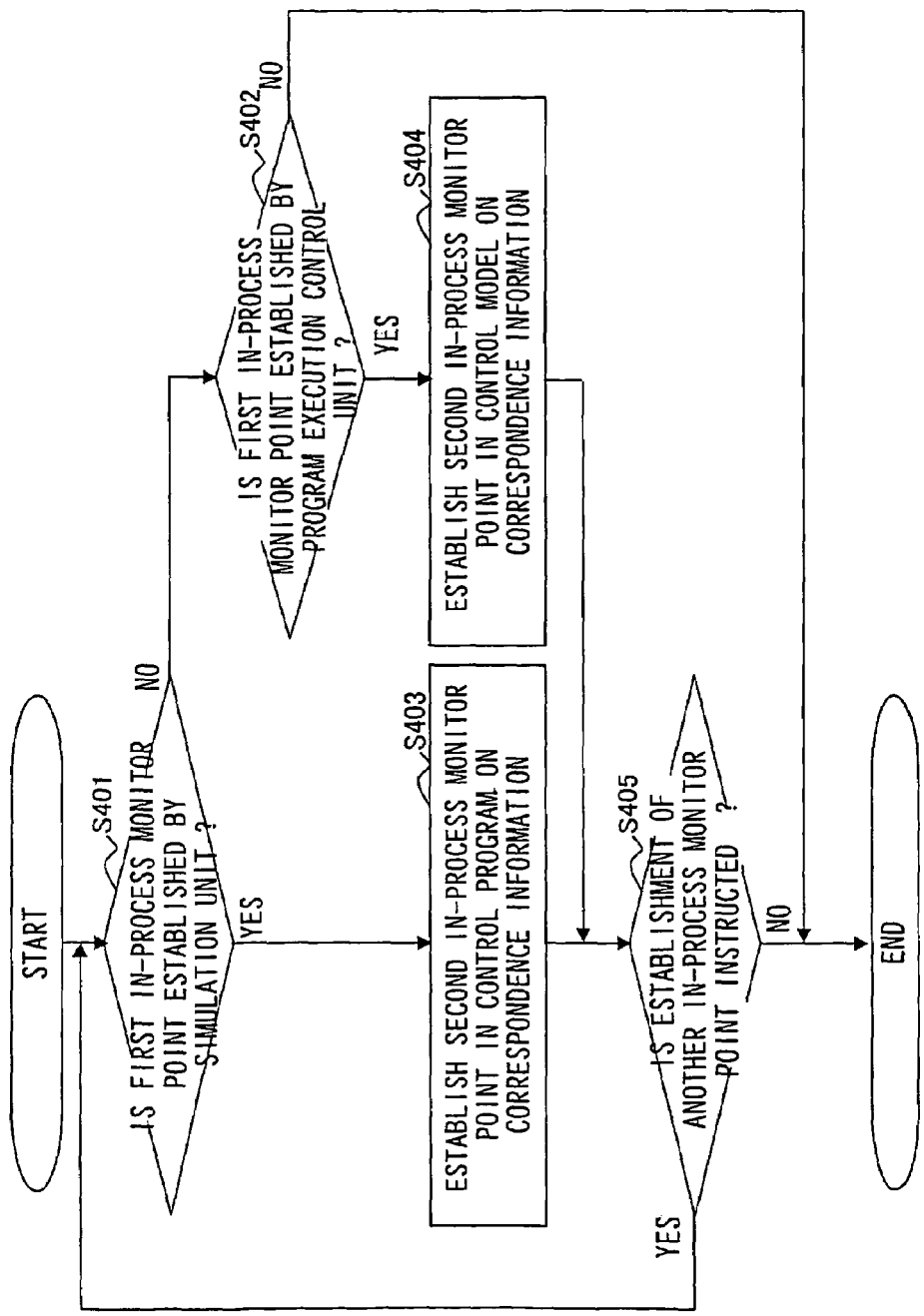

FIG. 12A

BREAK //CHECK START POINT// ◄──── CHECK START POINT SP

L1:
　//DETERMINE BASIC INJECTION VOLUME (B2)
　v1←...;
L2:WRITE (m1, v1); //WRITE BASIC INJECTION VOLUME (B3)

L3:
　//DETERMINE CORRECTION AMOUNT (B6)
　v2←...;
　　　MONITOR //IN-PROCESS MONITOR POINT// ◄──── IN-PROCESS MONITOR POINT MP
L4: v3←READ(m1); //READ OUT BASIC INJECTION VOLUME (B5)
　　　BREAK //CHECK TERMINATION POINT//
L5:
//DETERMINE START AND END OF INJECTION (B7) ──── CHECK TERMINATION POINT TP
　　v4←...(v2, v3);
　　v5←...(v2, v3);

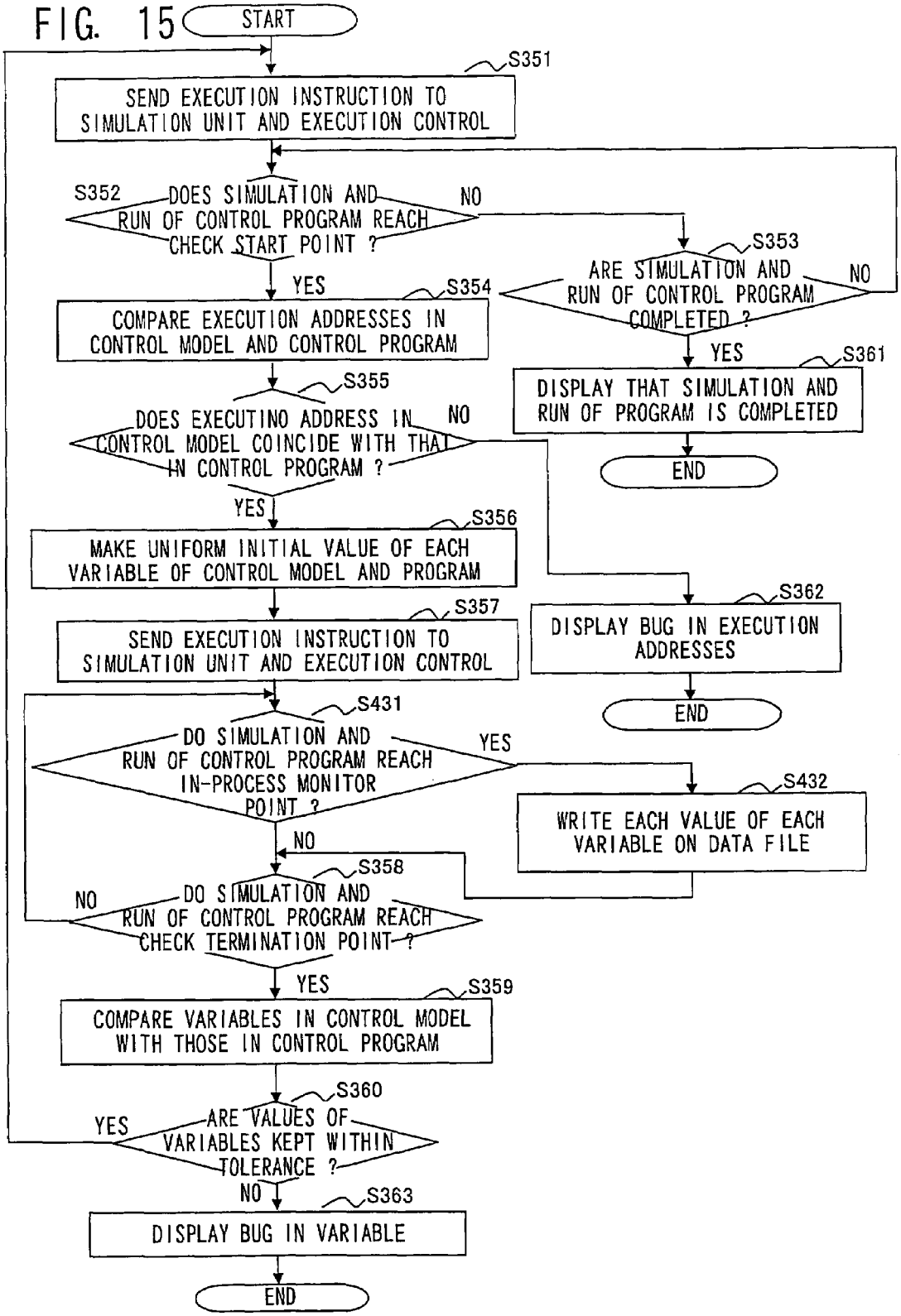

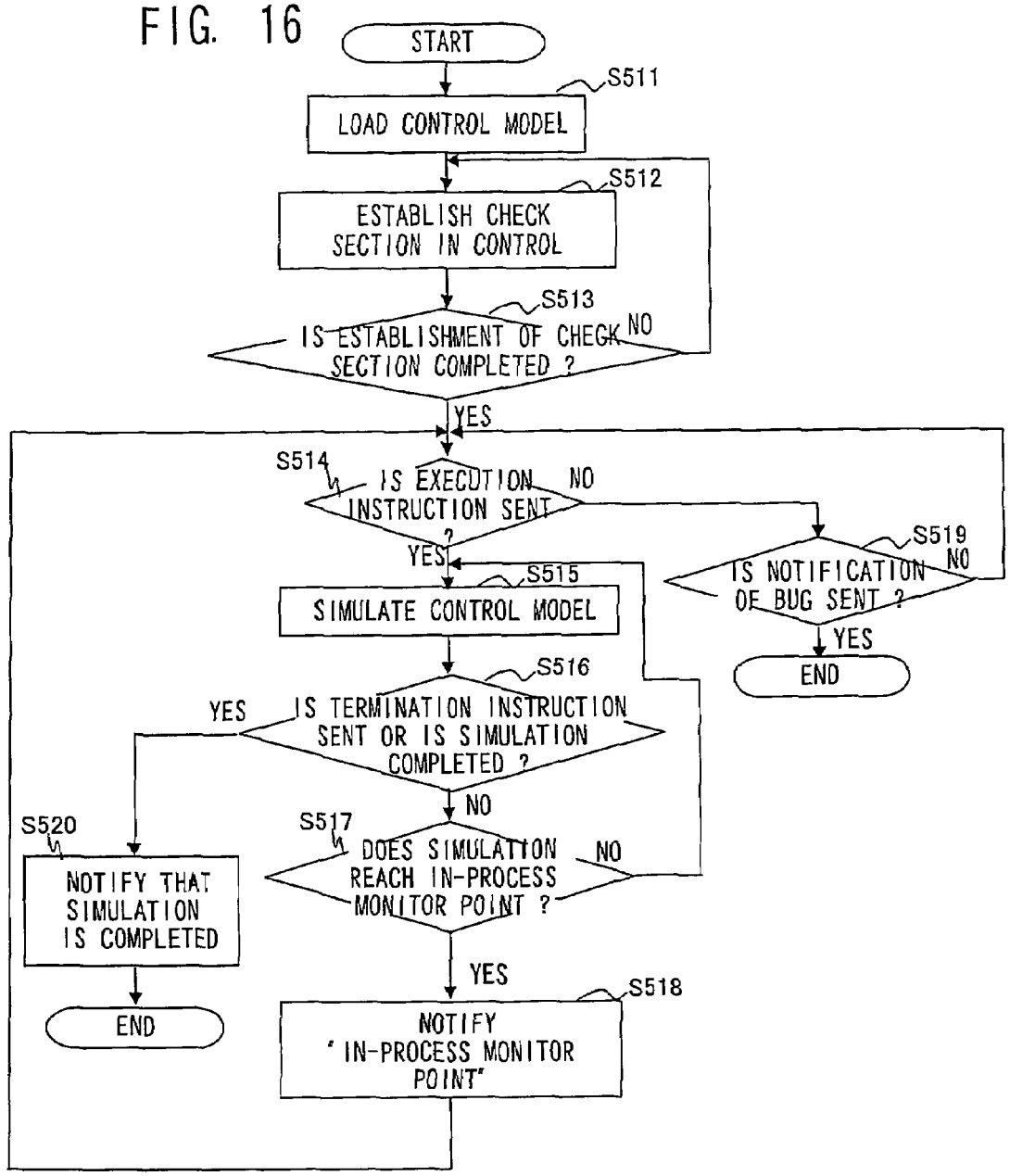

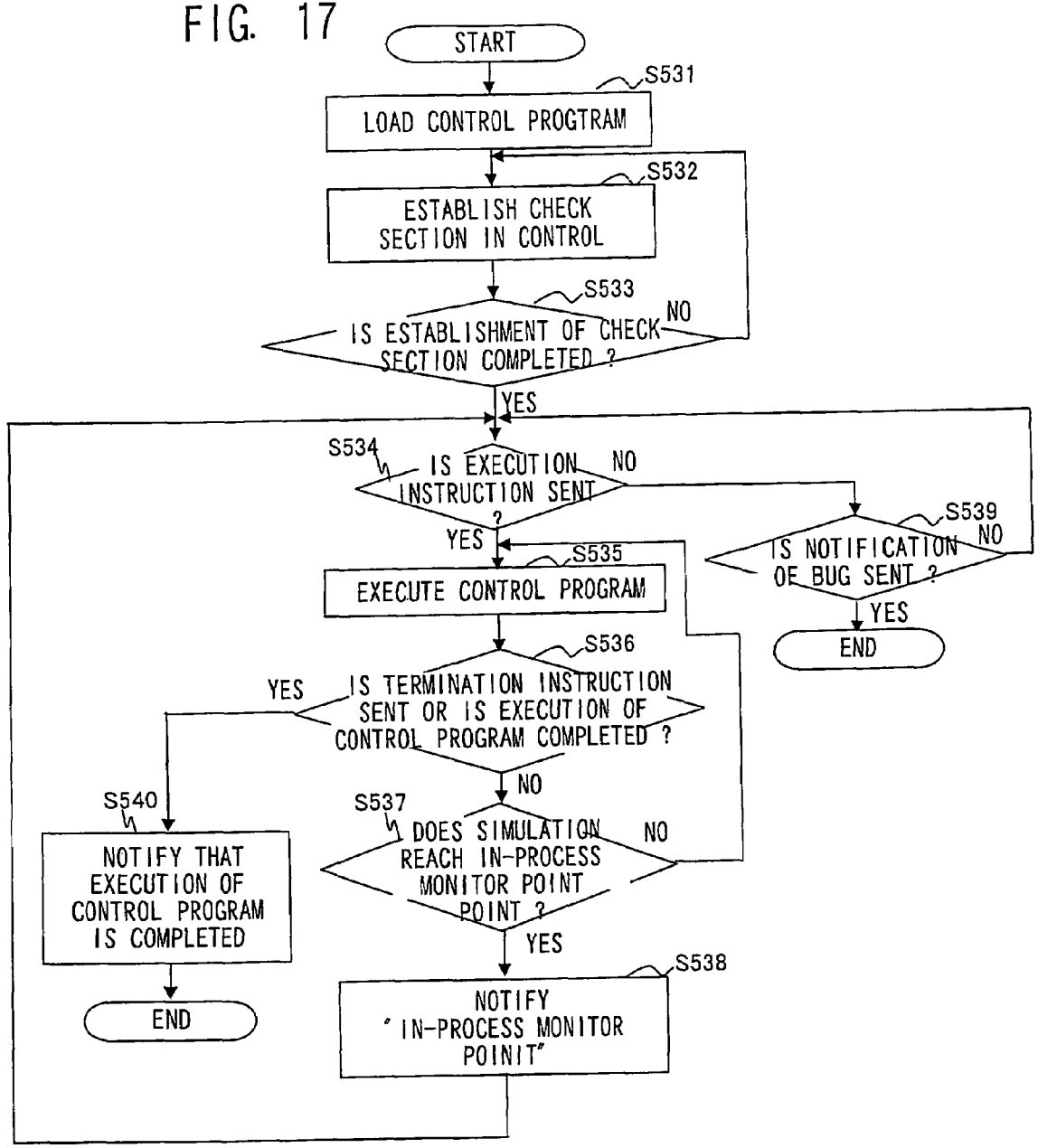

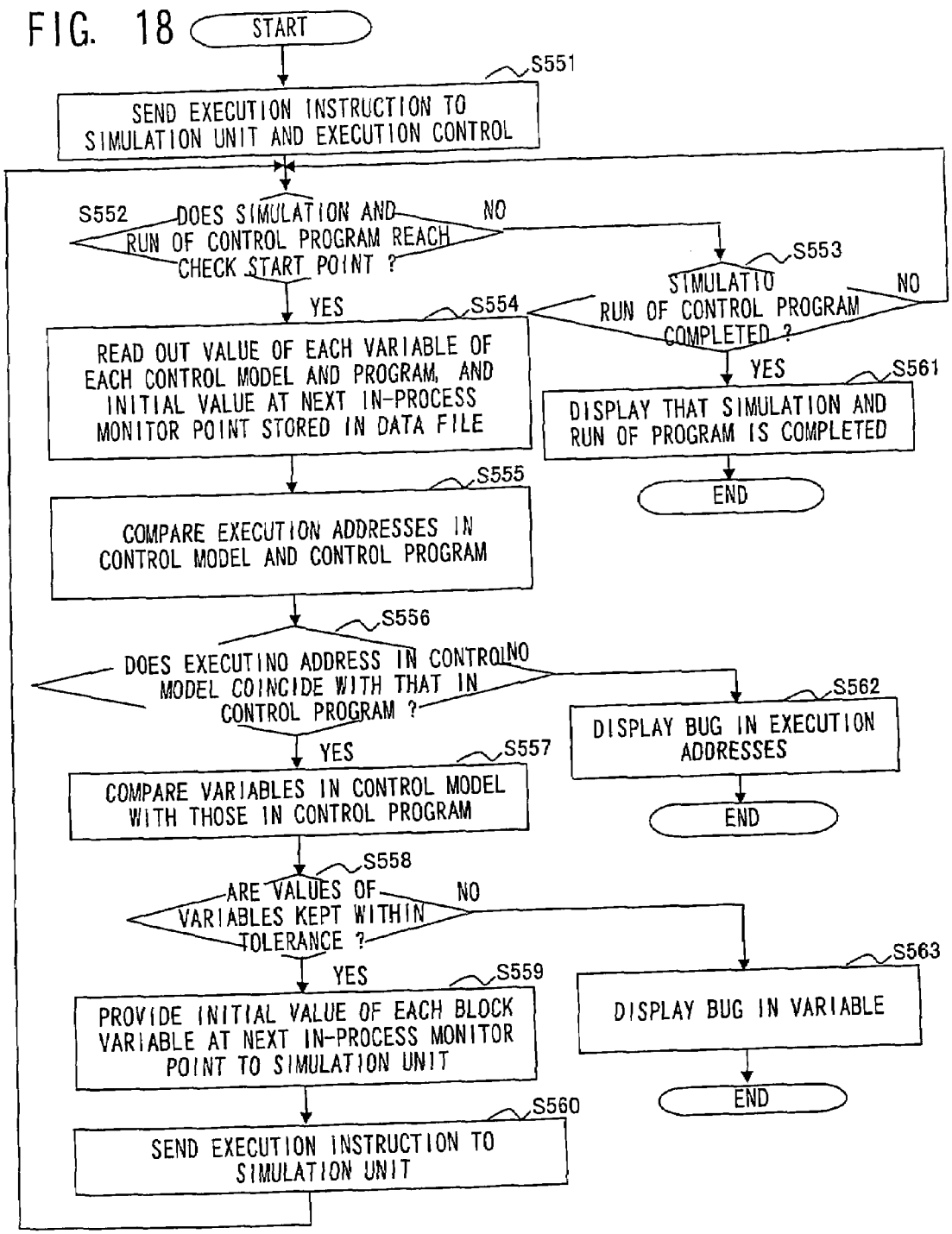

METHOD, SYSTEM, AND PROGRAM PRODUCT FOR CHECKING CONTROL MODEL AND/OR CONTROL PROGRAM

CROSS REFERENCE TO RELATED APPLICATION

This application is based on Japanese Patent Applications 2003-423584 and 2004-302268, which were filed on Dec. 19, 2003 and Oct. 15, 2004, respectively, and claims the benefits of priorities from the Japanese Applications, so that the descriptions of which are all incorporated herein by reference.

BACKGROUND OF THE INVENTION

1. Field of the Invention

The present invention relates to a method, a system, and a program product for checking at least one of a control model and a control program installable in an electronic control unit. The control program is generated based on the control model.

2. Description of the Related Art

Development of control programs for controlling a target, such as an engine installed in a vehicle, includes the following steps of:

writing a control program based on a control model in which requested specifications for controlling a target are designed to be described;

checking whether the coded control program contains bugs to debug the bugs when the bugs are contained in the control program based on the checked result;

installing the debugged control program in an electric control unit installed in an actual vehicle to check the fitness of the installed control program; and debugging the control program based on the result of the fitness check.

In recent years, model-based development of control programs has been carried out. The model-based development includes automatically generating a control program written in a program language from a control model in which requested specifications are described.

In the model-based development, simulation of the control model on the computer allows the validity of the control model's operations to be verified. Construction of the control model is more simplified than generation of the control program so that adaptation of the model-based development to control program development will make the control program development more efficient.

Let us consider cases of automatically coding the control program or hand-coding it.

When debugging the control model and the control program generated by the automatic coding or the hand coding, it is important to verify not only the operations of the control model and the control program on a personal computer simulation, but also the operations of them on an electronic control unit in which the control program is installed. This requires debug of the automatically coded or hand-coded control program installed in the electronic control unit. The control program is commonly installed in the electronic control unit as part of an operating system (OS), such as a real-time operating system (RTOS). When finding bugs in any one of the control model and the control program during the debugging, the construction of the control program may make it difficult to identify locations of bugs in the other of the control model and the control program that correspond to the locations of the bugs in the one of the control model and the control program.

SUMMARY OF THE INVENTION

The present invention resolves the issues discussed in the above background. Accordingly, preferable embodiments of the invention are capable of easily checking whether a control model and a control program generated based on the control model have bugs.

According to one aspect of the present invention, there is provided a check method of checking at least one of a control model in which requested specifications for controlling a target are described and a control program generated based on the control model. The method includes establishing a first monitor section at a first location in the one of the control model and the control program. The method also has automatically identifying a second location in the other of the control model and the control program to establish a second monitor section at the second location in the other thereof, the second location corresponding to the first location of the first monitor section in the one of the control model and the control program.

According to another aspect of the present invention, there is provided a check system for checking at least one of a control model in which requested specifications for controlling a target are described and a control program generated based on the control model. The system has a first establishing unit configured to establish a first monitor section at a first location in the one of the control model and the control program. The system has a first identifying unit configured to automatically identify a second location in the other of the control model and the control program to establish a second monitor section at the second location in the other thereof. The second location corresponds to the first location of the first monitor section in the one of the control model and the control program.

According to a further aspect of the present invention, there is provided a program product having a computer program and a signal bearing media bearing the computer program, the computer program being designed to check at least one of a control model in which requested specifications for controlling a target are described and a control program generated based on the control model. The computer program has first means for instructing a computer to establish a first monitor section at a first location in the one of the control model and the control program. The computer program has second means for instructing a computer to automatically identify a second location in the other of the control model and the control program to establish a second monitor section at the second location in the other thereof. The second location corresponds to the first location of the first monitor section in the one of the control model and the control program.

According to a still further aspect of the present invention, there is provided a program product having a computer program and a signal bearing media bearing the computer program. The computer program is designed to check at least one of a control model in which requested specifications for controlling a target are described by a language used for the requested specifications and a control program generated based on the control model and installed in an electronic control unit. The computer program has first means for instructing a computer to establish a first monitor section at a first location in the one of the control model and the control program. The computer program also has second means for instructing a computer to automatically identify a second location in the other of the control model and the control program to establish a second monitor section at the second location in the other thereof. The second location corresponds to the first location of the first monitor section in the one of the control model and the control program.

BRIEF DESCRIPTION OF THE DRAWINGS

Other objects and aspects of the invention will become apparent from the following description of embodiments with reference to the accompanying drawings in which:

FIG. 1 is a flowchart schematically illustrating a procedure of generating and checking at least one of a control model and a control program according to a first embodiment of the present invention;

FIG. 4 is a view schematically illustrating an example of a structure of a source code automatically generated based on the control model illustrated in FIG. 3;

FIG. 5 is a table schematically illustrating an example of a correspondence information representing a functionally correspondence relationship between the control model illustrated in FIG. 3 and the source code illustrated in FIG. 4;

FIG. 7A is a view schematically illustrating a check start point and a check termination point established in the source code shown in FIG. 4;

FIG. 12A is a view schematically illustrating a source code and an in-process monitor pint established in the source code according to the second embodiment of the present invention;

DETAILED DESCRIPTION OF EMBODIMENTS OF THE INVENTION

Figure 2A:
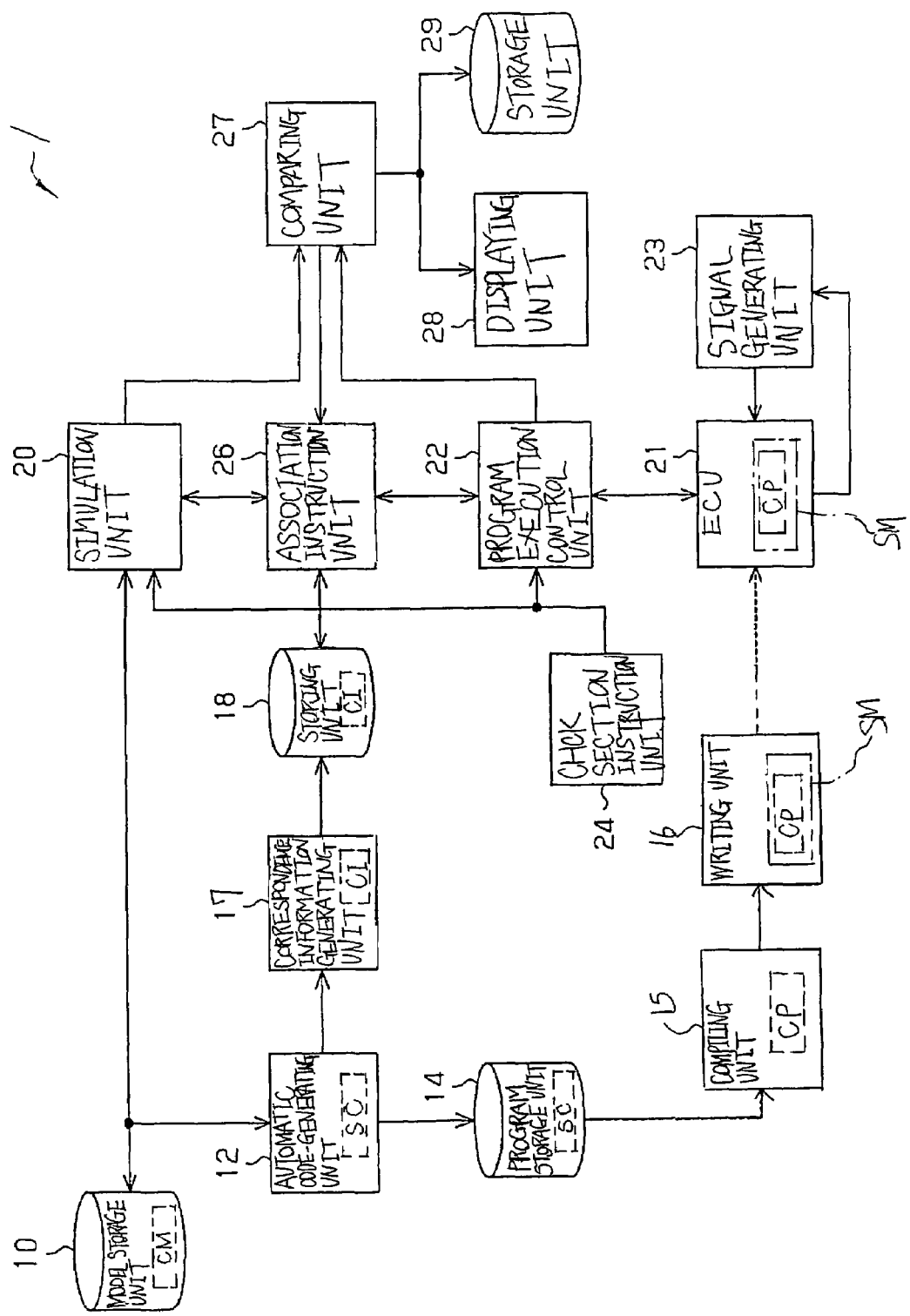
FIG. 2A is a block diagram illustrating a schematic structure of a check system according to the first embodiment of the present invention.

Embodiments of the present invention will be described hereinafter with reference to the accompanying drawings. In each embodiment, the invention is applied to, for example, a method, an apparatus, and a program product, which are capable of checking at least one of a control model and a control program generated based on the control model. The control program is installable in an electronic control unit (ECU) for controlling an in-vehicle engine as a target.

First Embodiment

FIG. 1 is a flowchart schematically illustrating a procedure of generating and checking at least one of a control model and a control program according to a first embodiment of the present invention.

In step S1 of FIG. 1, one or more developers define requested specifications for controlling an in-vehicle engine based on the performance of an electronic control unit installed in a vehicle and the develop concept of a control program. The one or more developers construct a control model in which the requested specifications for the in-vehicle engine as a target are described in a suitable language used for description of the requested specifications.

In addition, in step S1, the one or more developers perform a simulation of the constructed control model to check whether the constructed control model has reasonable functions and a valid performance as compared with the requested specifications. The one or more developers debug the constructed control model based on the check result. The check operation and the debug operation are repeated as long as the constructed control model has the reasonable functions and the valid performance as compared with the requested specifications.

Subsequently, in step S2, the one or more developers enter the control model after completion of the check and debug into a computer so that the computer automatically writes a control program by a computer language, such as C language, on the basis of the entered control model.

In step S3, the computer runs a simulation of the control model and the control program while maintaining the correspondence between the control model and the control program, thereby checking whether each of the control model and the control program contains bugs based on the simulation result and the result of the run of the control program.

When it is determined that at least one of the control model and the control program contains at least one of the bugs, the one or more developers or the computer debug a corresponding at least one of the control model and the control program.

In step S3, after completion of the checking and debugging operations, the one or more developers enter into the computer an instruction that causes the computer to write the control program on storage medium, such as a ROM (Read Only Memory). The storage medium in which the control program stored is installed in the electronic control unit corresponding to the requested specifications so that the control program is integrated into an operating system, such as a real-time operating system that is previously installed in the electronic control unit.

In step S3, the electronic control unit checks whether the installed computer program contains bugs and, when determining that at least one of the control model and the control program contains at least one of the bugs, the electronic control unit debugs at least one of the control model and the control program. When it is determined that the control model contains at least one of the bugs, the procedure may be returned from step S3 to step S1 so that the control model may be debugged in step S1 (see the dashed line from step S3 to step S1).

When it is determined that the control program contains at least one of the bugs, the procedure may be returned from step S3 to step S2 so that the control program may be debugged in step S2 (see the dashed line from step S3 to step S2).

After completion of the debugging, the electronic control unit is installed in a vehicle so that the electronic control unit is electrically coupled to electronically controllable components previously installed in the vehicle. After installation of the electronic control unit, in step S4, the electronic control unit and/or another control unit checks whether the control program fits into the controllable components and contains no bugs.

When determining that at least part of the control program is unfit to at least part of the controllable components and/or that the control program contains at least one of the bugs, that is, the determination in step S4 is NO, the procedure is returned to step S1 or step S2. In step S1 or step S2, the electronic control unit debugs the control program. After the debugging, the actions from step S1 (or step S2) to step S4 are repeated until the electronic control unit determines that at least part of the control program fits to all of the controllable components and contains no bugs in step S3, that is, the determination in step S4 is YES.

The action in step S3, that is, the checking and debugging of the control model and the control program installed in the electronic control unit will be mainly explained in detail hereinafter.

A check system according to the first embodiment used for generating and checking at least one of the control model and the control program will be explained in accordance with FIG. 2A. FIG. 2A is a block diagram illustrating a schematic structure of the check system.

As shown in FIG. 2A, the check system 1 is provided with a model storage unit 10. The model storage unit 10 is configured to store therein the control model that has already been checked in step S1, which is represented as reference character "CM" in FIG. 2A. The check system 1 is provided with an automatic code-generating unit 12 operatively coupled to the model storage unit 10.

The automatic code-generating unit 12 is configured to automatically generate a source code SC in, for example, a file format, which is written by, for example, C language, on the basis of the control model CM stored in the model storage unit 10. The check system 1 is provided with a program storage unit 14 operatively coupled to the automatic code-generating unit 12. The program storage unit 14 is operative to store therein the automatically generated source code (source code file) SC.

The check system 1 is provided with a compiling unit 15 operatively connected to the program storage unit 14. The compiling unit 15 is configured to compile the source code SC to generate the control program in, for example, a file format, which is represented as reference character "CP" in FIG. 2A.

The check system 1 is provided with a writing unit 16 operatively coupled to the compiling unit 15. The writing unit 16 is configured to write the control program CP on the storage medium, such as the ROM, which is represented as "SM" in FIG. 2A. The storage medium SM in which the control program CP is stored is installed in an electronic control unit (ECU) 21 in which at least one microcomputer is installed.

If the control model CM corresponds to part of a control program, such as a control program module CP, the compiling unit 15 can compile the source code SC to generate a control program module CP in, for example, a file format, which corresponds to the part of the control program. In this case, the writing unit 16 can combine the control program module CP and another control program module that is generated independently of the control program module and an existing RTOS, thereby generating a large-scaled control program for ECUs; large-scaled control program consists of the program modules including the control program module CP. The large-scaled control program including the control program module CP is installed in the ECU 21.

As another control program generated independently of the control program module CP, for example, one or more program modules that are hand-coded based on the defined requested specifications can be used.

In addition, the check system 1 has a correspondence information generating unit 17 operatively coupled to the automatic code-generating unit 12. The correspondence information generating unit 17 is configured to generate correspondence information in, for example, a file format based on information generated during the automatic generation of the source code SC. The correspondence information is indicative of a functionally correspondent relationship between the control model CM and the source code SC that corresponds to the control program CP or the control program module. In the first embodiment, the correspondence information (correspondence information file) CI includes a functionally correspondence relationship between a point of each instruction to be executed in the source code SC and the control model CM, and also includes a correspondence relationship between variables in the source code SC and the control model CM.

The check system 1 is provided with a correspondence information storing unit 18 operatively coupled to the correspondence information generating unit 17. The correspondence information storage unit 18 is configured to store therein the correspondence information file CI generated by the correspondence information generating unit 17.

Figure 3:
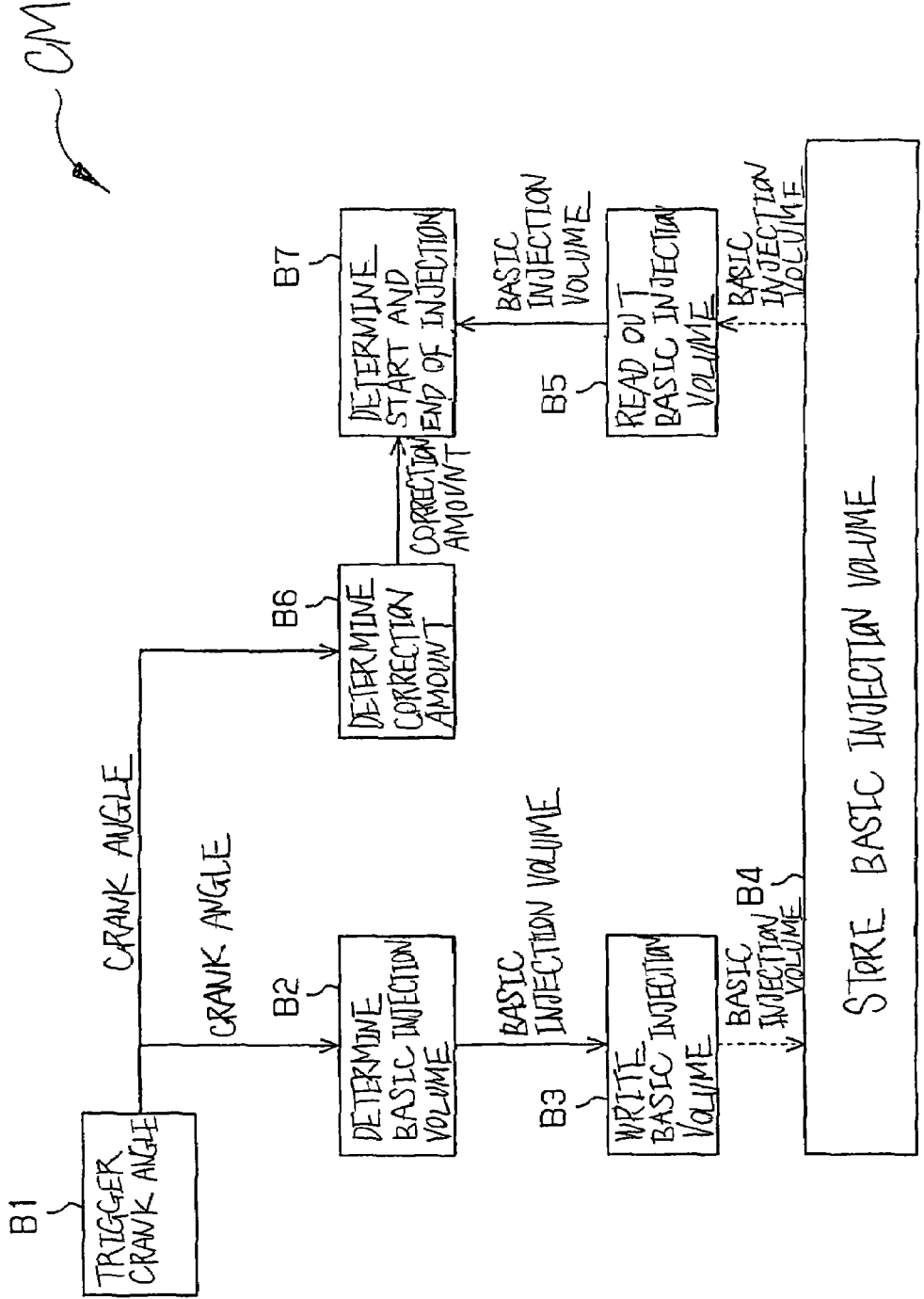
FIG. 3 is a block diagram schematically illustrating an example of the control model stored in a model storage unit shown in FIG. 2A.

FIG. 3 schematically illustrates an example of the control model CM stored in the model storage unit 10, and FIG. 4 schematically illustrates an example of the structure of the source code SC automatically generated based on the control model CM illustrated in FIG. 3. FIG. 5 schematically illustrates an example of the correspondence information CI representing the functionally correspondence relationship between the control model CM illustrated in FIG. 3 and the source code SC illustrated in FIG. 4.

In FIG. 3, for example, the control model CM represents a model designed to determine a timing of an injection of a fuel into an in-vehicle engine and a volume of the fuel injected thereinto based on the required specifications.

As shown in FIG. 3, the control model CM is composed of functional blocks B1 to B7. The block B1 has a function of providing a trigger to each of the blocks B2 and B6 when a first sensor signal indicative of a crank angle of a crankshaft of an in-vehicle engine coincides with a predetermined crank angle. In response to the trigger of the predetermined crank angle, the block B2 has a function of determining a basic fuel injection quantity based on a second sensor signal indicative of an intake airflow into an in-vehicle engine. The block B3 has a function of writing the amount of basic fuel injection determined by the block B2 on the block B4. The block B4 serves as a storage for storing therein the basic injection volume written by the write of the block B3.

The block B5 has a function of reading out the basic fuel injection volume stored in the block B4.

In response to the trigger of the predetermined crank angle, the block B6 has a function of determining a correction amount for correcting the determined basic injection volume based on, for example, third to ninth sensor signals described hereinafter. The block B7 has a function of determining a start of injection and an end thereof based on the read-out basic fuel volume and the determined correction amount. The start and end of injection allow an injection volume to be determined.

The arrows in FIG. 3 indicate the sequence of the functions of the blocks B1 to B7, and indicate flows of data to be operated by the blocks B1 to B7. For example, the sequence of the functions of the blocks B1 to B7 is defined so that the function of block B7 is executed subsequent to the functions of the blocks B5 and B6.

Sequentially, instructions I1 to I5 arranged in FIG. 4 define the sequence of the functions of the blocks B1 to B7.

As illustrated in FIG. 4, the instruction I1 to which a character label L1 is assigned represents the operation of determining the basic injection volume in the block B2. In the instruction I1, a program variable v1 represents the basic injection volume. The instruction I2 to which a character label L2 is assigned represents the operation of writing the basic injection volume in the block b3. In the instruction I2, a program variable m1 represents a target storage to store the basic injection volume.

The instruction I3 to which a character label L3 is assigned represents the operation of determining the correction amount in the block B6. In the instruction I3, a program variable v2 represents the basic injection volume. The instruction I4 to which a character label L4 is assigned represents the operation of reading out the basic injection volume in the block b5. In the instruction I4, a program variable v3 represents the basis injection volume. The instruction I5 to which a character label L5 is assigned represents the operation of determining the injection timing in the block b7. In the instruction I5, program variables v4 and v5 represent the start and end of injection.

The labels L1 to L5 represent the points of the instructions I1 to I5 in the source code SC, respectively; the order of the labels L1 to L5 represents the sequence of the functions of the blocks B2, B3, B5 to B7. Specifically, the block B2 calculates the basic injection volume in response to the trigger (predetermined crank angle) supplied from the block B1. The block B3 receives the calculated basic injection volume supplied from the block B2 and writes the basic injection volume on the block B4. After the writing operation, the block B6 calculates the correction amount in response to the trigger (predetermined crank angle) supplied from the block B1, and the block B5 reads out the basic injection volume stored in the block B4. Subsequent to the calculation process in the block B6 and the read-out process in the block B5, the block B7 reads the basic injection volume and the correction amount and calculates the start and end of injection based on the read basic injection volume and the correction amount.

That is, in the source code SC shown in FIG. 4, after the basic injection volume is calculated, the correction amount with respect to the basic injection volume is calculated so that the start and end of injection are determined based on the basic injection volume and the correction amount.

Moreover, in FIG. 5, the correspondence information CI is schematically illustrated in, for example, a table format. The correspondence information CI according to the first embodiment includes two types of information, such as execution address correspondence information CI1 and variable correspondence information CI2.

The execution address correspondence information CI1 represents a functionally correspondent relationship between execution locations (addresses) of block points in the control model CM and those of instruction points in the source code SC (control program). That is, as shown in FIG. 5, because the block B2 functionally corresponds to the instruction I1 to which the label L1 is assigned, the execution location (address) of the block B2 is associated with the label L1 indicative of the execution location (address) of the instruction I1 in the source code SC.

Similar to this association, the block B3, B6, B5, and B7 functionally correspond to the instructions I2, I3, I4, and I5, to which the labels L2, L3, L4, and L5 are assigned, respectively. Because of these functional relationships, the locations (addresses) of the blocks B3, B6, B5, and B7 are associated with the labels L2, L3, L4, and L5, which are indicative of the execution locations (addresses) of the instructions I2, I3, 14, and 15 in the source code SC, respectively.

That is, the execution address correspondence information CI1 permits, by specifying at least one of the labels L1 to L5 (instruction points of the instructions I1 to I5), retrieval and identification of a corresponding one of the blocks B2, B3, and B5 to B7. Contrary to the procedures, the execution address correspondence information CI1 permits, by specifying at least one of the blocks B2, B3, and B5 to B7, retrieval and identification of a corresponding one of the labels L1 to L5 (instruction points of the instructions I1 to I5).

The variable correspondence information CI2 represents a correspondent relationship between a block variable (model variable) transferred through a block connection between any two blocks connected to each other or handled by a block itself in the blocks B1 to B7 and the corresponding program variable in the program variables m1 and v1 to v5 of the source code SC. For example, the block variable handled by the block B3 or B5 and representing a value of a storage in which the basic injection volume will be or has been stored corresponds to the program variable m1 in the source code SC.

That is, as shown in FIG. 5, because the block variable of basic injection volume transferred between the blocks B2 and B1 functionally corresponds to the variable v1 in the instruction I1, the block variable of the basic injection volume is associated with the program variable v1 in the instruction I1. Similarly, because the block variable of the stored value of the basic injection volume handled by the block B3 functionally corresponds to the variable m1 in the instruction I2, the block variable of the stored value of the basic injection volume is associated with the program variable m1 in the instruction I2. Furthermore, the block variable of correction amount transferred between the blocks B6 and B7 functionally corresponds to the program variable in the instruction I2.

This allows the block variable of the correction amount to be associated with the program variable v2 in the instruction I2. Similarly, the block variable of the basic injection volume transferred between the blocks B5 and B4 is associated with the program variable v3 in the instruction I4. Because the block variables of the start and end of injections handled by the block B7 correspond to the program variables V4 and v5 of the instruction I5, respectively, the block variables of the start and end injections are associated with the variables v4 and v5 in the instruction I5, respectively.

The variable correspondence information CI2 permits, by specifying at least one of the block variables, such as a block connection or a block itself in the blocks B1 to B7, retrieval and identification of a corresponding at least one of the program variables m1 and v1 to v5 in the source code SC. Counter to the procedures, the variable correspondence information CI2 permits, by specifying at least one of the program variables m1 and v1 to v5 in the source code SC, retrieval and identification of a corresponding one of the block variables, such as the corresponding block connection or the corresponding block itself in the blocks B1 to B7.

Furthermore, the check system 1 is provided with a simulation unit 20 operatively coupled to the model storage unit 10. The simulation unit 20 is configured to simulate the control model CM stored in the model storage unit 10. The check system 1 is provide with a program execution control unit (execution control unit) 22 communicably connected to the ECU 21 with, for example, a bus. The execution control unit 22 is configured to send and receive different types of data to the control program CP stored in the storage medium SM installed in the ECU 21, thereby controlling the running state of the control program CP. Specifically, the execution control unit 22 is configured to run the control program CP and to interrupt or terminate the run thereof.

The check system 1 is provided with a check section instruction unit 24 operatively coupled to the simulation unit 20 and the execution control unit 22. The check section instruction unit 24 has a function of instructing one of the simulation unit 20 and the execution control unit 22 to establish at least one first check section in a corresponding one of the control model CM and the control program CP.

The check system 1 is provided with an association instruction unit 26 operatively coupled to the storing unit 18, the simulation unit 20, and the execution control unit 22, respectively. The association instruction unit 26 has a function of instructing the other of the simulation unit 20 and the execution control unit 22 to establish at least one second check section in the other of the control model CM and the control program CP based on the execution address correspondence information CI1 stored in the storing unit 18. The second check section in the other of the control model CM and the control program CP is correspondent to (is associated with) the first check section.

That is, the described associating function of the association instruction unit 26 allows the control model CM simulated by the simulation unit 20 to be associated with the control program CP executed by the execution control unit 22.

Moreover, the check system 1 is provided with a signal generating unit 23 communicably connected to the ECU 21. The signal generating unit 23 has a pre-programmed check scenario and operates to sequentially artificially generate various types of sensor signals that are required for simulating the control model CM and executing the control program CP based on the check scenario (see FIG. 2B). The signal generating unit 23 is operative to supply the generated sensor signals to the ECU 21.

In the first embodiment, for example, the sensor signals include the first sensor signal indicative of the crank angle of a crankshaft of a target of an in-vehicle engine, and the second sensor signal indicative of the intake airflow into the in-vehicle engine. The sensor signals also include the third sensor signal artificially indicative of a temperature of a coolant in the in-vehicle engine, the fourth sensor signal indicative of actual or incipient detonation, and the fifth sensor signal indicative of a temperature of the intake air of the in-vehicle engine. The sensor signals further include the sixth sensor signal indicative of a throttle position of the in-vehicle engine, and the seventh sensor signal indicative of a cam angle of a camshaft of the in-vehicle engine. The sensor signals include the eighth sensor signal indicative of a speed of a vehicle and the ninth sensor signal indicative of an amount of oxygen in an exhaust from the in-vehicle engine.

The signal generating unit 23 is operative to, after the artificial generation of the sensor signals, receive an executed result of the control program CP by the ECU 21 feedback therefrom through a feedback loop and update the sensor signals by reflecting the executed result thereon. The signal generating unit 23 repeats the executed result receiving operation and the sensor signal updating operation in accordance with the programmed check scenario. Specifically, the signal generating unit 23 may have an engine bench (engine model) equivalently models operations of an actual in-vehicle engine. In addition, as the signal generating unit 23, an actual in-vehicle engine itself can be used, or a vehicle in which an actual in-vehicle engine has already been installed also can be used.

The check system 1 is provided with a comparing unit 27 operatively coupled to the simulation unit 20, the execution control unit 22, and the association instruction unit 26, respectively. The comparing unit 27 operates to compare the simulated result of the control model CM executed by the simulation unit 20 with the executed result of the control program CP by the execution control unit 22. The check system 1 is provided with a displaying unit 28 operatively coupled to the comparing unit 27. The displaying unit 28 is configured to display a comparison result obtained by the comparing unit 27 in a visible format. The check system 1 is provided with a storage unit 29 operatively connected to the comparing unit 27. The storage unit 29 is configured to store therein the comparison result.

Figure 2B:
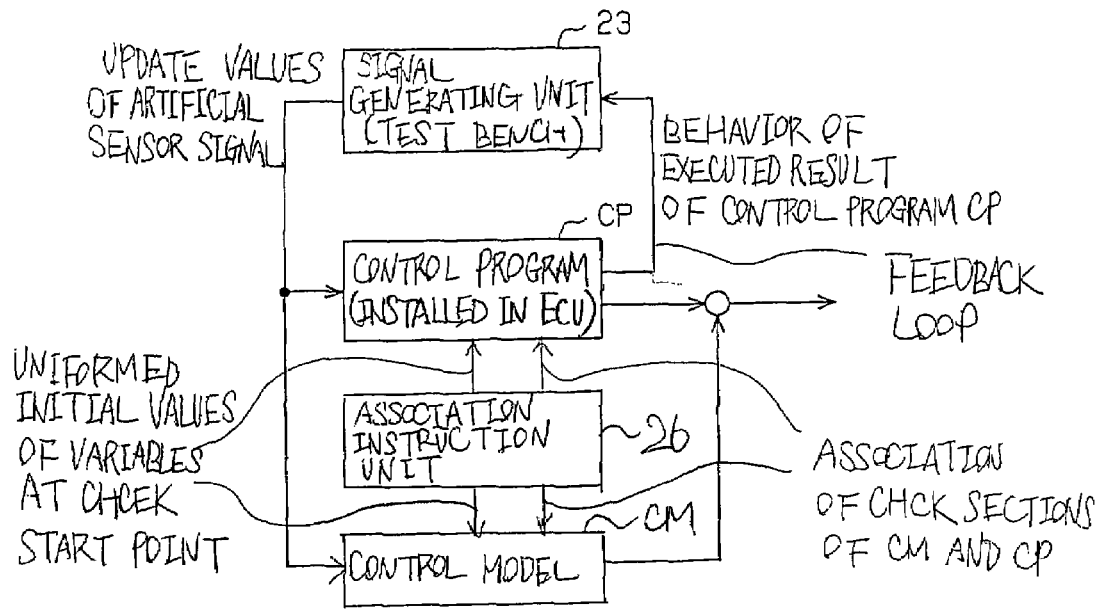
FIG. 2B is a simplified block diagram schematically illustrating a feedback check of the control model and the control program of the check system according to the first embodiment.
Figure 2C:
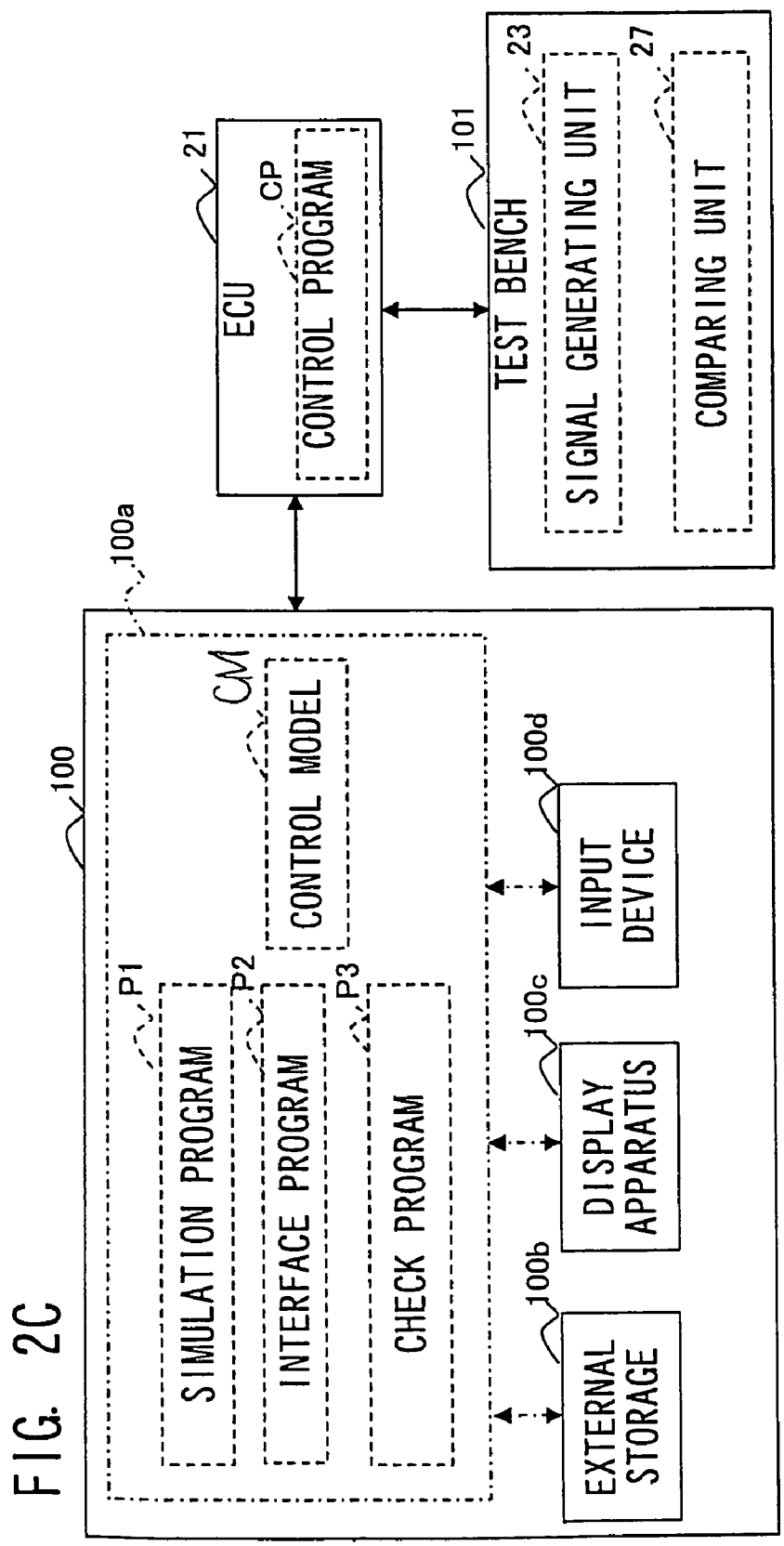
FIG. 2C is a block diagram schematically illustrating a computer system in which functional elements of the check system shown in FIG. 1 are implemented according to the first embodiment.

The elements 10, 12, 14-18, 20, 22, 24, 26, 28, and 29 of the check system 1 set forth above are, for example, implemented in a computer system 100 communicably connected to the ECU 21 (see FIG. 2C). The computer system 100 has at least one microcomputer 100a composed of, for example, a CPU and a main memory in which programs are installed. The computer system 100, for example, has an external storage 100b, a display apparatus 100c, and an input device 100d, which are electrically connected to the at least one microcomputer 100a. For example, the external storage 100b includes the storage units 10, 14, 18, and 29. The display apparatus 100c, for example, includes the displaying unit 28. The input device 100d, for example, allows a user to externally enter various instructions into the at least one microcomputer 100a.

The programs, for example, include a simulation program P1 required to simulate the control model CM, which corresponds to the function of simulation unit 20, an interface program P2 required to communicate with the ECU 21, and a check program P3 required to check the control model CM and the control program PC.

For example, the check program P3 in collaboration with the simulation program P1 and the interface program P2 allows the at least one microcomputer 100a to implement the functions 10, 12, 14-18, 20, 22, 24, 26, 28, and 29 of the check system 1.

The remaining elements 23 and 27 are implemented in, for example, functional blocks of a test bench 101. The test branch 101 is communicably connected to the ECU 21 and the computer system 100 and designed to verify hardware and software of the ECU 21 (see FIG. 2C).

Next, the overall operations of the check system 1 according to the first embodiment will be described hereinafter with reference to FIGS. 6 to 10.

As described above, the control model CM to be checked, which is illustrated in FIG. 3, is stored in the model storage unit 10, and the correspondence information CI representing the correspondent relationship between the control model CM and the control program CP, which is illustrated in FIG. 5, is stored in the storing unit 18. The control program CP to be checked, which corresponds to the control model CM and the correspondence information CI, is stored in the storage medium SM, and the storage medium SM is installed in the ECU 21, which allows the execution control unit 22 to monitor the behavior of the executed result of the control program CP.

When starting to check the control model CM and the control program CP, in response to, for example, externally entered instructions, the check section instruction unit 24 instructs one of the simulation unit 20 and the execution control unit 22 to establish the first check section in a corresponding one of the control model CM and the control program CP. The one of the simulation unit 20 and the execution control unit 22 establishes the first check section in the corresponding one of the control model CM and the control program CP.

On the other hand, the association instruction unit 26 detects the establishment of the first check section. In response to the detection, the association instruction unit 26 instructs the other of the simulation unit 20 and the execution control unit 22 to establish the second check section associated with the first check section in the other of the control model CM and the control program CP based on the execution address correspondence information CI1.

In the first embodiment, each of the first and second check sections is composed of a check start point and a check terminate point in each of the control model CM and the control program CP. The check start point represents a point in each of the control model CM and the control program CP where a check is started, and the check terminate point represents a point in each of the control model CM and the control program CP where the check is terminated. In the first embodiment, the check start and terminate points are set as breakpoints, respectively.

Figure 6:
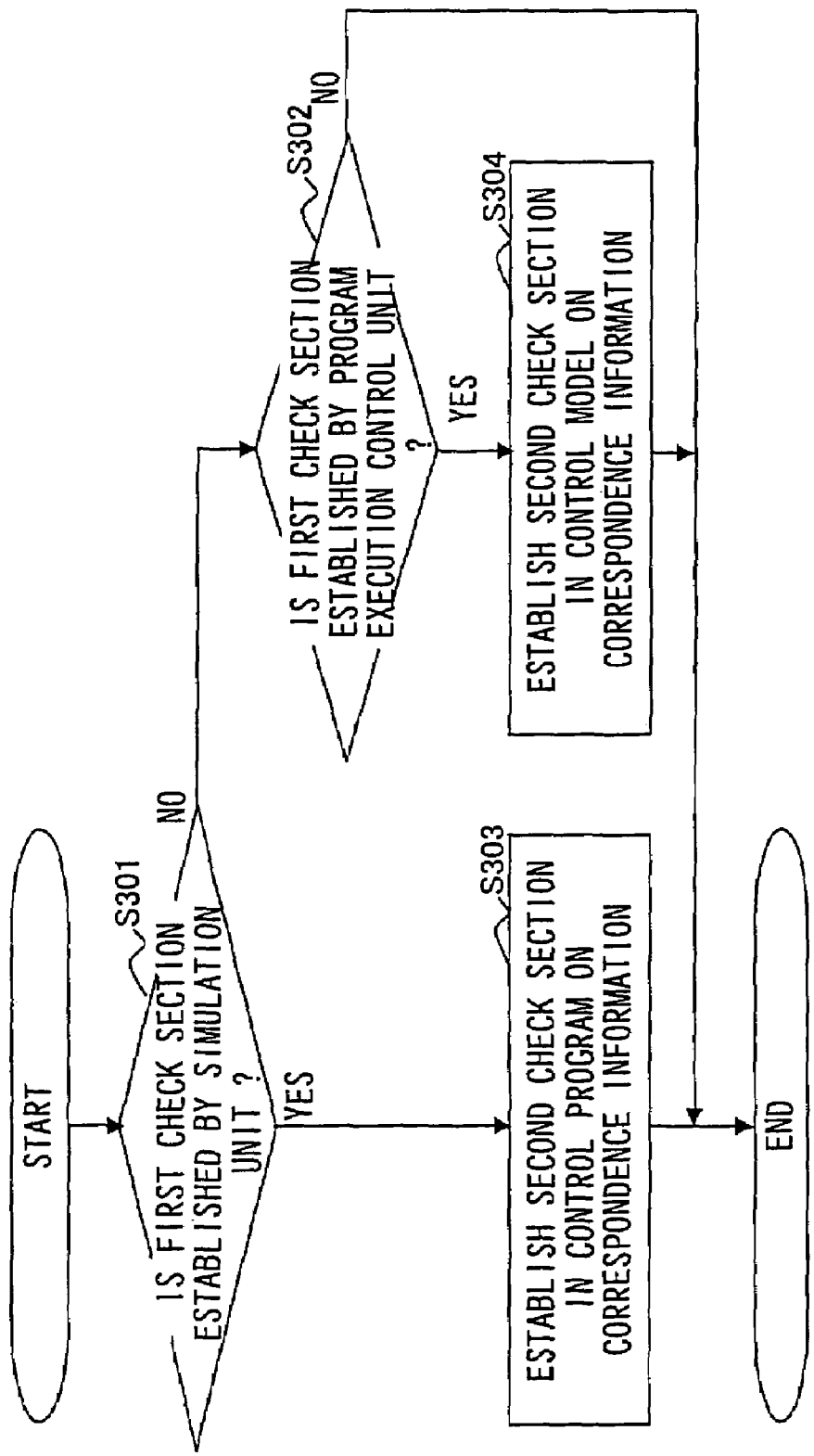
FIG. 6 is a flowchart schematically illustrating check section establishing actions of an association instruction unit shown in FIG. 2A.

FIG. 6 illustrates the check section establishing actions of the association instruction unit 26 as a flowchart. The check section establishing actions of the association instruction unit 26 are preferably performed in response to when the load of the control model CM to the simulation unit 20 is completed and the execution control unit 22 allows monitoring the control program CP. The check section establishing processes of the association instruction unit 26 can be periodically performed in an arbitrary cycle.

As shown in FIG. 6, the association instruction unit 26 accesses the simulation unit 20 to determine whether the first check section is established by the simulation unit 20 in step S301.

When determining that the first check section is not established by the simulation unit 20, that is, the determination in step S301 is NO, the association instruction unit 26 accesses the execution control unit 22 to determine whether the first check section is established by the execution control unit 22 in step S302.

When determining that the first check section is established in the control model CM by the simulation unit 20, that is, the determination in step S301 is YES, the association instruction unit 26 references the execution address correspondence information CI1 stored in the storing unit 18. The association instruction unit 26 identifies an address (a location) of the second check section corresponding to the first check section established in the control model CM based on the reference result, thereby instructing the execution control unit 22 to establish the second check section at the identified address in the control program CP stored in the storage medium SM installed in the ECU 21 in step S303.

Specifically, the check start point and the check termination point of the first check section can be established in the control model CM at each of the blocks B1 to B7 or a group of the sequent blocks. The check start point and the check termination point of the second check section can be established in the control program CP at each of the instructions I1 to I6 (each of the labels L1 to L6) or a group of sequent instructions. Each of the check start points and the check termination points of each second check section in the control program CP corresponds to each of the check start points and the check termination points of each first check section in the control model CM.

When determining that the first check section is established in the control program CP by the execution control unit 22, that is, the determination in step S302 is YES, the association instruction unit 26 references the execution address correspondence information CI1 stored in the storing unit 18. The association instruction unit 26 identifies the address of the second check section corresponding to that of the first check section established in the control program CP based on the reference result, thereby instructing the simulating unit 20 to establish the second check section at the identified address in the control model CM in step S304.

Specifically, the check start point and the check termination point of the first check section can be established in the control program CP at each of the instructions I1 to I6 (each of the labels L1 to L6) or a group of sequent instructions. The check start point and the check termination point of the second check section can be established in the control model CM at each of the blocks B1 to B7 or a group of the sequent blocks of the control model CM. Each of the check start points and the check termination points of each second check section in the control model CM corresponds to each of the check start points and the check termination points of each first check section in the control program CP.

When determining that the first check section is not established by the execution control unit 22, that is, the determination in step S302 is NO, the association instruction unit 16 terminates the sequence of the check section establishing actions. In addition, when terminating the process in step S303 or step S304, the association instruction unit 26 also terminates the sequence of the check section establishing actions.

Figure 7B:
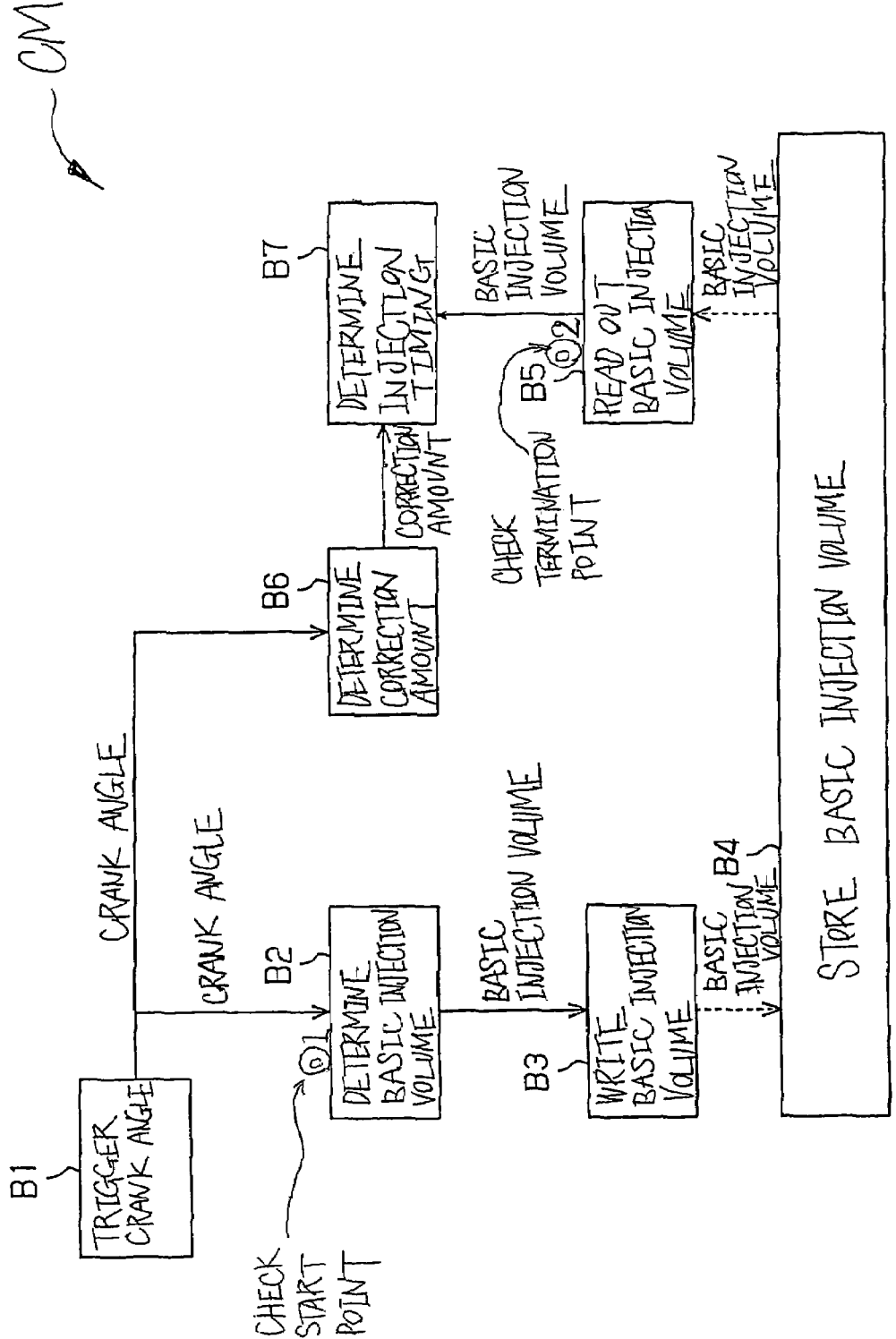
FIG. 7B is a block diagram schematically illustrating a check start point and a check termination point established in the control model shown in FIG. 3.

For example, FIG. 7A illustrates the check start point SP and the check termination point TP of one of the first and second check sections established to a group of sequent instructions I1 to I5 (the label L1 to L5) in the control program CP. In this case, FIG. 7B schematically illustrates the check start point ⊚1 and the check termination point ⊚2 of the other of the first and second check sections established to the group of sequent blocks B2 to B5 in the control model CM. The check start point ⊚1 and the check termination point ⊚2 of the other of the first and second check sections in the control block B7 are associated with the check start point SP and the check termination point TP of the one of the first and second check sections, respectively.

Next, the actions of the simulation unit 20 will be described hereinafter with reference to FIG. 8.

Figure 8:
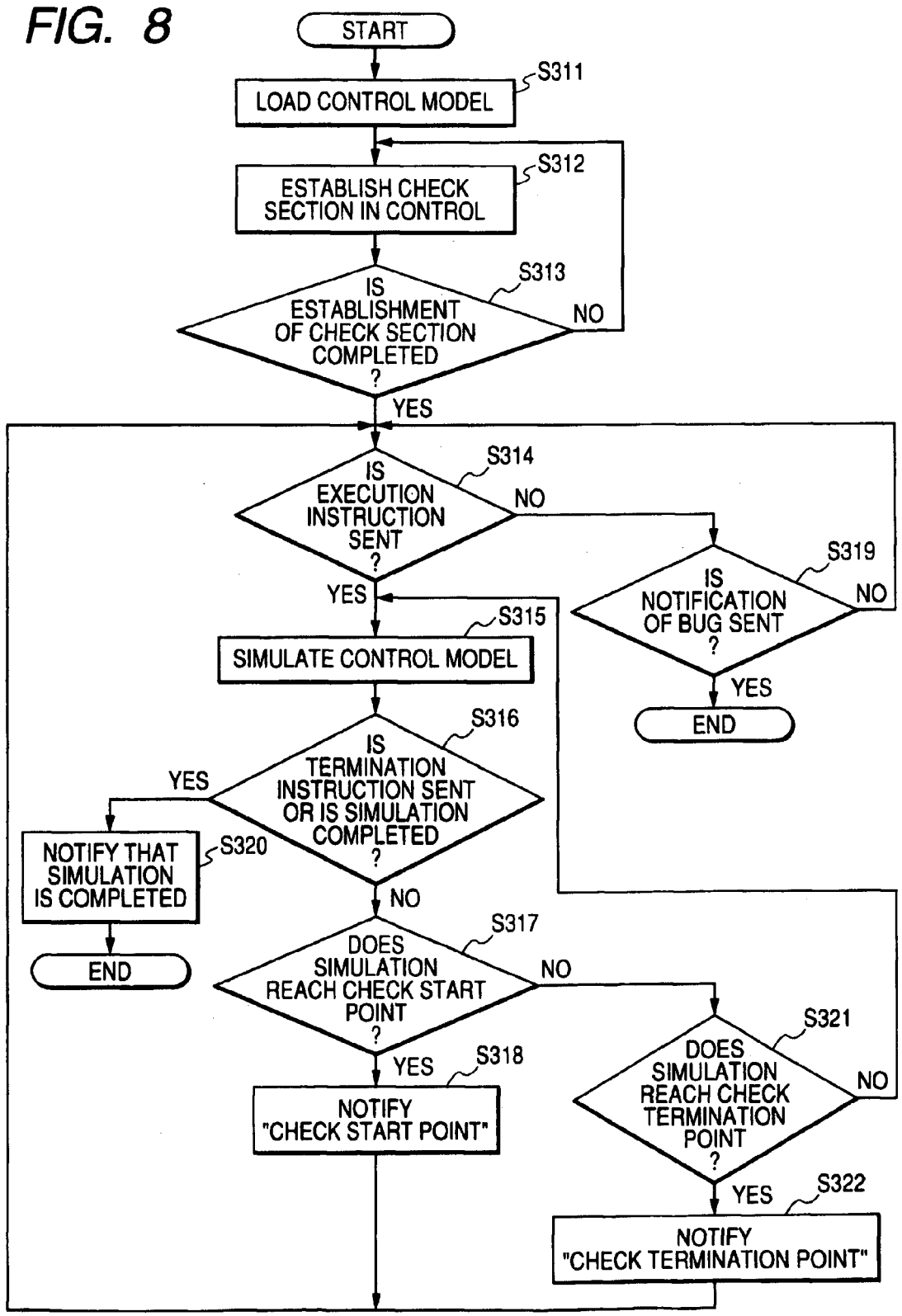
FIG. 8 is a flowchart schematically illustrating actions of a simulation unit shown in FIG. 2A.
Figure 9:
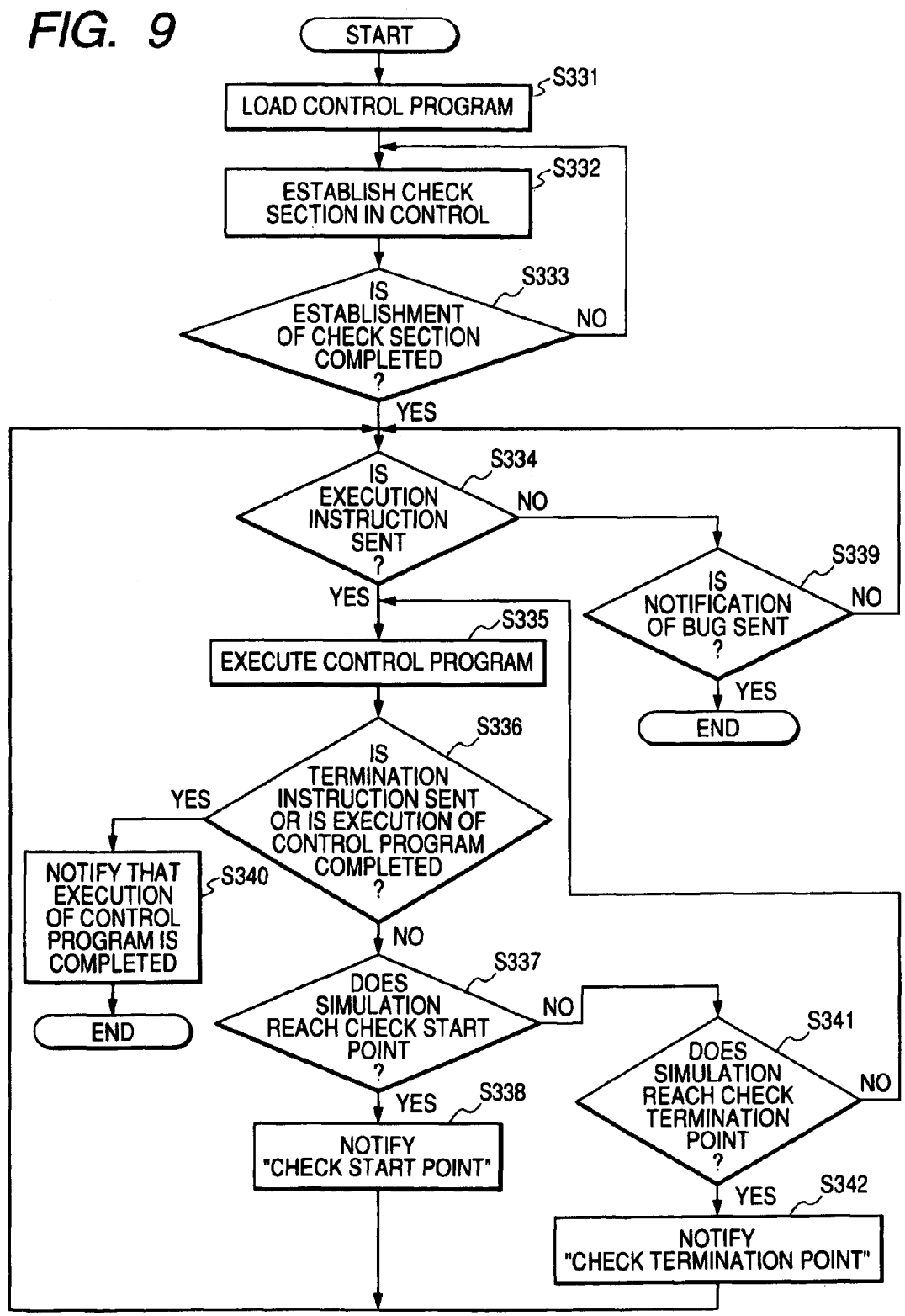
Figure 10:
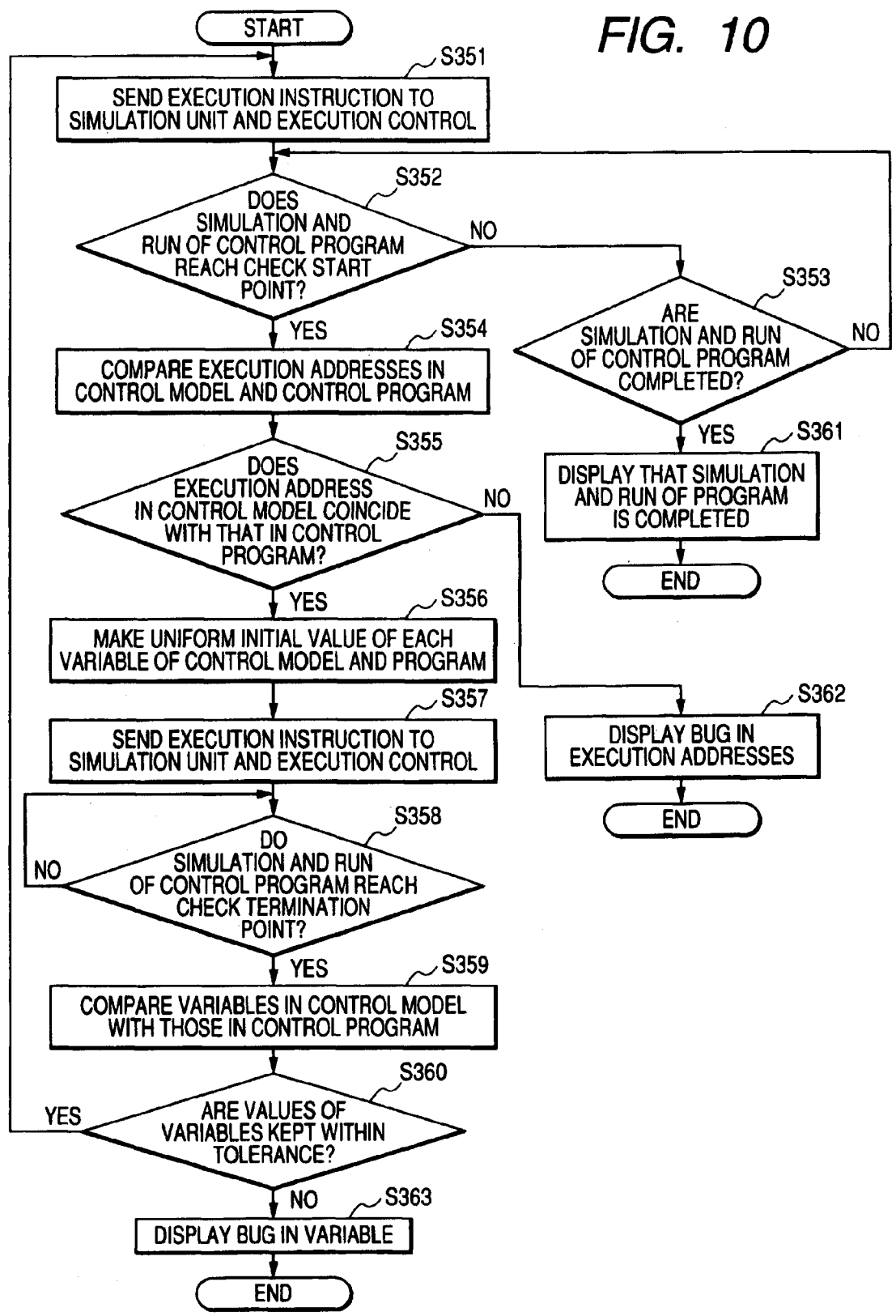

FIG. 8 illustrates the actions of the simulation unit 20 as a flowchart.

In FIG. 8, the simulation unit 20 loads the control model CM stored in the model storage unit 10 in step S311. Subsequently, the simulation unit 20 establishes the first or second check section in the control model CM. That is, the simulation unit 20 establishes the check start point at a first arbitrary place in the control model CM, and the check termination point at a second arbitrary place therein after the first arbitrary place in step S312 (see steps S301 and S304 in FIG. 6, and FIG. 7B).

In step S313, the simulation unit 20 determines whether the establishment of the first or second check section is completed. When it is determined that the establishment of the first or second check section is not completed (the determination in step S313 is NO), the simulation unit 20 repeatedly executes the operation in step S312 until the determination in step S313 is YES.

When it is determined that the establishment of the first or second check section is completed (the determination in step S313 is YES), the simulation unit 20 waits to receive an execution instruction from the association instruction unit 26.

That is, the simulation unit 20 determines whether the execution instruction is sent from the association instruction unit 26 in step S314. When it is determined that the execution instruction is not sent from the association instruction unit 26 (the determination in step S314 is NO), the simulation unit 20 determines whether the notification of a bug is sent from the association instruction unit 26 in step S319.

When it is determined that the notification of a bug is not sent from the association instruction unit 26 (the determination in step S319 is NO), the simulation unit 20 waits to receive the execution instruction from the association instruction unit 26.

While the simulation unit 20 waits to receive the execution instruction from the association instruction unit 26, when the execution instruction is sent from the association instruction unit 26, the determination in step S314 is YES. Then, the simulation unit 20 simulates the loaded control model CM based on the values of the artificial sensor signals and input data described hereinafter in step S315. The artificial sensor signals are provided from the signal generating unit 23 to the simulation unit 20 through the ECU 21, the execution control unit 22, and the association instruction unit 26.

The simulation of the control model CM has been executed by the simulation unit 20 until any one of the following conditions (a) to (d) is satisfied:

(a) a termination instruction is sent externally (step S316)

(b) the simulation of the control model CM is completed (step S316)

(c) the simulation reaches the check start point in the control model CM (step S317)

(d) the simulation reaches the check termination point in the control model CM is found (step S321)

That is, the simulation unit 20 determines whether the termination instruction is sent externally or the simulation of the control model CM is completed in step S316. When determining that the termination instruction is not sent externally and the simulation of the control model is not completed (the determination in step S316 is NO), the simulation unit 20 determines whether the simulation reaches the check start point in the control model CM in step S317.

When determining that the simulation does not reach the check start point in the control model CM (the determination in step S317 is NO), the simulation unit 20 determines whether the simulation reaches the check termination point in the control model CM in step S321. When determining that the simulation does not reach the check termination point in the control model CM (the determination in step S321 is NO), the simulation unit 20 returns to step S315 to continue the simulation of the control model CM unless any one of the determinations in steps S316, S317, and S321 is YES.

When determining that the simulation reaches the check start point or the check termination point in the control model CM (the determination in step S317 or S321 is YES), the simulation unit 20 interrupts the simulation of the control model CM. Subsequently, the simulation unit 20 externally provides notification representing the interruption address corresponding to the check start point where the simulation is interrupted in the control model CM through, for example, the display apparatus 100c of the computer system 100 in step S318 or step S322, returning to step S314 to wait to receive the execution instruction.

In other words, the interruption address represents the address that identifies the location of the simulation executed at the check start point or the check termination point in the control model CM, so that the interruption address corresponding to the check start point or check termination point is referred to as "execution address".

During the simulation of the control model CM, when the comparing unit 27 determines that an error occurs in any one of the variables in the control model CM or in the execution address therein, the association instruction unit 26 can send the notification of a bug to the simulation unit 20.

When receiving the notification of a bug sent from the association instruction unit 26, the determination in step S319 is YES so that the simulation unit 20 terminates the sequence of the operations and storing therein the termination address in the control model CM where the error occurs. The simulation unit 20 externally provides notification of the termination point in the control model CM through, for example, the display apparatus 100c of the computer system 100.

On the other hand, when determining that the termination instruction is sent externally or the simulation of the control model is completed (the determination in step S316 is YES), the simulation unit 20 terminates the simulation of the control model CM. Subsequently, the simulation unit 20 externally provides notification that the simulation of the control model CM is completed through, for example, the display apparatus 100c of the computer system 100 in step S320, thereby terminating the sequence of the operations.

Next, the actions of the execution control unit 22 will be described hereinafter with reference to FIG. 9.

Figure 9:
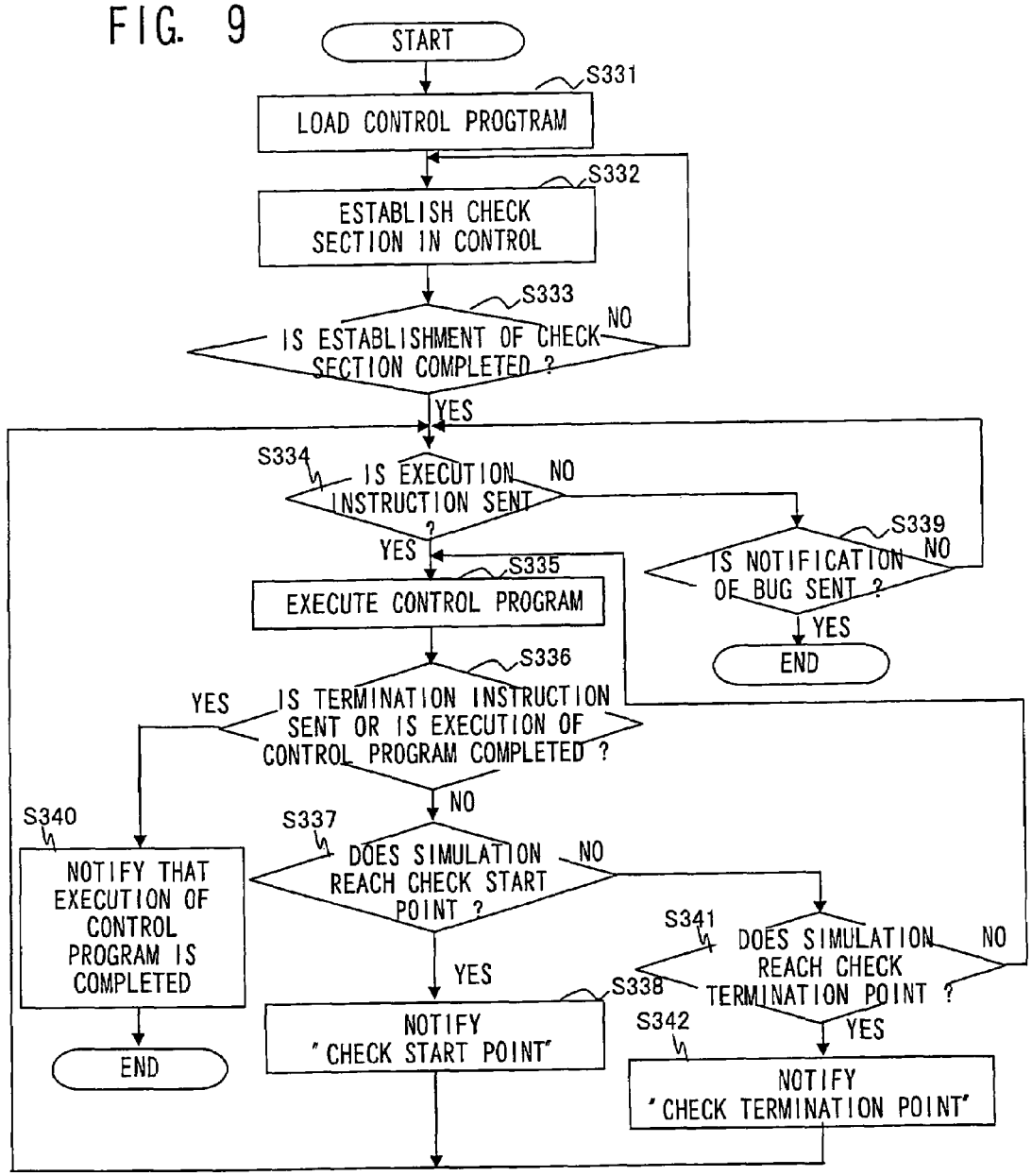
FIG. 9 is a flowchart schematically illustrating actions of an execution control unit shown in FIG. 2A.

FIG. 9 illustrates the actions of the execution control unit 22 as a flowchart.

In FIG. 9, the execution control unit 22 loads the computer program CP stored in the storage medium SM installed in the ECU 21 in step S331. Subsequently, the execution control unit 22 establishes the first or second check section in the control program CP.

That is, the execution control unit 22 establishes the check start point at a first arbitrary place in the control program CP, and the check termination point at a second arbitrary place therein after the first arbitrary place in step S332 (see steps S301 and S304 in FIG. 6, and FIG. 7A). As described above, the check start point and the check termination point of the check section established in the control program CP are associated with the check start point and the check termination point of the check section established in the control model CM.

In step S333, the execution control unit 22 determines whether the establishment of the first or second check section is completed. When it is determined that the establishment of the first or second check section is not completed (the determination in step S333 is NO), the execution control unit 22 repeatedly executes the operation in step S332 until the determination in step S333 is YES.

When it is determined that the establishment of the first or second check section is completed (the determination in step S333 is YES), the execution control unit 22 waits to receive an execution instruction from the association instruction unit 26.

That is, the execution control unit 22 determines whether the execution instruction is sent from the association instruction unit 26 in step S334. When it is determined that the execution instruction is not sent from the association instruction unit 26 (the determination in step S334 is NO), the execution control unit 22 determines whether the notification of a bug is sent from the association instruction unit 26 in step S339.

When it is determined that the notification of a bug is not sent from the association instruction unit 26 (the determination in step S339 is NO), the execution control unit 22 waits to receive the execution instruction from the association instruction unit 26.

While the execution control unit 22 waits to receive the execution instruction from the association instruction unit 26, when determining that the execution instruction is sent from the association instruction unit 26 (the determination in step S334 is YES), the execution control unit 22 instructs the ECU 21 to run the control program CP. The instruction causes the ECU 21 to run the installed control program CP based on the values of the artificial sensor signals and input data described hereinafter in step S335. The artificial sensor signals are provided from the signal generating unit 23 to the ECU 21.

In step S336, the execution unit 22 monitors the behavior of the executed result of the control program CP by the ECU 21 so that the control program CP has been executed by the ECU 21 until any one of the following conditions (e) to (h) is satisfied:

(e) a termination instruction is sent externally (step S336)

(f) the simulation of the control program CP is completed (step S336)

(g) the execution reaches the check start point in the control program CP (step S337)

(h) the execution reaches the check termination point in the control program CP (step S341)

That is, the execution control unit 22 determines whether the termination instruction is sent externally or the execution of the control program CP is completed in step S336. When determining that the termination instruction is not sent externally and the execution of the control program CP is not completed (the determination in step S336 is NO), the execution control unit 22 determines whether the execution reaches the check start point in the control program CP in step S337.

When determining that the execution does not reach the check start point in the control program CP (the determination in step S337 is NO), the execution control unit 22 determines whether the execution reaches the check termination point in the control program CP in step S341. When determining that the execution does not reach the check termination point in the control program CP (the determination in step S341 is NO), the execution control unit 22 returns to step S335 to continue the execution of the control program CP unless any one of the determinations in steps S336, S337, and S341 is YES.

When determining that the execution reaches the check start point or the check termination point in the control program CP (the determination in step S337 or S341 is YES), the execution control unit 22 causes the ECU 21 to interrupt the execution of the control program CP. Subsequently, the execution control unit 22 externally provides notification representing the interruption address corresponding to the check start point or the check termination point in the control program CP where the execution is interrupted through, for example, the display apparatus 100c of the computer system 100 in step S338 or step S342, returning to step S334 to wait to receive the execution instruction.

In other words, the interruption address represents the address represents the address that identifies the location of the instruction executed at the check start point or the check termination point in the control program CP so that the interruption address corresponding to the check start point is referred to as "execution address".

During the run of the control program CP, when the comparing unit 27 determines that an error occurs in any one of the variables in the control program CP or in the instruction being executed, the association instruction unit 26 can send the notification of a bug to the execution control unit 22.

When the execution control unit 22 receives the notification of a bug sent from the association instruction unit 26, the determination in step S339 is YES so that the execution control unit 22 terminates the sequence of the operations and storing therein the termination address in the control program CP where the error occurs. The execution control unit 22 externally provides notification of the termination address in the control program CP through, for example, the display apparatus 100c of the computer system 100.

On the other hand, when determining that the termination instruction is sent externally or the execution of the control program CP is completed (the determination in step S336 is YES), the execution control unit 22 causes the ECU 21 to terminate the execution of the control program CP. Subsequently, the execution control unit 22 externally provides notification that the execution of the control program CP is completed through, for example, the display apparatus 100c of the computer system 100 in step S340, thereby terminating the sequence of the operations.

Next, the operations of the association instruction unit 26 and those of the comparing unit 27 will be described hereinafter with reference to FIG. 10.

Figure 10:
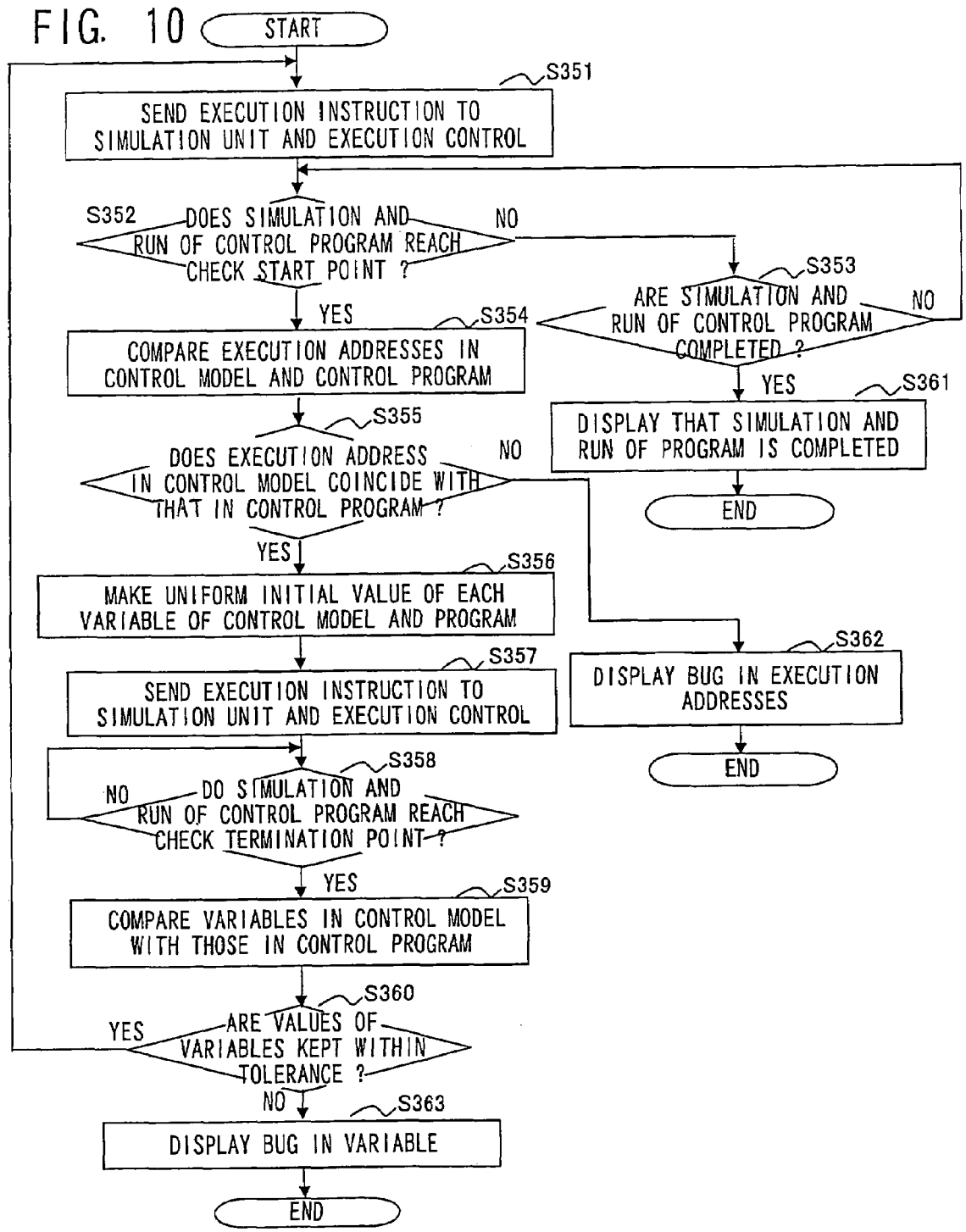
FIG. 10 is a flowchart schematically illustrating operations of an association instruction unit and those of a comparing unit shown in FIG. 2A.

FIG. 10 illustrates the operations of the association instruction unit 26 and those of the comparing unit 27 as a flowchart.

As set forth above, the first and second check sections associated with each other are established in the control model CM and the control program CP in random order (see step S312 in FIG. 8 and step S332 in FIG. 9). After the establishment of the first and second check sections, the simulation unit 20 and the execution control unit 22 shift to wait states, respectively (see step S314 in FIG. 8 and step S334 in FIG. 9).

Under the wait states of the simulation unit 20 and the execution control unit 22, the association instruction unit 26 sends the execution instruction to the simulation unit 20 to simulate the control model CM, and that to the execution control unit 22 to cause the ECU 21 to run the control program CP in step S351.

In response to the execution instructions, the simulation of the control model CM and the execution of the control program CP are started, respectively (see steps S314-S315 in FIG. 8 and steps S334-S335 in FIG. 9).

After the operation in step S351, the association instruction unit 26 determines whether the notification representing the interruption address (execution address) corresponding to the check start point is sent from each of the simulation unit 20 and the execution control unit 22 in step S352. When determining that the notification representing the execution address corresponding to the check start point is not sent from each of the simulation unit 20 and the execution control unit 22 (the determination in step S352 is NO), the association instruction unit 26 shifts to step S353.

In step S353, the association instruction unit 26 determines whether the notifications representing the completions of the control model's simulation and the control program's execution are sent from the simulation unit 20 and the execution control unit 22 in step S353.

When determining that the notifications representing the completions of the control model's simulation and the control program's execution are not sent from the simulation unit 20 and the execution control unit 22 (the determination in step S353 is NO), the association instruction unit 26 returns to step S352, repeating the operations in steps S352 and S353.

While the determinations in steps S352 and S353 are NO, the simulation of the control model CM and the execution of the control program CP proceed, respectively (see steps S315 to S317, S321-S322 in FIG. 8 and steps S335 to S337, S341-S342 in FIG. 9).

Then, the simulation proceeds to reach the check start point in the control model CM and the execution proceeds to reach the check start point in the control program CP. In response to the reach, the notification indicative of the execution address corresponding to the check start point is sent to the association instruction unit 26 from each of the simulation unit 20 and the execution control unit 22 (see step S318 in FIG. 8 and step S338 in FIG. 9).

The association instruction unit 26 receives the notification indicative of the execution address sent from each of the simulation unit 20 and the execution control unit 22 (the determination in step S352 is YES), shifting to step S354.

If one of the notifications each representing the execution address (check start point) is sent from a corresponding one of the simulation unit 20 and the execution control unit 22, the association instruction unit can wait for receiving the other of the notifications sent from the other thereof. When receiving the other of the notifications sent from the other of the simulation unit 20 and the execution control unit 22, the association instruction unit 26 can shift to step S354.

In step S354, the association instruction unit 26 compares the execution address corresponding to the check start point set in the control model CM with the execution address corresponding to the check start point set in the control program CP by referring to the execution address correspondence information CI1. Subsequently, the comparing unit 27 determines whether the execution address at the check start point in the control model CM corresponds to the execution address at the check start point in the control program CP based on the reference result in step S355.

When determining that the execution address in the control model CM corresponds to the execution address in the control program CP (the determination in step S355 is YES), the association instruction unit 26 shifts to step S356.

When the control program CP completely corresponds to the control model CM, conforming the values of the artificial sensor signals supplied to the simulation unit 20 with those of the artificial sensor signals supplied to the ECU 21 allows the value of at least one block variable at the check start point in the control model CM to coincide with the value of corresponding at least one program variable at the check start point in the control program CP.

For example, in a case where the control model CM corresponds to the control program module CP in part of the control program, the execution of another part of the control program may contribute to the consistency between the value of at least one block variable at the check start point in the control model CM and that of corresponding at least one program variable at the check start point in the control program module CP.

In this case where the value of at least one block variable at the check start point in the control model CM does not coincide with that of corresponding at least one program variable at the check start point in the control program (module) CP, in step S356, the association instruction unit 26 instructs the simulation unit 20 and the execution control unit 22 to provide input data including an initial value of each variable of the control model CM and that of the control program CP.

That is, the instruction makes uniform the input data provided to each of the control model CM and the control program CP based on the variable correspondence information CI2.

For example, the association instruction unit 26 causes the simulation unit 20 to change the value of at least one block variable at the check start point in the control model CM to the value of corresponding at least one program variable maintained at the check start point in the control program CP.

Reversely, the association instruction unit 26 can cause the execution control unit 22 to change the value of at least one program variable at the check start point in the control program CP to the value of corresponding at least one block variable maintained at the check start point in the control model CM.

Incidentally, it is assumed that at least one model variable and corresponding at least one program variable are dependent variables, respectively. In this assumption, the association instruction unit 26 can cause the simulation unit 20 to change the value of at least one intervening variable corresponding to the at least one model variable in the control model CM to the value of the at least one intervening variable corresponding to the at least one program variable maintained at the check start point in the control program CP.

Reversely, in this assumption, the association instruction unit 26 can cause the execution control unit 22 to change the value of at least one intervening variable corresponding to the at least one program variable in the control program CP to the value of the at least one intervening variable corresponding to the at least one model variable maintained at the check start point in the control model CM.

In relation to the variable changing operation, it may be possible to externally designate which block variable (intervening variable) or program variable (intervening variable) is changed. In this case, a program variable (intervening variable) or block variable (intervening variable) with respect to the designated variable can be designated to be changed.

The designation operation allows the value of the designated monitor variable and the value of the corresponding designated program variable to be accurately compared with each other independently, even if a difference between another monitor variable and corresponding another program variable may be accumulated during the simulation of the control model CM and the execution of the control program CP.

In addition, an input data file to, for example, the external storage 100b may be provided; the input data file stores therein a list of initial values prepared for the corresponding block and program valuables.

This allows both the value of at least one block variable in the control model CM and that of corresponding at least one program variable in the control program CP to be changed to one read from the prepared initial values stored in the input data file based on the variable correspondence information each time both the simulation of the control model CM and the control program CP reach any check start points corresponding to each other.

As set forth above, the operation in step S356 uniforms the value of at least one block variable at the check start point in the control model CM and that of corresponding at least one program variable at the corresponding check start point in the control program CP. This provides each block variable and each program variable with the same initial condition for checking the control model CM and the control program CP under on a like-for-like basis.

Next, in step S357, the association instruction unit 26 sends the execution instruction to the simulation unit 20, and the execution instruction to the execution control unit 22.

That is, this operation of the association instruction unit 26 in step S357 allows the simulation of the control model CM and the control program CP to be executed from the check start points corresponding to each other under the same initial value condition, respectively (see steps S318, S314-S315 in FIG. 8 and steps S338, S334-S335 in FIG. 9).

The simulation of the control model CM and the execution of the control program CP continue until the simulation reaches the check termination point in the control model CM and the execution reaches the check termination point in the control program CP in step S358 (see steps S314-S317, S321-S322 in FIG. 8 and steps S334-S337, S341-S342 in FIG. 9).

When the simulation reaches the check termination point in the control model CM, the notification representing the interrupting address (execution address) corresponding to the check termination point is sent to the association instruction unit 26 from the simulation unit 20 (see step S322 in FIG. 8). Similarly, when the execution reaches the check termination point in the control program CP, the notification representing the interruption address (execution address) corresponding to the check termination point is sent to the association instruction unit 26 from the execution control unit 22 (see step S342 in FIG. 9).

That is, the simulated region of the control model CM defined by one of the first and second check sections functionally corresponds to the executed range of the control program CP defined by the other of the first and second check sections.

The association instruction unit 26 receives the notification representing the interruption address (execution address) corresponding to the check termination point and sent from each of the simulation unit 20 and the execution control unit 22 (the determination in step S358 is YES), shifting to step S359.

In step S359, the association instruction unit 26 refers to the variable correspondence information CI2 to confirm the correspondent relationships between the block variables at the check termination point in the control model CM and program variables at the check termination point in the control program CP based on the referred result.

Subsequently, in step S360, the comparing unit 27 compares the values of the block variables maintained at the check termination point in the control model CM with those of the program variables maintained at the corresponding check termination point in the control program CP, respectively.

In the first embodiment, in step S360, the comparing unit 27 determines whether a difference between the value of each block variable maintained in the control model CM and that of corresponding each program variable maintained in the control program CP is kept within a predetermined tolerance.

For example, it is assumed that the value of at least one block variable maintained in the control model CM and that of corresponding at least one program variable maintained in the control program CP have integer types, respectively. In this assumption, the comparing unit 27 can determine that the difference between the value of the at least one block variable held in the control model CM and that of corresponding at least one program variable held in the control program CP is kept within the tolerance only when the difference is zero.

In contrast, it is assumed that the value of at least one block variable maintained at the check termination point in the control model CM and that of corresponding at least one program variable maintained at the check termination point in the control program CP have floating types, respectively. In this assumption, the comparing unit 27 can determine that the difference therebetween is kept within the tolerance only when the absolute value of the difference is not more than a predetermined value. The tolerance can be determined as a constant, or variably determined during, for example, the operations in step S312 in FIG. 8 and in step S332 in FIG. 9.

The comparing unit 27 may write, to a data file prepared in, for example, the external storage 100b, the value of at least one block variable at the check termination point in the control model CM and that of corresponding at least one program variable at the corresponding check termination point in the control program CP. In this case, it is possible to externally designate which block variable and which program variable are written on the data file.

That is, when the user operates, for example, the input device 100d to arbitrarily select a variable in one of the control model CM and the control program CP, the selected variable and a corresponding variable in the other of the control model CM and the control program CP may be automatically written on the data file, respectively.

In step S360, when it is determined that the difference between the value of each block variable in the control model CM and that of corresponding each program variable in the control program CP is kept within the predetermined tolerance, the determination in step S360 is YES. According to the affirmative determination, the comparing unit 27 recognizes that both the simulated region (check section) of the control model CM and the executed region (check section) of the control program CP contain no bugs. Then, the association instruction unit 26 proceeds to step S351 to continue the simulation of the control model CM and the execution of the control program CP from the check termination points, respectively.

The sequence of the steps by the association instruction unit 26 and the comparing unit 27 is repeated until the simulation of the control model CM and the execution of the control program CP are entirely completed, respectively (the determination in step S353 is YES). Moreover, the sequence of the steps by the association instruction unit 26 and the comparing unit 27 is repeated until the determination in step S355 is NO or the determination in step S360 is NO.

That is, when determining that the address of the check start point set in the control model CM does not correspond to the address of the check start point set in the control program CP (the determination in step S355 is NO), the association instruction unit 26 shifts to step S362.

In step S362, the association instruction unit 26 sends the notification of a bug between the execution addresses of the control model CM and the control program CP to both the simulation unit 20 and the execution control unit 22 (see step S319 in FIG. 8 and step S339 in FIG. 9). Subsequently, the displaying unit 28 visually displays information indicative of "bug in execution addresses in control model and control program".

When determining that the difference between the value of at least one block variable in the control model CM and that of at least one of corresponding program variable in the control program CP is not kept within the predetermined tolerance (the determination in step S360 is NO), the comparing unit 27 proceeds to step S363.

In step S363, the association instruction unit 26 sends the notification of a bug between the value of at least one block variable and that of at least one program variable to both the simulation unit 20 and the execution control unit 22 (see step S319 in FIG. 8 and step S339 in FIG. 9). Subsequently, the displaying unit 28 visually displays information indicative of "bug in value of variable in check section of control model or control program".

In addition, it is assumed that the comparing unit 27 determines that the execution address at the check start point set in the control model CM does not correspond to the execution address at the check start point set in the control program CP (the determination in step S355 is NO). In this assumption, the displaying unit 28 visually displays that the execution addresses at the check termination points in the control model CM and the control program CP.

Moreover, it is assumed that the comparing unit 27 determines that the difference between the value of at least one block variable in the control model CM and that of at least one of corresponding program variable in the control program CP is not kept within the predetermined tolerance (the determination in step S360 is NO). In this assumption, the displaying unit 28 visually displays that the execution addresses at the check termination points in the control model CM and the control program CP, the identifier of the at least one block variable, the value thereof, the identifier of the at least one program variable, and the value thereof in step S363. This allows the user to easily recognize the checked result of each of the control model CM and the control program CP.

The checked results obtained by the operations of the comparing unit 27 in steps S355 and S360 are stored in the storage unit 29, respectively. The checked results can be graphed for recognizing an overall trend of each of the checked results. These graphed check result make it possible to improve the efficiency of the management of the checked results, and to contribute shortening of the development of control models and/or control programs.

When the association instruction unit 26 determines that the simulation of the control model CM and the execution of the control program CP are entirely completed, the determination in step S353 is YES. As a result, information representing that "simulation of control model and execution of control program are entirely completed" is visually displayed on, for example, the display apparatus 100c of the computer system 100.

As described above, even if at least one bug occurs in the sequence of instructions in the control program CP generated based on the control model CM or in the control program CP itself, the check system 1 according to the first embodiment allows detection of the at least one bug.

This is two reasons: (1) the at least one bug may appear in a difference between the execution address at the check start point of the control model CM and that at the check start point of the control program CP; (2) the at least one bug may appear a difference between a value of a block variable in the check section (simulated region) of the control model CM and that of a program variable in the check section (executed region) of the control program CP.

Therefore, detecting the difference between the execution address at the check start point of the control model CM and that at the control program CP permits detection of the at least one bug. Similarly, detecting the difference between a value of a block variable in the check section of the control model CM and that of a program variable in the check sections of the control program CP by the check system 1 permits detection of the at least one bug.

The ECU 21, therefore, allows debugging of the at least one bug contained in at least one of the control model CM and the control program CP (see step S3 in FIG. 1).

After the checking operations by the check system 1, it is determined that the control program CP contains no bugs, the ECU 21 in which the control program CP is incorporated is installed in a vehicle so that the ECU 21 is electrically coupled to electronically controllable components previously installed in the vehicle. After installation of the ECU 21, the ECU 21 and/or another control unit checks whether the control program CP fits into the controllable components and contains no bugs (see step S4 in FIG. 1).

If it is determined that at least part of the control program CP is unfit to at least part of the controllable components and/or that the control program CP contains at least one bug (see the determination in step S4 is NO in FIG. 1), the control program CP and/or the control model CM can be debugged (see steps S1 and/or S2 in FIG. 1).

As described above in detail, the check method, the check system 1, and the check program P3 for the control model CM and the control program CP according to the first embodiment have the following effects.

As a first effect, the association instruction unit 26 and the execution control unit 22 allow one of the first and second check sections established in the control model CM to be automatically associated with the other of the first and second check sections established in the control program CP. This permits the checked result of the control model CM to be easily compared with that of the control program CP, making it possible to simply check whether the control program CP and the control model CM contain bugs.

As a second effect, using the execution address correspondence information CI1 generated by the correspondence information generating unit 17 allows the execution address of the simulation in the control model CM to be accurately associated with the execution address of the control program CP in the control program CP.

As a third effect, it is assumed that the control program CP to be checked is part of a large-scaled control program installed in the ECU 21, such as the control program module CP. Even in this assumption, establishing one of the first and second check sections in the control model CM and the other thereof in the control program module CP allows one of the first and second check sections in the control program module CP to simply correspond to the other thereof in the control program module CP.

As a fourth effect, the check start and termination points can be established in both the control model CM at each block and the control program CP at each instruction point (each label L1 to L5). This allows, even if a plurality of blocks in the control model CM defines a new sequence of the instructions, the control model CM to be simply associated with the control program CP.

As a fifth effect, the value of at least one block variable in the control model CM and that of corresponding at least one program variable in the control program CP are automatically uniformed based on the variable correspondence information CI2 each time both the simulation of the control model CM and the control program CP reach any check start points corresponding to each other. This makes uniform the initial values of the block variables of the control model CM and those of corresponding program variables of the control program CP. This automatic uniform operation makes possible to improve the check whether the control model CM and the control program CP contain bugs.

As a sixth effect, the association instruction unit 26 is configured to automatically output, each time the simulation reaches one of the check termination points in the control model CM, the values of the block variables maintained in the control model CM at one of the check termination points. Similarly, the association instruction unit 26 is configured to automatically output, each time the execution reaches one of the check termination points in the control program CP, the values of the program variables maintained in the control program CP at one of the check termination points. These automatic output operations make it possible to simply check whether the control model CM and the control program CP contain bugs. For example, the values of the variables maintained in each of the control model CM and the control program CP at one of the check termination points can be automatically stored in, for example, the storage unit 29, and/or automatically displayed on, for example, the displaying unit 28.

These automatic output operations permit the user itself to compare the values of the variables maintained in one of the control model CM and the control program CP with those of the variables maintained in the other thereof to check that the control model CM and the control program CP contain bugs. These automatic output operations also make it possible to improve the efficiency of checking that the control model CM and the control program CP contain bugs.

As a seventh effect, the values of the block variables obtained by the simulation and maintained in the control model CM at the check termination point are compared with those of the program variables obtained by the execution of the control program CP and maintained at the check termination point therein based on the variable correspondence information CI2. This permits a bug due to a difference between a value of at least one block variable in the control model CM and that of corresponding at least one program variable in the control program CP to be accurately detected.

As an eighth effect, whether a difference between a value of at least one block variable maintained in the control model CM and that of corresponding at least one program variable maintained in the control program CP is kept within a predetermined tolerance is automatically determined for checking that the control model CM and the control program CP contain bugs.

That is, let us consider a case that the operation accuracy in the simulation of the simulation unit is different from that of the ECU 21 in the computer program's execution so that the values obtained by the simulation of the control model CM are slightly different from those obtained by the execution of the control program CP. Even in such a case, appropriately determining the predetermined tolerance allows the slightly difference to be automatically accurately detected, making it possible to check that the control model CM and the control program CP contain bugs.

As a ninth effect, storing the checked result obtained by the comparing unit 27 in the storage unit 29 permits effective management of the checked result (checked data), making it possible to improve the efficiency of the data management and development of control programs.

As a tenth embodiment, visually displaying the checked result by the displaying unit 28 (see steps S362 and S363 in FIG. 10) allows the user to easily recognize the checked result.

Second Embodiment

A check method, a check system, and a check program product according to a second embodiment of the present invention will be described hereinafter.

In the second embodiment, the invention is applied to the check method, the check system, and the check program product, which are capable of checking at least one of a control model and a control program generated based on the control model. The control program is installable in an ECU for controlling an engine.

In the second embodiment, as set forth above, the operation in step S3 of FIG. 1, that is, the checking and debugging of the control model and the control program installed in the electronic control unit will be mainly explained in detail hereinafter.

A check system 1A according to the second embodiment used for generating and checking at least one of the control model and the control program shown in step S3 of FIG. 1 has a structure substantially identical with that of the check system 1 shown in FIG. 2A. Explanations of the elements of the check system 1A according to the second embodiment, therefore, are omitted or simplified.

In the second embodiment, similar to the first embodiment (see FIG. 2A), the control model CM to be checked, which is illustrated in FIG. 3, is stored in the model storage unit 10. The correspondence information CI representing the correspondent relationship between the control model CM and the control program CP, which is illustrated in FIG. 5, is stored in the storing unit 18. The control program CP to be checked, which corresponds to the control model CM and the correspondence information CI, is stored in the storage medium SM. The storage medium SM is installed in the ECU 21.

When starting to check the control model CM and the control program CP, one of the first and second check sections is established in one of the control model CM and the control program CP; the other of the first and second check sections is established in the other thereof (see FIG. 6). In the second embodiment, similar to the first embodiment, the check start and terminate points are set as, for example, breakpoints, respectively.

Each of first and second check sections (the check start point and the check termination point) is often widely established, for example, in each block or a group of the sequent blocks.

The second embodiment, for further improving the flexibility in establishing the check sections, provides a user with an interface with a high flexibility in establishing check points in arbitrary places of the control model CM and the control program CP like the user taps a probe on an arbitrary point in, for example, an electronic circuit.

Specifically, in the second embodiment, at least one first in-process monitor point is established within the first check section established in one of the control model CM and the control program CP. In addition, at least one second in-process monitor point is established within the second check section established in the other of the control model CM and the control program CP.

Each of the first and second in-process monitor points allows the association instruction unit 26 to monitor the values of the variables in each of the control model CM and the control program CP at each of the first and second in-process monitor points therein without interrupting each of the simulation and the program's execution.

That is, after the first and second check sections are established in the control model CM and the control program CP in no particular order, in response to, for example, externally entered instructions, the check section instruction unit 24 provides an instruction to one of the simulation unit 20 and the execution control unit 22. The instruction causes one of the simulation unit 20 and the execution control unit 22 to establish the first in-process monitor point in a corresponding one of the control model CM and the control program CP. The one of the simulation unit 20 and the execution control unit 22 establishes the first in-process monitor point within one of the first and second check sections in the corresponding one of the control model CM and the control program CP.

When detecting the establishment of the first in-process monitor point, the association instruction unit 26 instructs the other of the simulation unit 20 and the execution control unit 22 to establish the second in-process monitor point in the other of the control model CM and the control program CP based on the execution address correspondence information CI1. This results in that the first in-process monitor point established in the one of the control model CM and the control program CP is associated with the second in-process monitor point in the other thereof.

In the second embodiment, the in-process monitor points established in the control model CM and the control program CP allow the association instruction unit 26 to monitor the values of the block variables and the program variables in the control model CM and the control program CP at the corresponding in-process monitor points, respectively, without interrupting the simulation of the control model CM and the program's execution. The association instruction unit 26 outputs the monitored values of the block and, program variables to a data file prepared in the external storage 100b.

The comparing unit 27 is configured to compare the values of the program variables at an in-process monitor points in the control program CP with those of corresponding block variables at a corresponding in-process monitor point in the control model CM based on the variable correspondence information CI2 (see FIG. 5). The compared result by the comparing unit 27 allows determination of whether the control model CM and the control program CP contain bugs.

That is, it is unnecessary to wait the control model CM and the control program CP at each of the in-process monitor points for checking whether the control model CM and the control program CP have bugs. Establishment of the in-process monitor points at desired points in the control program CP and corresponding points in the control model CM therefore allows providing fine-grained check of the control model CM and the control program CP. Moreover, the structure of the second embodiment permits further improvement of the convenience of users when checking the control model CM and the control program CP and smoothness of checking them.

Figure 11:
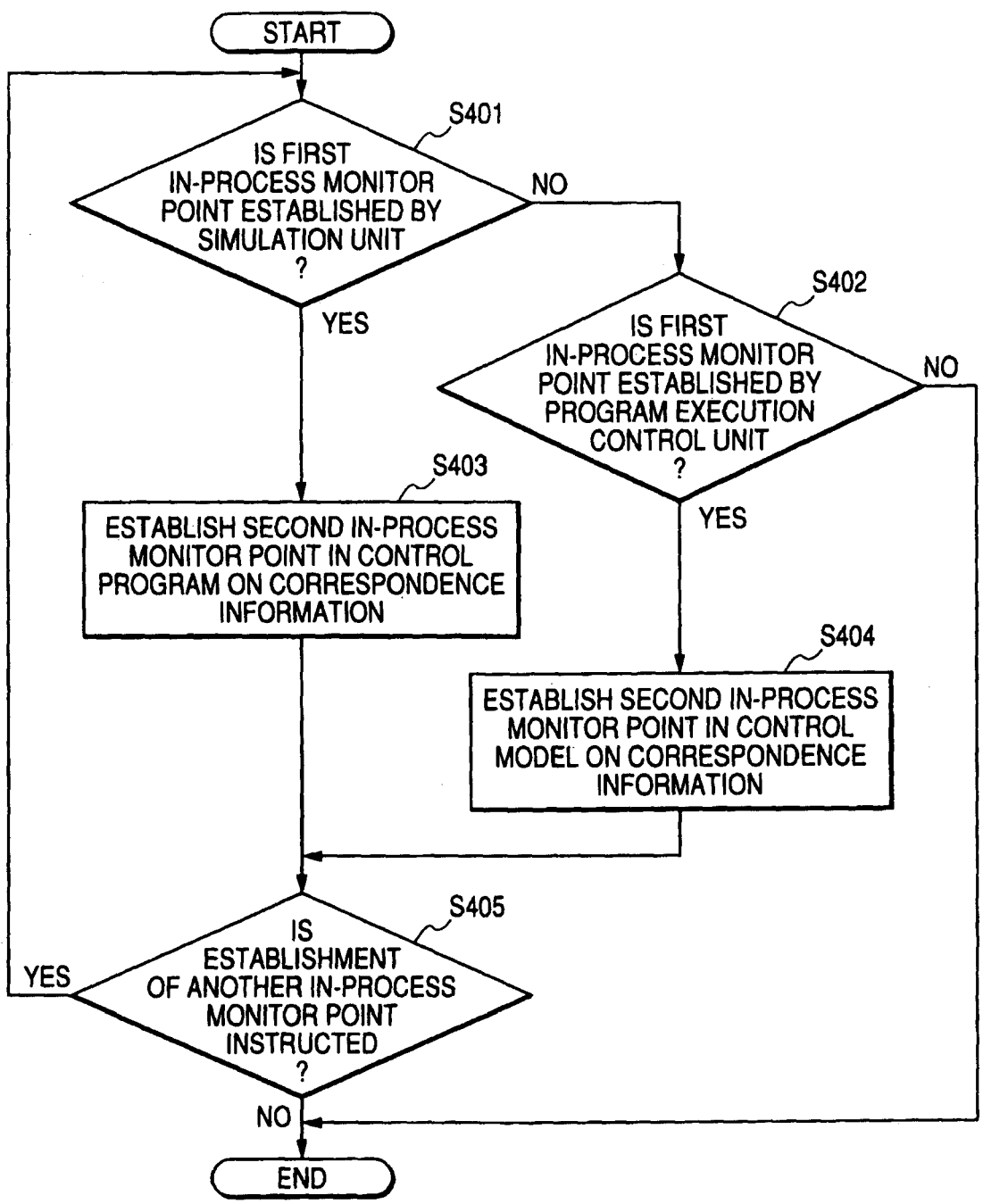
FIG. 11 is a flowchart schematically illustrating check section establishing actions of an association instruction unit shown in FIG. 2A according to a second embodiment of the present invention.
Figure 13:
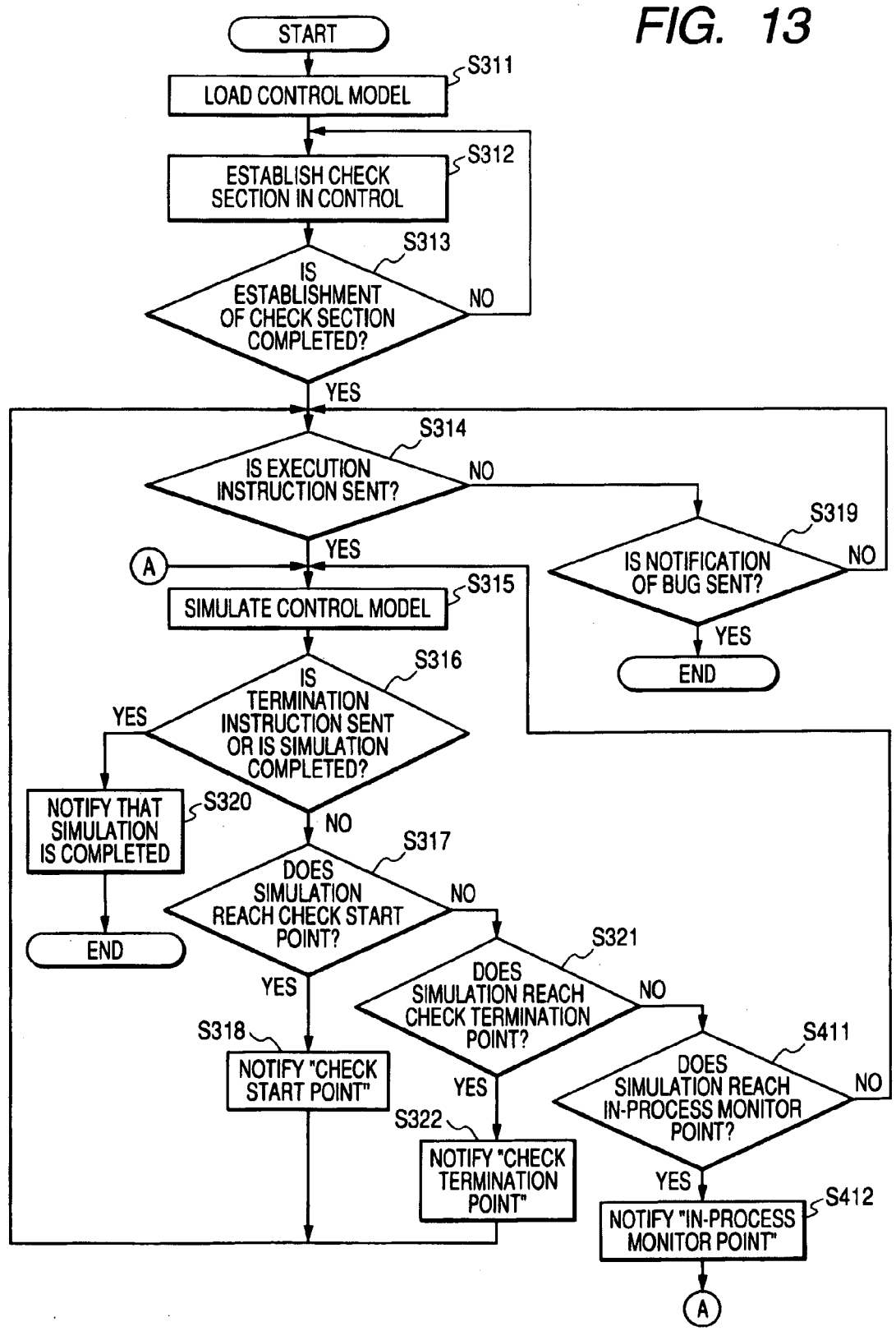
Figure 14:
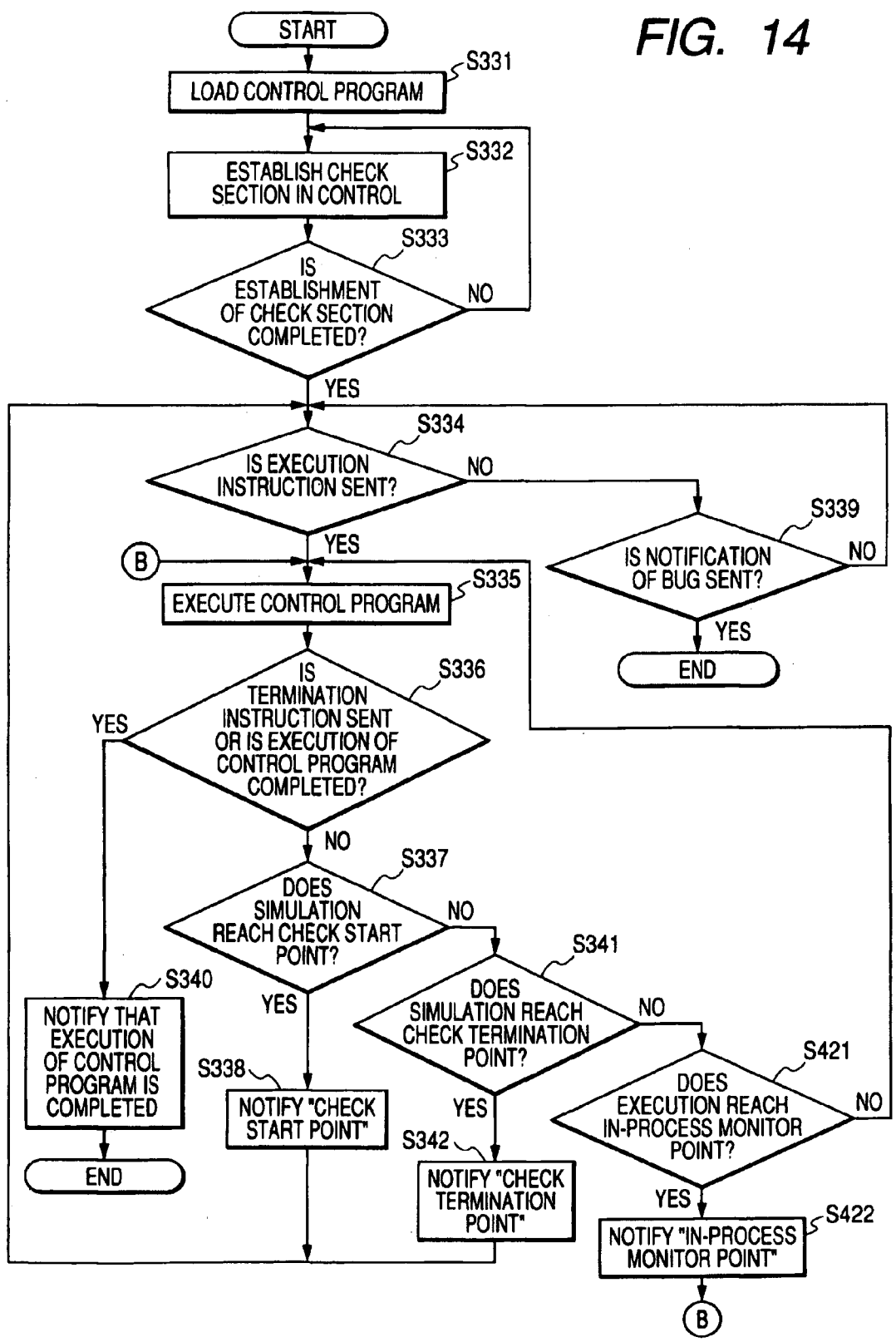

FIG. 11 illustrates the in-process monitor point establishing actions of the association instruction unit 26 as a flowchart. The in-process monitor point establishing actions of the association instruction unit 26 are preferably performed in response to when the first and second check sections are established in the control model CM and the control program CP in no particular order. The in-process monitor point establishing processes of the association instruction unit 26 can be periodically performed in an arbitrary cycle.

As shown in FIG. 11, the association instruction unit 26 accesses the simulation unit 20 to determine whether the first in-process monitor point is established by the simulation unit 20 in step S401.

When determining that the first in-process monitor point is not established by the simulation unit 20, that is, the determination in step S401 is NO, the association instruction unit 26 accesses the execution control unit 22 to determine whether the first in-process monitor point is established by the execution control unit 22 in step S402.

When determining that the first in-process monitor point is established in the control model CM by the simulation unit 20, that is, the determination in step S401 is YES, the association instruction unit 26 references the execution address correspondence information CI1 stored in the storing unit 18. The association instruction unit 26 identifies an address of the second in-process monitor point corresponding to the first in-process monitor point established in the control model CM based on the reference result. According to the identification, the association instruction unit 26 instructs the execution control unit 22 to establish the second in-process monitor point at the identified address in the control program CP stored in the storage medium SM installed in the ECU 21 in step S403. After the operation in step S403 is completed, the association instruction unit 26 shifts to step S405.

When determining that the first in-process monitor point is established in the control program CP by the execution control unit 22, that is, the determination in step S402 is YES, the association instruction unit 26 references the execution address correspondence information CI1 stored in the storing unit 18. The association instruction unit 26 identifies the address of the second in-process monitor point corresponding to the first in-process monitor point established in the control program CP based on the reference result, thereby instructing the simulating unit 20 to establish the second in-process monitor point at the identified address in the control model CM in step S404. After the operation in step S404 is completed, the association instruction unit 26 shifts to step S405.

In step S405, the association instruction unit 26 determines whether an establishment of another in-process monitor point is externally instructed, for example. When determining that the establishment of another in-process monitor point is externally instructed, the association instruction unit 26 returns to step S401, repeatedly executing the steps S401 to S405 unless the establishment of another in-process monitor point is externally instructed.

When determining that the first in-process monitor point is not established by the execution control unit 22, that is, the determination in step S402 is NO, or when determining that the establishment of another in-process monitor point is not externally instructed, the association instruction unit 16 terminates the sequence of the in-process monitor point establishing actions.

Specifically, one of the first and second in-process monitor points can be established in the control model CM at each of the blocks B1 to B7 or a group of the sequent blocks where no check start and termination points are established. The other of the first and second in-process monitor points can be established in the control program CP at each of the instructions I1 to I6 (each of the labels L1 to L6) or a group of sequent instructions where no check start and termination points are established. The one of the first and second in-process monitor points in the control program CP functionally corresponds to the other of first and second in-process monitor points in the control model CM.

Figure 12B:
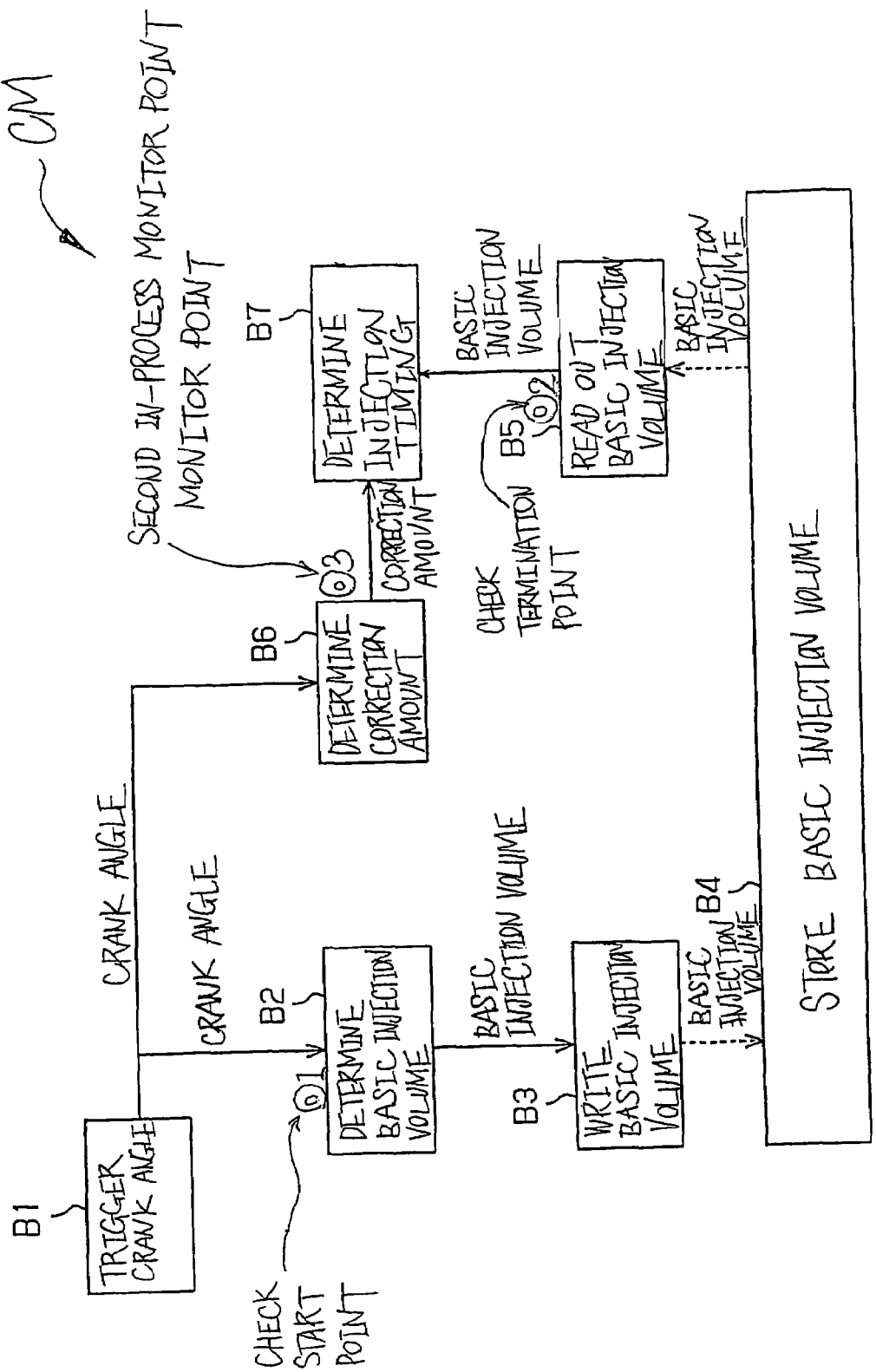
FIG. 12B is a block diagram schematically illustrating a block diagram schematically illustrating an example of the control model and a second in-process monitor point established in the control model according to the second embodiment of the present invention.

For example, FIG. 12A illustrates the first in-process monitor point MP established to the instruction I3 (the label L3) in the control program CP. In this case, FIG. 12B schematically illustrates the second in-process monitor point ⊚3 established to the block B6 in the control model CM. The second in-process monitor point ⊚3 in the control CM is associated with the first in-process monitor point MP in the control program CP.

Next, the actions of the simulation unit 20 according to the second embodiment will be described hereinafter with reference to FIG. 13.

Figure 13:
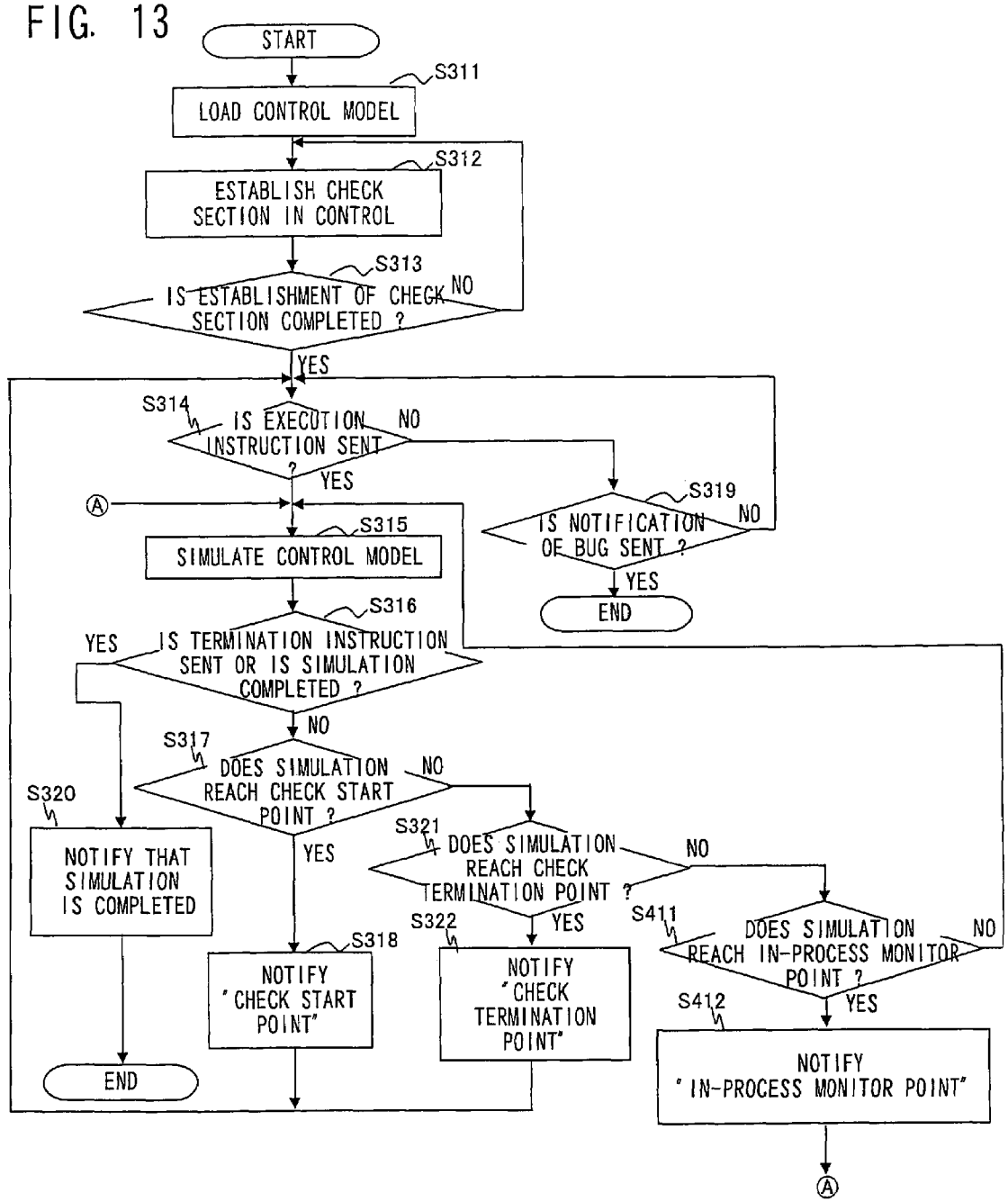
FIG. 13 is a flowchart schematically illustrating actions of a simulation unit according to the second embodiment.

FIG. 13 is a flowchart illustrating the actions of the simulation unit 20.

In FIG. 13, the operations of the simulation unit 20 from step S311 to step S322 are substantially identical with those in FIG. 8, thereby omitting explanations thereof.

Specifically, in step S312 of FIG. 13, in addition to the establishment of the first or second check section, the simulation unit 20 establishes the first or second in-process monitor point within the established check section of the control model CM at an arbitrary place therein (see steps S401 and S404 in FIG. 11, and FIG. 12B).

In step S313, the simulation unit 20 determines whether the establishment of the first or second check section and the first or second in-process monitor point are completed. When it is determined that the establishment of both the first or second check section and the first or second in-process monitor point are not completed (the determination in step S313 is NO), the simulation unit 20 repeatedly executes the operation in step S312 until the determination in step S313 is YES.

In addition, operations of the simulation unit 20 in steps S411 and S412 are added as compared with the operations of the simulation unit 20 from step S311 to step S322.

That is, in step S321, it is determined that the simulation dose not reach the check termination point in the control model CM (the determination in step S321 is NO), the simulation unit 20 proceeds to step S411.

In step S411, the simulation unit 20 determines whether the simulation reaches the first or second in-process monitor point in the control model CM in step S411. When determining that the simulation does not reach the first or second in-process monitor point in the control model CM (the determination in step S411 is NO), the simulation unit 20 returns to step S315 to continue the simulation of the control model CM unless any one of the determinations in steps S316, S317, S321, and S411 is YES.

When determining that the simulation reaches the in-process monitor point in the control model CM (the determination in step S411 is YES), the simulation unit 20 provides notification representing the detection of the in-process monitor point to the association instruction unit 26 without interrupting the simulation in step S412, returning to step S315. Then, the simulation unit 20 continues the simulation of the control model CM unless any one of the determinations in steps S316, S317, S321, and S411 is YES.

Next, the actions of the execution control unit 22 according to the second embodiment will be described hereinafter with reference to FIG. 14.

Figure 14:
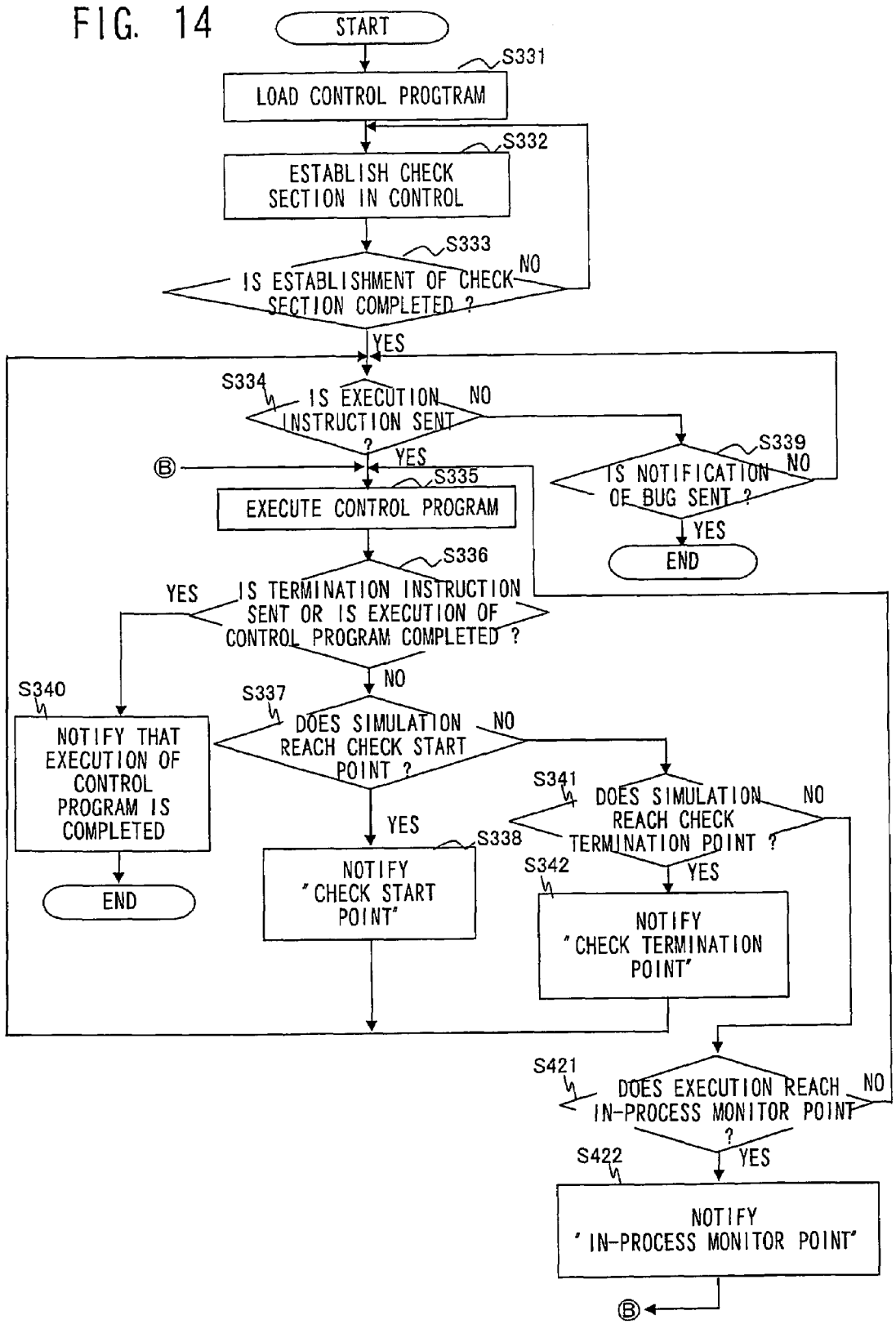
FIG. 14 is a flowchart schematically illustrating actions of an execution control unit according to the second embodiment.
Figure 3:
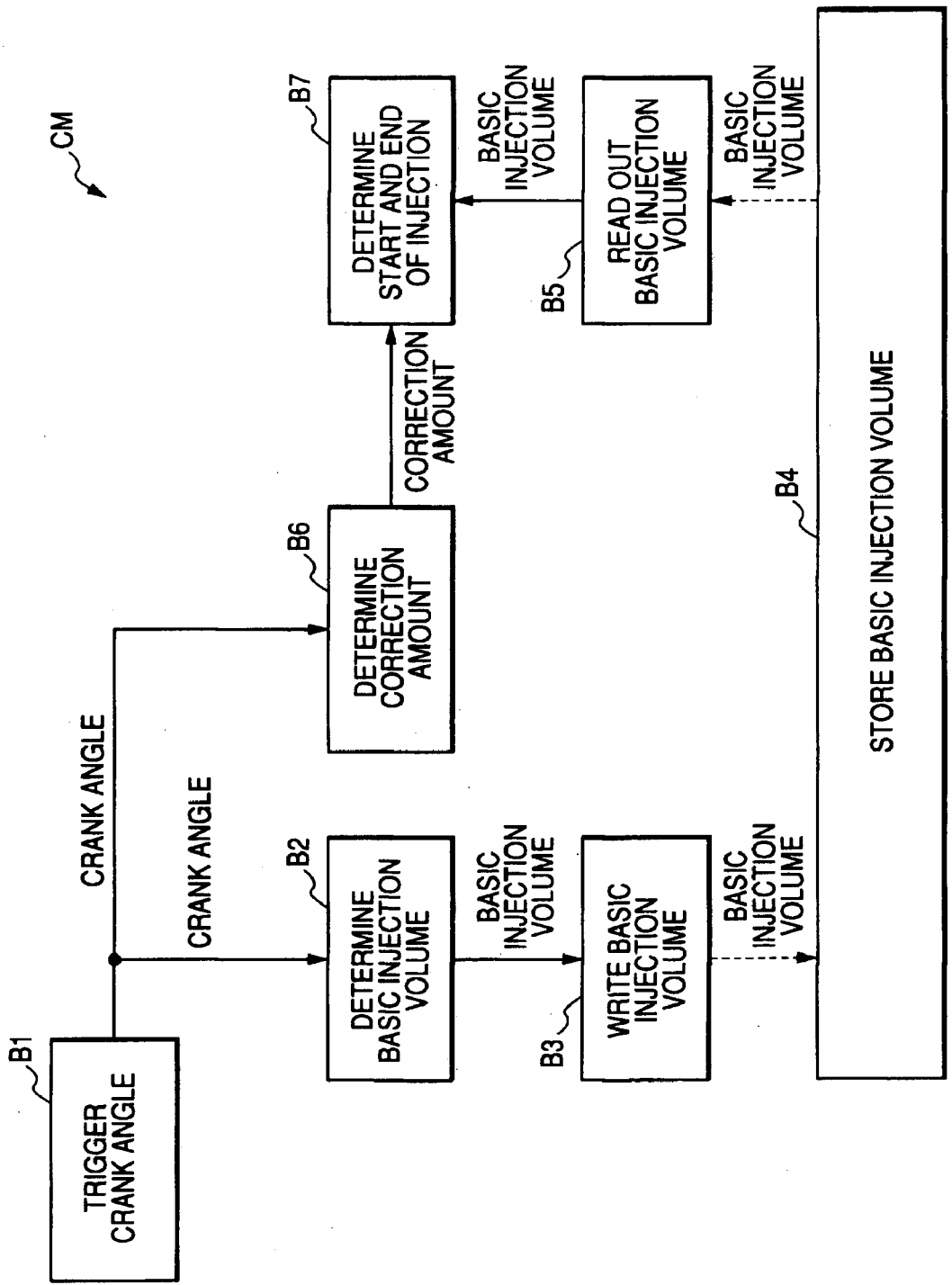
Figure 6:
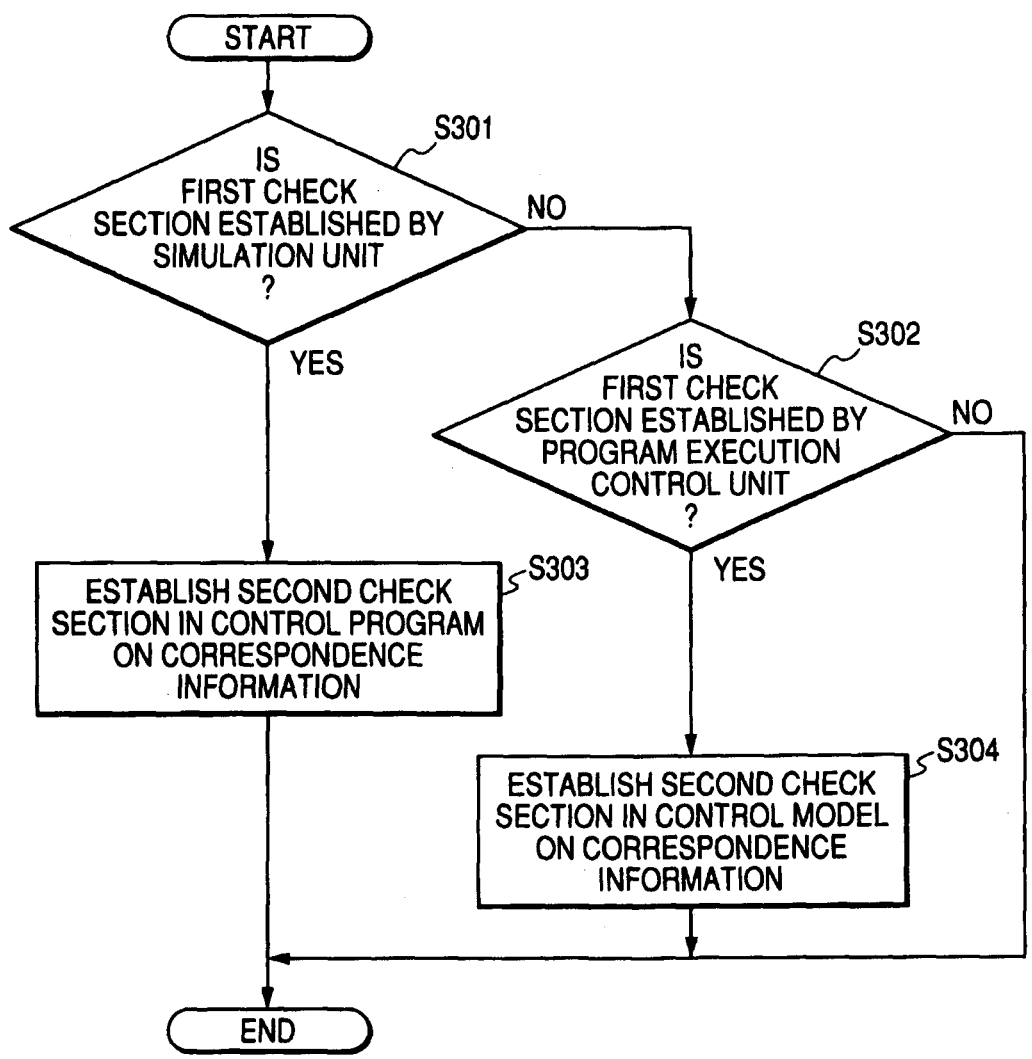
Figure 7B:
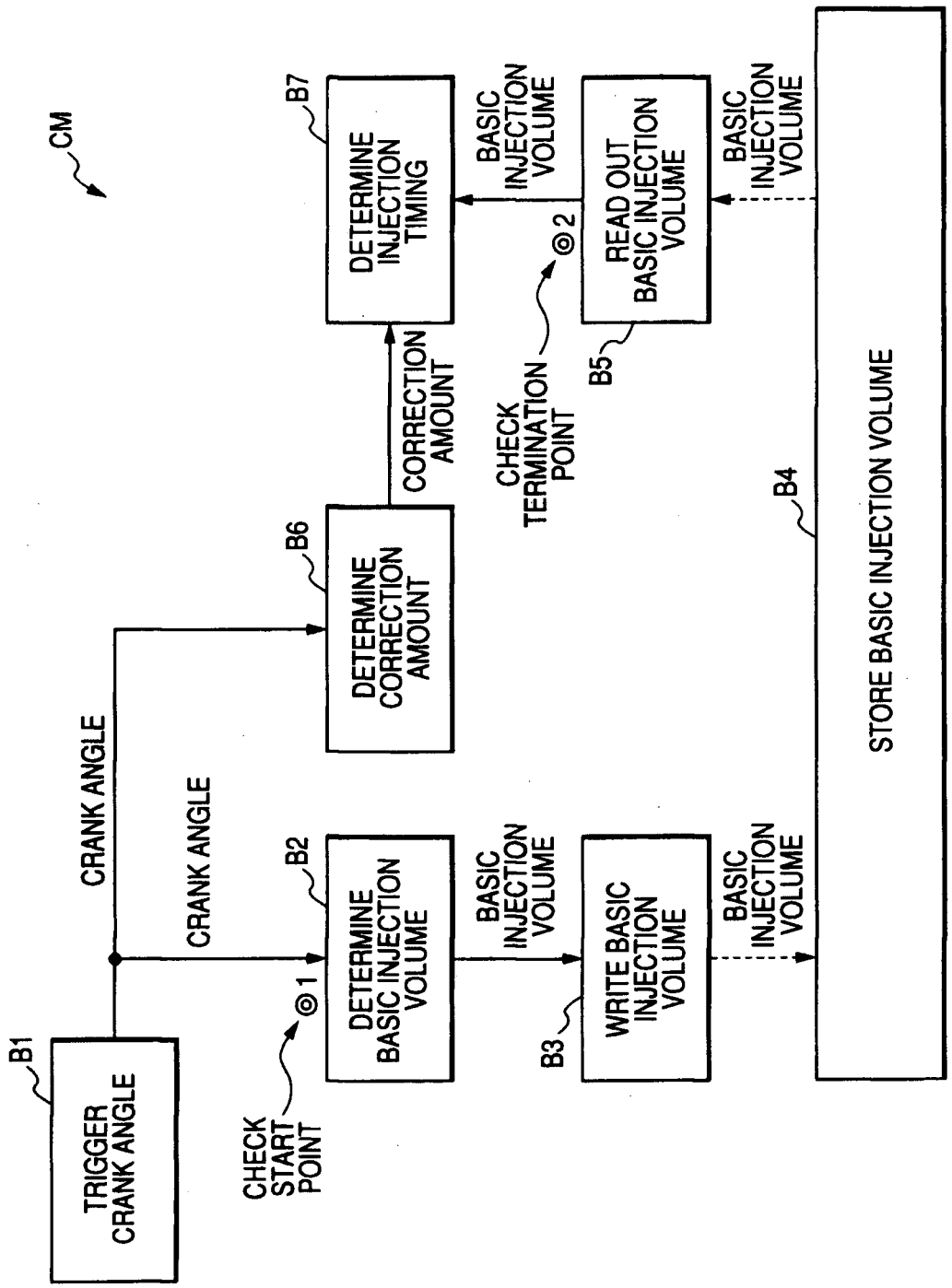

FIG. 14 is a flowchart illustrating the actions of the execution control unit 22.

In FIG. 14, the operations of the execution control unit 22 from step S331 to step S342 are substantially identical with those in FIG. 9, thereby omitting explanations thereof.

Specifically, in step S332 of FIG. 14, in addition to the establishment of the first or second check section, the execution control unit 22 establishes the first or second in-process monitor point within the established check section of the control program CP at an arbitrary place therein (see steps S402 and S403 in FIG. 11, and FIG. 12A).

In step S333, the execution control unit 20 determines whether the establishment of the first or second check section and the first or second in-process monitor point are completed. When it is determined that the establishment of both the first or second check section and the first or second in-process monitor point are not completed (the determination in step S333 is NO), the execution control unit 22 repeatedly executes the operation in step S332 until the determination in step S333 is YES.

In addition, operations of the execution control unit 22 in steps S421 and S422 are added as compared with the operations of the execution control unit 22 from step S331 to step S342.

That is, it is determined that the simulation dose not reach the check termination point in the control program CP (the determination in step S341 is NO), the execution control unit 22 proceeds to step S421.

In step S421, the execution control unit 22 determines whether the execution reaches the first or second in-process monitor point in the control program CP. When determining that the execution does not reach the first or second in-process monitor point in the control program CP (the determination in step S421 is NO), the simulation unit 20 returns to step S335 to continue the simulation of the control model CM unless any one of the determinations in steps S336, S337, S341, and S421 is YES.

When determining that the execution reaches the in-process monitor point in the control program CP (the determination in step S421 is YES), the execution control unit 22 provides notification representing the detection of the in-process monitor point without interrupting the execution of the control program CP, returning to step S335. Then, the execution control unit 22 continues the execution of the control program CP unless any one of the determinations in steps S336, S337, S341, and S421 is YES.

Next, the operations of the association instruction unit 26 and those of the comparing unit 27 will be described hereinafter with reference to FIG. 15 while particularly emphasizing the difference points between the first and second embodiments.

Figure 15:
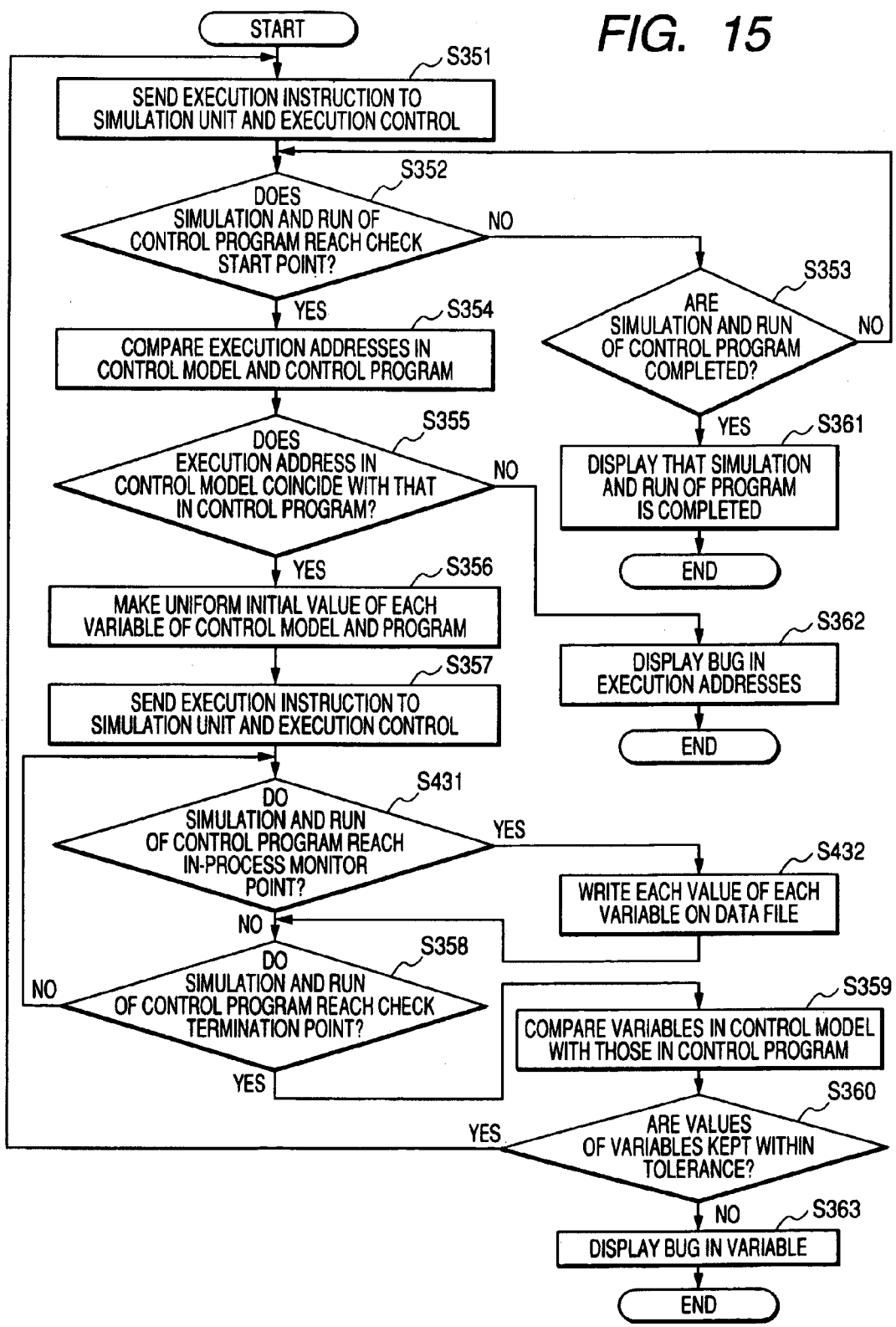
FIG. 15 is a flowchart schematically illustrating operations of an association instruction unit and those of a comparing unit according to the second embodiment.

FIG. 15 illustrates the operations of the association instruction unit 26 and those of the comparing unit 27 according to the second embodiment as a flowchart.

In FIG. 15, the operations of the association instruction unit 26 and the comparing unit 27 from step S351 to step S363 are substantially identical with those in FIG. 10, thereby omitting explanations thereof.

In addition, operations of the association instruction unit 26 in steps S431 and S432 are added as compared with the operations of the association instruction unit 26 from step S351 to step S363.

That is, after sending the execution instruction to the simulation unit 20, and the execution instruction to the execution control unit 22, the association instruction unit 26 shifts to step S431. In step S431, the association instruction unit 26 determines whether the notification representing the detection of the in-process monitor point is sent from each of the simulation unit 20 and the execution control unit 22. When determining that the notification representing the detection of the in-process monitor point is not sent from each of the simulation unit 20 and the execution control unit 22, the determination in step S431 is NO. The simulation of the control model CM, therefore, continues until the simulation reaches the first or second in-process monitor point or the check termination point in the control model CM (see steps S314-S317, S321-S322, S411-S412 in FIG. 13). Similarly, the execution reaches the first or second in-process monitor point or the check termination point in the control program CP (see steps S334-S337, S341-S342, S421-S422 in FIG. 14).

On the other hand, when determining that the notification representing the detection of the in-process monitor point is sent from each of the simulation unit 20 and the execution control unit 22, the determination in step S431 is YES, the association instruction unit 26 shifts to step S432.

In step S432, the association instruction unit 26 writes, to a data file prepared in, for example, the external storage 100b, the values of the block variables maintained at the first or second in-process monitor point in the control model CM. Moreover, in step S432, the association instruction unit 26 writes, to the data file, the values of the program variables maintained at the first or second in-process monitor point in the control program CP. These writing operations of the association instruction unit 26 are executed without interrupting the simulation and the execution of the control program CP. After the writing operations, the association instruction unit 26 proceeds to step S358.

The association instruction unit 26 may visually display, on, for example, display apparatus 100c, the values of the block variables maintained at the first or second in-process monitor point in the control model CM and those of the program variables maintained at the corresponding in-process monitor point in the control program CP.

Incidentally, it is assumed that the first in-process monitor points are established in one of the control model CM and the control program CP and the second in-process monitor points are established in the other thereof.

In this assumption, the association instruction unit 26 allows, each time the simulation reaches one of the in-process monitor points in the control model CM, the values of the block variables maintained in the control model CM at the one of the in-process monitor points to be written on the data file. Similarly, in this assumption, the association instruction unit 26 allows, each time the execution reaches one of the in-process monitor points in the control program CP, the values of the program variables maintained in the control program CP at one of the in-process monitor points to be automatically written on the data file.

The values of the block variables in the control model CM and those of the program variables in the control program CP are stored in the one ore more data files to be associated with each other depending on their corresponding in-process monitor points.

Therefore, when receiving the notification representing the interruption point corresponding to the check termination point and sent from each of the simulation unit 20 and the execution control unit 22 (the determination in step S358 is YES), the association instruction unit 26 shifts to steps S359 and S360.

In step S359, the association instruction unit 26 refers to the variable correspondence information CI2 to confirm the correspondent relationships between the block variables at the check termination point in the control model CM and program variables at the check termination point in the control program CP based on the referred result.

In the second embodiment, in addition to the operation, the association instruction unit 26 refers to the variable correspondence information CI2 to confirm the correspondent relationships between the block variables and the program variables written at the in-process monitor point based on the referred result.

In step S360, in addition to the comparison between the value of each block variable maintained at the check termination point in the control model CM and that of corresponding each program variable maintained at the check termination point in the control program CP, the comparing unit 27 executes another comparison. That is, the comparing unit 27 compares a value of each block variable stored in the data file with that of corresponding each program variable stored in the data file.

Preferably, the comparing unit 27 determines whether a difference between a value of each block variable stored in the data file and that of corresponding each program variable stored in the data file is kept within a predetermined tolerance.

The compared result, such as the determination result is stored in the storage unit 29 and/or visually displayed on the displaying unit 28 in the same manner of the first embodiment.

As described above, similar to the first embodiment, even if at least one bug occurs in the sequence of instructions in the control program CP generated based on the control model CM or in the control program CP itself, the check system 1A according to the second embodiment allows detection of the at least one bug.

The ECU 21, therefore, allows debugging of the at least one bug contained in at least one of the control model CM and the control program CP (see step S3 in FIG. 1).

The operations after the checking operations by the check system 1A according to the second embodiment are omitted because the operations are the same as those in the first embodiment (see step S4 and steps S1 and/or S2 in FIG. 1).

As set forth above in detail, similar to the first embodiment, the check method, the check system 1A, and the check program P3 for the control model CM and the control program CP according to the second embodiment have the following new effects with substantially keeping the first to tenth effects.

As an eleventh effect, the one or more in-process monitor points are established in the control model CM and the control program CP, respectively, so that the one or more in-process monitor points established in the control model CM and those established in the control program CP correspond to each other. This allows improvement of the flexibility in determining one or more check points where the check of each of the control model CM and the control program CP is executed. In addition, even if the control program CP to be checked is part of a large-scaled control program installed in the ECU 21, such as the control program module CP, it is possible to simply associate the one ore more in-process monitor points established in the control model CM with those established in the control program CP.

As a twelfth effect, the association instruction unit 26 is configured to output, each time the simulation reaches one of the in-process monitor points in the control model CM, the values of the block variables maintained in the control model CM at the one of the in-process monitor points. Similarly, the association instruction unit 26 is configured to automatically output, each time the execution reaches one of the in-process monitor points in the control program CP, the values of the program variables maintained in the control program CP at one of the in-process monitor points. This makes it possible to simply check whether the control model CM and the control program CP contain bugs. In addition, these automatic output operations make it possible to improve the efficiency of checking that the control model CM and the control program CP contain bugs.

As a thirteenth effect, the first or second in-process monitor point can be established in the control model CM at an arbitrary point, such as each block. Similarly, the first or second in-process monitor point can be established in the control program CP at an arbitrary point, such as each instruction point (each label L1 to L5). These establishments allow, even if a plurality of blocks in the control model CM defines a new sequence of the instructions, the control model CM to be simply associated with the control program CP.

As a fourteenth effect, the values of the block variables obtained by the simulation and maintained in the control model CM at the in-process monitor point are compared with those of the program variables that are obtained by the execution of the control program CP and maintained at the in-process monitor point therein based on the variable correspondence information CI2. This permits a bug due to a difference between a value of at least one block variable in the control model CM and that of corresponding at least one program variable in the control program CP to be accurately detected.

As a fifteenth effect, whether a difference between a value of each block variable obtained at the in-process point and that of corresponding each program variable obtained at the in-process point therein is kept within a predetermined tolerance is automatically determined for checking that the control model CM and the control program CP contain bugs. Appropriately determining the predetermined tolerance allows the automatic determination of the variables of the block and program variables to be accurately executed.

As a sixteenth effect, the checked result obtained by the comparison between the values of the block variables in the control model CM at the in-process monitor point therein and those of the program variables in the control program CP at the in-process monitor point therein is stored in the storage unit 29. This allows the checked result to be easily managed, thereby improving the efficiency of the data management of the checked result and development of programs.

As a seventeenth effect, visually displaying the checked result by the displaying unit 28 allows the user to easily recognize the checked result.

Third Embodiment

A check method, a check system, and a check program product according to a third embodiment of the present invention will be described hereinafter.

In the third embodiment, the invention is applied to the check method, the check system, and the check program product, which are capable of checking at least one of a control model and a control program generated based on the control model. The control program is installable in an ECU for controlling an engine.

A check system 1B according to the third embodiment used for generating and checking at least one of the control model and the control program shown in step S3 of FIG. 1 has a structure substantially identical with that of the check system 1 shown in FIG. 2A. Explanations of the elements of the check system 1B according to the third embodiment, therefore, are omitted or simplified.

In the third embodiment, identical to the first embodiment (see FIG. 2A), the control model CM to be checked, which is illustrated in FIG. 3, is stored in the model storage unit 10. The correspondence information CI representing the correspondent relationship between the control model CM and the control program CP, which is illustrated in FIG. 5, is stored in the storing unit 18. The control program CP to be checked, which corresponds to the control model CM and the correspondence information CI, is stored in the storage medium SM. The storage medium SM is installed in the ECU 21.

In the first and second embodiments, when starting to check the control model CM and the control program CP, one of the first and second check sections is established in one of the control model CM and the control program CP; the other of the first and second check sections is established in the other thereof (see FIG. 6).

In the first and second embodiments, while the control program CP is installed in the ECU 21, the characteristic of the RTOS may cause the simulation execution of the control program to get to the established check section therein earlier than the simulation to a corresponding established check section in the control model CM. This may cause the execution of the control program to shift to a waiting state so that the execution may be interrupted.

The third embodiment is designed, for preventing the execution of the control program CP from being interrupted, to establish the first and second check sections in the control program CP and control model CM with the use of the in-process monitor points, respectively.

In the third embodiment, each of the first or second in-process monitor points established in the control program CP allows the association instruction unit 26 to monitor the values of the program variables at each of the first or second in-process monitor points in the control program CP without interrupting the program's execution. The association instruction unit 26 outputs the monitored values of the program variables to a data file prepared in the external storage 100b.

The comparing unit 27 is configured to compare the values of the program variables at an in-process monitor point in the control program CP with those of corresponding block variables at a corresponding in-process monitor point in the control model CM. The compared result by the comparing unit 27 allows determination of whether the control model CM and the control program CP contain bugs.

If, therefore, the execution of the control program CP gets to an established in-process monitor point therein earlier than the simulation to a corresponding established in-process monitor point in the control model CM, the execution of the computer program CP can continue. This makes it possible to prevent the control program from returning to its initial state.

In contrast, when the simulation gets to an established in-process monitor point in the control model CM earlier than the execution of the control program CP to a corresponding established in-process monitor point therein, the simulation can wait for the arrival of the computer program CP at the established in-monitor point.

It is considered that the simulation of the control model CM may get to an in-process monitor point therein earlier than the execution of the control program CP to a corresponding in-process monitor point therein. This is because the at least one computer 100a of the computer system 100 in which the simulation unit 20 and the execution control unit 22 are implemented is commonly faster sufficiently than the at least one microcomputer installed in the ECU 21.

Next, the overall operations of the check system 1B according to the third embodiment will be described hereinafter with reference to FIGS. 16 to 18.

Prior to the start of checking the control model CM and the control program CP, plurality of first in-process monitor points in place of the check start and termination points are established in one of the control model CM and the control program so that plurality of second the in-process monitor points are automatically established in the other thereof. The first in-process monitor points are associated with the second in-process monitor points, respectively. The establishment operations of the in-process monitor points are substantially identical with those of the in-process monitor points according to the second embodiment (see FIG. 11), thereby omitting the descriptions of them.

At first, the actions of the simulation unit 20 according to the third embodiment will be described hereinafter with reference to FIG. 16.

Figure 16:
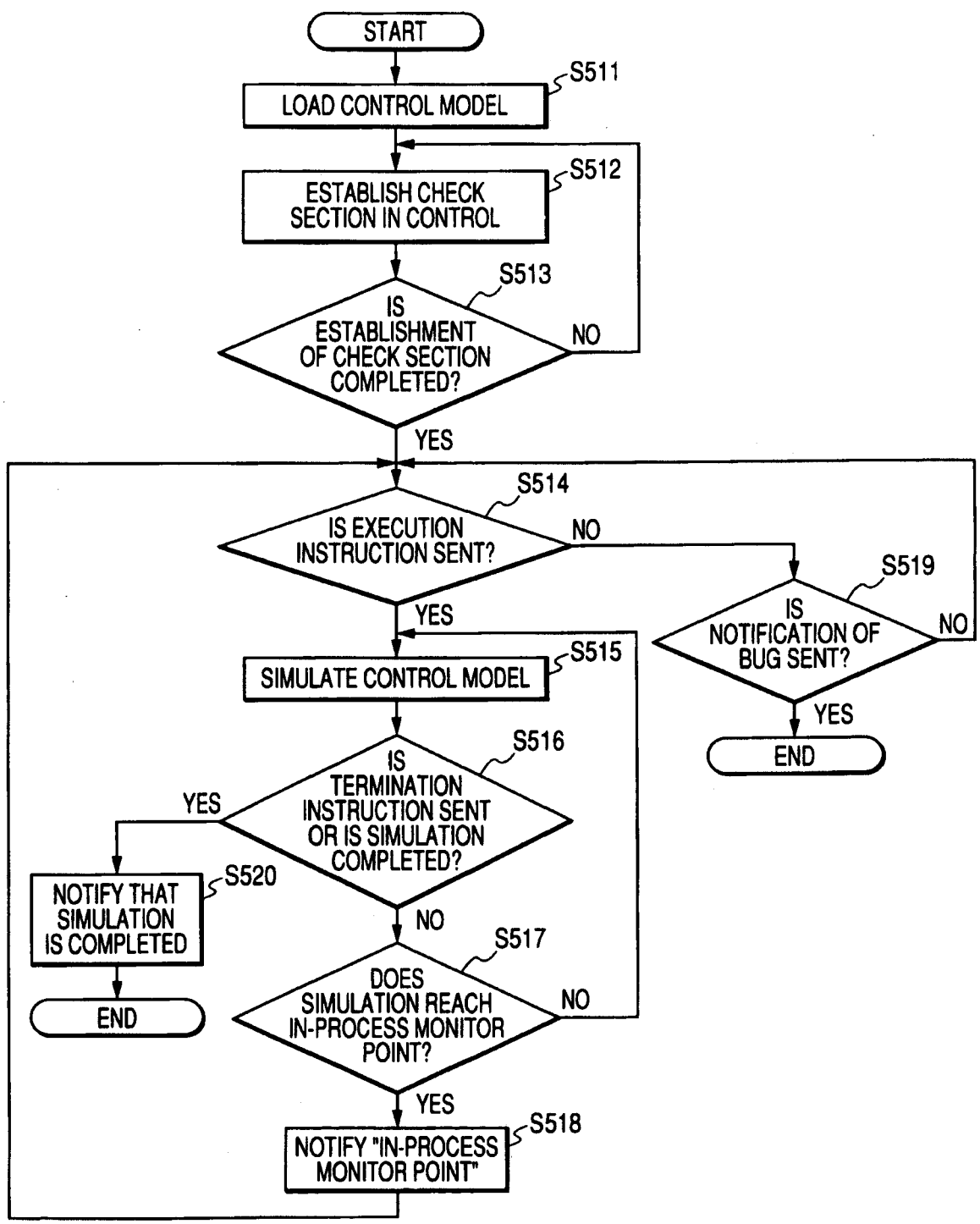
FIG. 16 is a flowchart schematically illustrating actions of a simulation unit according to a third embodiment.

FIG. 16 is a flowchart illustrating the actions of the simulation unit 20.

In FIG. 16, the simulation unit 20 loads the control model CM stored in the model storage unit 10 in step S511. Subsequently, the simulation unit 20 establishes, for example, a plurality of check sections (the first or second in-process monitor points) in the control model CM (see steps S401 and S404 in FIG. 11, and FIG. 12B).

In step S513, the simulation unit 20 determines whether the establishment of the check sections (first or second in-process monitor points) is completed. When it is determined that the establishment of the check sections is completed (the determination in step S513 is YES), the simulation unit 20 waits to receive an execution instruction from the association instruction unit 26.

That is, the simulation unit 20 determines whether the execution instruction is sent from the association instruction unit 26 in step S514. When it is determined that the execution instruction is not sent from the association instruction unit 26 (the determination in step S514 is NO), the simulation unit 20 determines whether the notification of a bug is sent from the association instruction unit 26 in step S519.

When it is determined that the notification of a bug is not sent from the association instruction unit 26 (the determination in step S519 is NO), the simulation unit 20 waits for receiving the execution instruction from the association instruction unit 26 in step S514.

While the simulation unit 20 waits to receive the execution instruction from the association instruction unit 26, when the execution instruction is sent from the association instruction unit 26, the determination in step S514 is YES. Then, the simulation unit 20 simulates the loaded control model CM based on the artificial sensor signals and input data described hereinafter in step S515. The artificial sensor signals are provided from the signal generating unit 23 to the simulation unit 20 through the ECU 21, the execution control unit 22, and the association instruction unit 26.

Subsequently the simulation unit 20 determines whether the termination instruction is sent externally or the simulation of the control model CM is completed in step S516. When determining that the termination instruction is not sent externally and the simulation of the control model is not completed (the determination in step S516 is NO), the simulation unit 20 determines whether the simulation reaches one of the check sections (in-process monitor points) in the control model CM in step S517.

When determining that the simulation does not reach one of the check sections (in-process monitor points) in the control model CM (the determination in step S517 is NO), the simulation unit 20 returns to step S515 to continue the simulation of the control model CM unless any one of the determinations in steps S516 and S517 is YES.

When determining that the simulation reaches one of the check sections (in-process monitor points) in the control model CM (the determination in step S517 is YES), the simulation unit 20 temporally interrupts the simulation and provides notification representing the detection of the in-process monitor point to the association instruction unit 26 in step S518.

In addition, in step S518, the simulation unit 20 outputs to a data file prepared in, for example, the external storage 100b, the value of each block variable held at the current in-process monitor point in the control model CM. The outputted value of each block variable held at the current in-process monitor point is stored in the data file. Incidentally, the simulation unit 20 may display information indicative of detecting the in-process monitor point on, for example, the display apparatus 100c. In addition, the simulation unit 20 may display the value of each block variable held at the current in-process monitor point in the control model CM or an initial value to be set to each block variable at the next in-process monitor point to be executed in the control model CM on, for example, the display apparatus 100c.

Then, the simulation unit 20 shifts to step S514, waiting to receive the execution instruction from the association instruction unit 26 in step S514.

During the simulation of the control model CM, when the comparing unit 27 determines that an error occurs in any one of the variables in the control model CM or in the execution address therein, the association instruction unit 26 can send the notification of a bug to the simulation unit 20.

While waiting for receiving the execution instruction from the association instruction unit 26 in steps S514 and S519, when receiving the notification of a bug sent from the association instruction unit 26, the determination in step S519 is YES. In response to the notification of a bug, the simulation unit 20 terminates the sequence of the operations and stores therein the termination address in the control model CM where the error occurs. The simulation unit 20 externally provides notification of the termination address in the control model CM through, for example, the display apparatus 100c of the computer system 100.

On the other hand, when determining that the termination instruction is sent externally or the simulation of the control model is completed (the determination in step S516 is YES), the simulation unit 20 terminates the simulation of the control model CM. Subsequently, the simulation unit 20 externally provides notification that the simulation of the control model CM is completed through, for example, the display apparatus 100c of the computer system 100 in step S520, thereby terminating the sequence of the operations.

Next, the actions of the execution control unit 22 will be described hereinafter with reference to FIG. 17.

Figure 17:
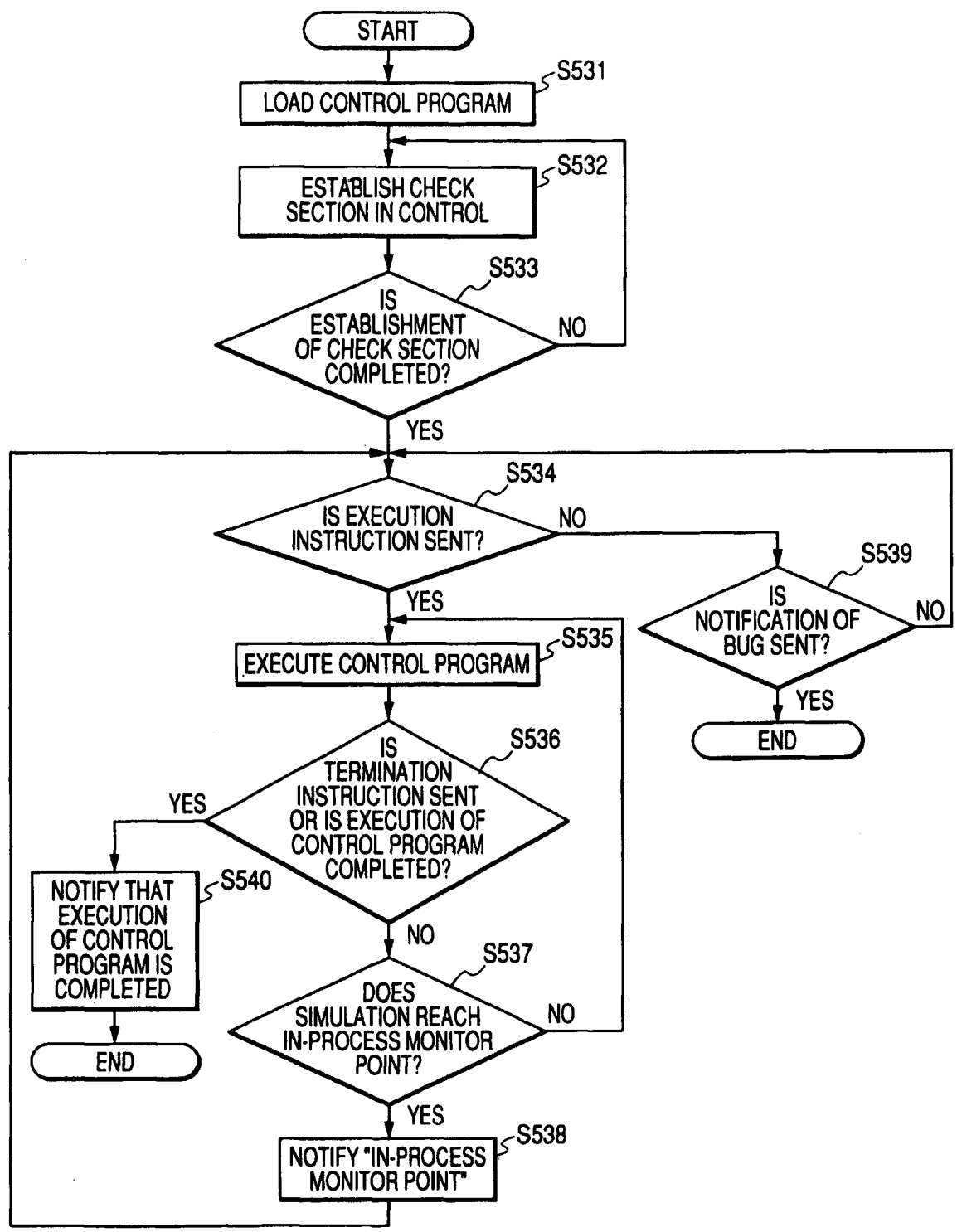
FIG. 17 is a flowchart schematically illustrating actions of an execution control unit according to the third embodiment.

FIG. 17 illustrates the actions of the execution control unit 22 as a flowchart.

In FIG. 17, the execution control unit 22 loads the computer program CP stored in the storage medium SM installed in the ECU 21 in step S531. Subsequently, the execution control unit 22 establishes, a plurality of check sections (the first or second in-process monitor points) in the control program CP (see steps S401 and S404 in FIG. 11, and FIG. 12A). In step S533, the execution control unit 22 determines whether the establishment of the check sections (first or second in-process monitor points) is completed. When it is determined that the establishment of the check sections is completed (the determination in step S533 is YES), the execution control unit 22 waits to receive an execution instruction from the association instruction unit 26.

That is, the execution control unit 22 determines whether the execution instruction is sent from the association instruction unit 26 in step S534. When it is determined that the execution instruction is not sent from the association instruction unit 26 (the determination in step S534 is NO), the execution control unit 22 determines whether the notification of a bug is sent from the association instruction unit 26 in step S539.

When it is determined that the notification of a bug is not sent from the association instruction unit 26 (the determination in step S539 is NO), the execution control unit 22 waits for receiving the execution instruction from the association instruction unit 26 in step S534.

While the execution control unit 22 waits to receive the execution instruction from the association instruction unit 26, when determining that the execution instruction is sent from the association instruction unit 26 (the determination in step S534 is YES), the execution control unit 22 instructs the ECU 21 to run the control program CP. The instruction causes the ECU 21 to run the installed control program CP based on values of the input data and input data described hereinafter in step S535. The artificial input data are provided from the signal generating unit 23 to the ECU 21.

The behavior of the run of the control program CP is monitored by the execution control unit 22. In the third embodiment, the run of the control program CP continues without interrupting from its start in response to the execution instruction in step S534.

While the control program CP is executed, the execution control unit 22 determines whether the termination instruction is sent externally or the execution of the control program CP is completed in step S536. When determining that the termination instruction is not sent externally and the execution of the control program CP is not completed (the determination in step S536 is NO), the execution control unit 22 determines whether the execution reaches one of the check sections (in-process monitor points) in the control program CP in step S537.

When determining that the execution does not reach one of the check sections in the control program CP (the determination in step S537 is NO), the execution control unit 22 returns to step S535 to continue the execution of the control program CP unless any one of the determinations in steps S536 and S537 is YES.

When determining that the execution reaches one of the check sections (in-process monitor points) in the control program CP (the determination in step S537 is YES), the execution control unit 22 provides notification representing the detection of the in-process monitor point to the association instruction unit 26 in step S538.

In addition, in step S538, the execution control unit 22 outputs to a data file prepared in, for example, the external storage 100b, the value of each program variable held at the current in-process monitor point in the control program CP. The outputted value of each program variable held at the current in-process monitor point is stored in the data file. Moreover, the execution control unit 22 outputs an initial value to be set to each program variable at the next in-process monitor point to be executed in the control program CP to, for example, the data file.

Incidentally, the execution unit 22 may display information indicative of detecting the in-process monitor point on, for example, the display apparatus 100c. In addition, the execution control unit 22 may display the value of each program variable held at the current in-process monitor point in the control program CP or the initial value to be set to each program variable at the next in-process monitor point to be executed in the control program CP on, for example, the display apparatus 100c.

During the run of the control program CP, when the comparing unit 27 determines that an error occurs in any one of the variables in the control program CP or in the instruction being executed, the association instruction unit 26 can send the notification of a bug to the execution control unit 22.

While waiting for receiving the execution instruction from the association instruction unit 26 in steps S534 and S539, when receiving the notification of a bug sent from the association instruction unit 26, the determination in step S539 is YES. In response to the notification of a bug, the execution control unit 22 terminates the sequence of the operations and storing therein the termination address in the control program CP where the error occurs. The execution control unit 22 externally provides notification of the termination address in the control program CP through, for example, the display apparatus 100c of the computer system 100.

On the other hand, when determining that the termination instruction is sent externally or the execution of the control program CP is completed (the determination in step S536 is YES), the execution control unit 22 causes the ECU 21 to terminate the execution of the control program CP. Subsequently, the execution control unit 22 externally provides notification that the execution of the control program CP is completed through, for example, the display apparatus 100c of the computer system 100 in step S540, thereby terminating the sequence of the operations.

Next, the operations of the association instruction unit 26 and those of the comparing unit 27 will be described hereinafter with reference to FIG. 18.

Figure 18:
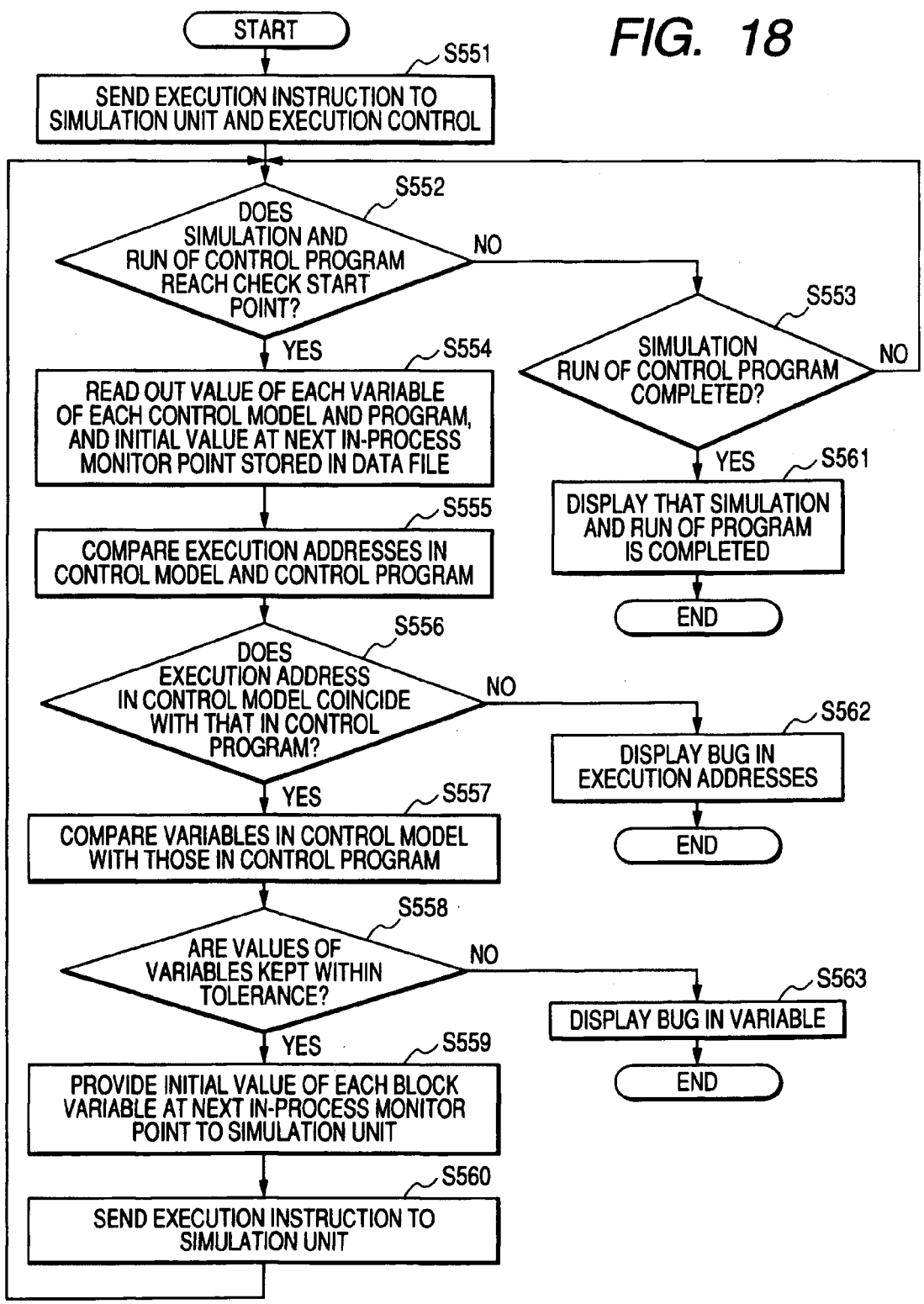
FIG. 18 is a flowchart schematically illustrating operations of an association instruction unit and those of a comparing unit according to the third embodiment.

FIG. 18 illustrates the operations of the association instruction unit 26 and those of the comparing unit 27 as a flowchart.

As set forth above, the check sections (first and second in-process monitor points) associated with each other are established in the control model CM and the control program CP in random order (see step S512 in FIG. 16 and step S532 in FIG. 17). After the establishment of the check sections, the simulation unit 20 and the execution control unit 22 shift to wait states, respectively (see step S514 in FIG. 16 and step S534 in FIG. 17).

Under the wait states of the simulation unit 20 and the execution control unit 22, the association instruction unit 26 sends the execution instruction to the simulation unit 20 to simulate the control model CM, and that to the execution control unit 22 to cause the ECU 21 to run the control program CP in step S551.

In response to the execution instructions, the simulation of the control model CM and the execution of the control program CP are started, respectively (see steps S514-S515 in FIG. 16 and steps S534-S535 in FIG. 17).

After the operation in step S551, the association instruction unit 26 determines whether the notification representing the interruption address corresponding to the check start point is sent from each of the simulation unit 20 and the execution control unit 22 in step S552.

In the third embodiment, as set forth above, when the simulation gets to an established in-process monitor point in the control model CM earlier than the execution of the control program CP to an established in-process monitor point therein, the simulation is configured to wait for the arrival of the computer program CP at a corresponding established in-monitor point. In contrast, when the execution of the control program CP gets to an established in-process monitor point therein earlier than the simulation to a corresponding established in-process monitor point in the control model CM, the execution of the computer program is configured to continue without interrupting. That is, in step S552, as the control program CP, the association instruction unit 26 determines whether there is an arrival of the execution of the control program CP at an in-process monitor point, which includes a pass of the execution of the control program CP through an in-process monitor point.

When determining that the notification representing the interruption address corresponding to the check start point is not sent from each of the simulation unit 20 and the execution control unit 22 (the determination in step S552 is NO), the association instruction unit 26 shifts to step S553.

In step S553, the association instruction unit 26 determines whether the notifications representing the completions of the control model's simulation and the control program's execution are sent from the simulation unit 20 and the execution control unit 22.

When determining that the notifications representing the completions of the control model's simulation and the control program's execution are not sent from the simulation unit 20 and the execution control unit 22 (the determination in step S553 is NO), the association instruction unit 26 returns to step S552, repeating the operations in steps S552 and S553.

While the determinations in steps S552 and S553 are NO, the simulation of the control model CM and the execution of the control program CP proceed, respectively (see steps S515 to S517 in FIG. 16 and steps S535 to S537 in FIG. 17).

Then, the simulation proceeds to reach one of the check sections (in-process monitor points) in the control model CM and the execution proceeds to reach corresponding one of the check sections (in-process monitor points) in the control program CP. In response to the reach, the notification representing the detection of the in-process monitor point is sent to the association instruction unit 26 from each of the simulation unit 20 and the execution control unit 22 (see step S518 in FIG. 16 and step S538 in FIG. 17).

The association instruction unit 26 receives the notification representing the detection of the in-process monitor point and sent from each of the simulation unit 20 and the execution control unit 22 (the determination in step S552 is YES), shifting to step S554.

In step S554, the association instruction unit 26 reads out the value of each program variable corresponding to the current in-process monitor point and that of each block variable of the current in-process monitor point stored in the data files, respectively. In addition, the association instruction unit 22 reads out the initial value to be set to each program variable at the next in-process monitor point to be executed in the control program CP stored in the data file.

In step S555, the association instruction unit 26 compares the execution address identifying the location of the simulation executed at the current in-process monitor point in the control model CM with that identifying the location of the instruction executed at the corresponding current in-process monitor point in the control program CP by referring to the execution address correspondence information CI1. Subsequently, the comparing unit 27 determines whether the execution address at the current in-process monitor point in the control model CM corresponds to that at the current in-process monitor point in the control program CP based on the reference result in step S556.

When determining that the execution address at the current in-process monitor point in the control model CM corresponds to that at the current in-process monitor point in the control program CP (the determination in step S556 is YES), the association instruction unit 26 shifts to step S557.

In step S557, the association instruction unit 26 refers to the variable correspondence information CI2 to confirm the correspondent relationships between the readout block variables at the current in-process monitor point in the control model CM and the read-out program variables at the current in-process monitor point in the control program CP based on the referred result.

Subsequently, in step S558, the comparing unit 27 compares the value of each block variable held at the current in-process monitor point in the control model CM with that of each program variable held at the corresponding in-process monitor point in the control program CP. In step S558, the comparing unit 27 determines whether a difference between the value of each block variable held at the current in-process monitor point in the control model CM and that of corresponding each program variable held at the corresponding current in-process monitor point in the control program CP is kept within a predetermined tolerance. This determination operation in step S558 is substantially identical with that in each of the first embodiment or the second embodiment.

In step S558, when it is determined that the difference between the value of each block variable in the control model CM and that of corresponding each program variable in the control program CP is kept within the predetermined tolerance, the determination in step S558 is YES.

In response to the affirmative determination, the association instruction unit 22 instructs the simulation unit 20 to provide the control model CM with the readout initial value to be set to each program variable at the next in-process monitor point to the simulation unit 20 in step S559. This allows the simulation of the control model CM at the next in-process monitor point and the control program CP at the corresponding next in-process monitor point to be executed under the same check start condition.

In next step S560, the association instruction unit 22 instructs the simulation unit 20 to restart the simulation of the control model CM so that the simulation of the control model CM, which is being interrupted at the current in-process monitor point, is restarted. After the restating operation, the association instruction unit 22 returns to step S552 to continue the determination of whether the control model CM and the execution of the control program CP are arrived at corresponding in-process monitor points, respectively.

The sequence of the steps by the association instruction unit 26 and the comparing unit 27 is repeated until the simulation of the control model CM and the execution of the control program CP are entirely completed, respectively (the determination in step S553 is YES). Moreover, the sequence of the steps by the association instruction unit 26 and the comparing unit 27 is repeated until the determination in step S556 is NO or the determination in step S558 is NO.

That is, when determining that the execution address at the current in-process monitor point in the control model CM does not correspond to that at the current in-process monitor point in the control program CP (the determination in step S556 is NO), the association instruction unit 26 shifts to step S562.

In step S562, the association instruction unit 26 sends the notification of a bug between the execution addresses at the current in-process monitor points of the control model CM and the control program CP to both the simulation unit 20 and the execution control unit 22 (see step S519 in FIG. 16 and step S539 in FIG. 17). Subsequently, the displaying unit 28 visually displays information indicative of "bug in execution addresses in control model and control program".

When determining that the difference between the value of at least one block variable at the current in-process monitor point in the control model CM and that of at least one of corresponding program variable at the current in-process monitor point in the control program CP is not kept within the predetermined tolerance (the determination in step S558 is NO), the comparing unit 27 proceeds to step S563.

In step S563, the association instruction unit 26 sends the notification of a bug between the value of at least one block variable at the current in-process monitor point and that of at least one program variable at the current in-process monitor point to both the simulation unit 20 and the execution control unit 22 (see step S519 in FIG. 16 and step S539 in FIG. 17). Subsequently, the displaying unit 28 visually displays information indicative of "bug in value of variable in current in-process monitor point of control model or control program".

In addition, it is assumed that the comparing unit 27 determines that the execution address at the current in-process monitor point set in the control model CM does not correspond to the execution address at the current in-process monitor point in the control program CP (the determination in step S556 is NO). In this assumption, the displaying unit 28 visually displays that the execution addresses at the current in-process monitor points in the control model CM and the control program CP.

Moreover, it is assumed that the comparing unit 27 determines that the difference between the value of at least one block variable at the current in-process monitor point in the control model CM and that of at least one of corresponding program variable at the current in-process monitor point in the control program CP is not kept within the predetermined tolerance (the determination in step S558 is NO).

In this assumption, the displaying unit 28 may visually display that the execution addresses at the current in-process monitor points in the control model CM and the control program CP, the identifier of the at least one block variable, the value thereof, the identifier of the at least one program variable, and the value thereof in step S563. This allows the user to easily recognize the checked result of each of the control model CM and the control program CP.

The checked results obtained by the operations of the comparing unit 27 in steps S556 and S558 are stored in the storage unit 29, respectively. The checked results can be graphed for recognizing an overall trend of each of the checked results. These graphed check result make it possible to improve the efficiency of the management of the checked results, and to contribute shortening of the development of control models and/or control programs.

When the association instruction unit 26 determines that the simulation of the control model CM and the execution of the control program CP are entirely completed, the determination in step S553 is YES. As a result, information representing that "simulation of control model and execution of control program are entirely completed" is visually displayed on, for example, the display apparatus 100c of the computer system 100.

As described above, even if at least one bug occurs in the sequence of instructions in the control program CP generated based on the control model CM or in the control program CP itself, the check system 1B according to the third embodiment allows detection of the at least one bug.

The ECU 21, therefore, allows debugging of the at least one bug contained in at least one of the control model CM and the control program CP (see step S3 in FIG. 1).

The operations after the checking operations by the check system 1B according to the third embodiment are omitted because the operations are the same as those in the first embodiment (see step S4 and steps S1 and/or S2 in FIG. 1).

As described above in detail, similar to each of the first and second embodiments, the check method, the check system 1B, and the check program P3 for the control model CM and the control program CP according to the third embodiment have the following new effects with substantially keeping the first to third effect, the eighth effect, the tenth effect, and thirteenth effect to seventeenth effect.

As an eighteenth effect, the check system 1B is designed to establish the one ore more in-process monitor points in the control model CM and the control program CP to correspond to each other. In addition, the check system 1B is designed to make the in-process monitor points serve as check sections, respectively. These structures allow the flexibility of determining a check point in each of the control model CM and the control program CP to be improved. Even if the control program CP to be checked is part of a large-scaled control program installed in the ECU 21, such as the control program module CP, it is possible to simply associate the one ore more in-process monitor points established in the control model CM with those established in the control program CP. Because the in-process monitor points serve as the check sections in each of the control model CM and the control program CP, it is unnecessary to establish break points in the control program CP, making it possible to prevent a return processing, such as an initialization program in the ECU 21 from being executed.

As a nineteenth effect, the association instruction unit 26 is configured to automatically output to the data file, each time the execution of the control program CP reaches one of the in-process monitor points established therein, the value of each program variable held at the current in-process monitor point in the control program CP and the initial value to be set to each program variable at the next in-process monitor point. Similarly, the association instruction unit 26 is configured to automatically output, to the data file, each time the simulation reaches a corresponding in-process monitor point in the control model CM, the value of each block variable held at the corresponding in-process monitor point in the control model CM.

These automatic output operations make it possible to simply check whether the control model CM and the control program CP contain bugs without interrupting the execution of the control program CP. In addition, these automatic output operations also allow the check start condition of the control model CM and that of the control program CP to be uniformed every in-process monitor points. The changing operations of the values in the block variables and those of the corresponding program variables and the comparing operations therebetween can be automatically executed, making it possible to simply check whether the control model CM and the control program CP contain bugs.

Incidentally, in each of the first to third embodiments, as shown in FIG. 2B, the executed result of the control program CP installed in the ECU 21 is fed back to the signal generating unit 23. That is, the control program CP and the simulation of the control model CM are executed in accordance with the pre-programmed check scenario of the signal generating unit 23 and based on the artifice sensor signals updated to reflect the executed result of the control program CP fed back to the signal generating unit 23. The simulated result of the control model CM and the executed result of the control program CP at each check section are sequentially compared so that compared result at each check section is outputted. The present invention, however, is not limited to the feedback operations.

That is, in the present invention, for checking the control program CP installed in the ECU 21, it is preferably necessary to associate the check sections established in the control model CM with those established in the control program CP, and to check each of the control model CM and the control program CP based on the executed result of the control program CP and the simulated result of the control model CM.

Figure 19:
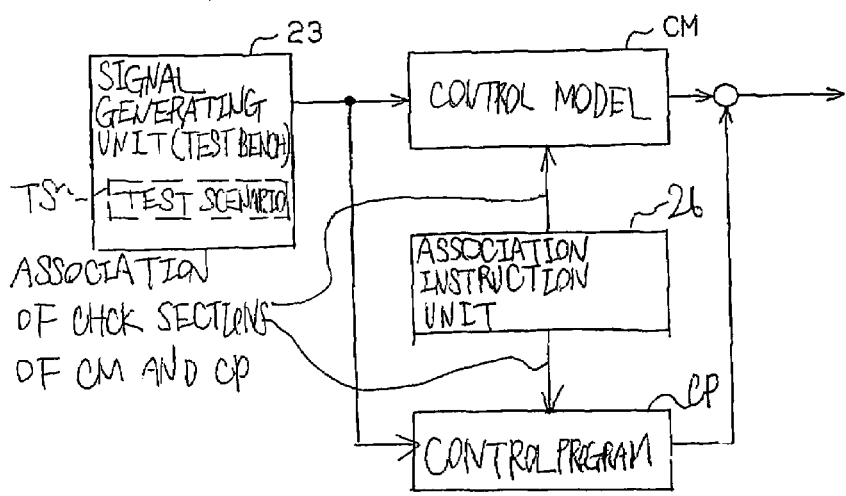
FIG. 19 is a simplified block diagram schematically illustrating an open loop check of the control model and the control program of a check system according to a modification of each of the first to third embodiments.

As shown in FIG. 19, all check conditions of check sections to be executed by the control program CP and the control model CM therefore may be previously determined and registered in a signal generating unit 23a as a test scenario TS. For example, the test scenario TS includes the sequence of the values of the artificial sensor signals, an execution address at each check section in each of the control model CM and the control program CP and values of block and program variables inputted in each check section.

In the structure shown in FIG. 19, the simulation of the control model CM and the control program CP installed in the ECU 21 are executed in open-loop in accordance with the test scenario TS. The simulated result of the control model CM and the executed result of the control program CP at each check section are sequentially compared so that compared result at each check section is outputted.

In each of the first to third embodiments, the correspondence information generating unit 17 generates the correspondence information CI based on the information generated during the automatic generation of the source code SC by the automatic code-generating unit 12; the correspondence information can be manually generated based on the source code. In addition, the control program can be hand-coded based on the control model. In this hand-coding case, the correspondence information may be generated based on the hand-coded source code. That is, whatever methods are used for generating the correspondence information, the association instruction unit 26 can associate the control program CP with the control model CM based on the generated correspondence information.

The simulation unit 20 and/or the execution unit 22 do not necessarily provide the input data (initial values and/or the artificial sensor signals) to the control model CM and/or the control program CP. That is, a target, such as an in-vehicle engine, to be controlled by the control program and an environment surrounding the target may be artificially generated on a computer so that the simulation of the control model and the control program corresponding to the target may be executed based on the artificially generated target and the environment on the computer.

The simulation unit 20 itself may have the functions of the check section instruction unit 24; the program execution control unit 22 may have the functions thereof. In addition, the control model and/or the control program may contain data representing information for identifying the check section.

In each of the first to third embodiments, the checked results obtained by the operations of the comparing unit 27 are stored in the storage unit 29 and visually displayed in the displaying unit 28. In the present invention, however, the checked results obtained by the operations of the comparing unit 27 may be only stored in the storage unit 29, or only displayed in the displaying unit 28. In addition, the output of the checked result can be omitted.

In each of the first to third embodiments, there is a case where the execution addresses at the check start points (in-process monitor points) set in the control model CM and the control program CP are different from each other. In this case, the execution addresses at the check start points (current in-process monitor points) in the control model CM and the control program CP are outputted as the checked result to be visually displayed by the displaying unit 28.

In the present invention, however, the execution addresses at the check start points (current in-process monitor points) in the control model CM and the control program CP may be stored in, for example, the external storage. In addition, the output of the execution addresses at the check start points (current in-process monitor points) in the control model CM and the control program CP may be omitted.

In each of the first to third embodiments, there is a case where the difference between the value of at least one block variable at the check start point (current in-process monitor point) in the control model CM and that of at least one of corresponding program variable at the corresponding check start point (current in-process monitor point) in the control program CP is not kept within the predetermined tolerance. In this case, the displaying unit 28 visually displays that the execution addresses at the check start points (current in-process monitor points) in the control model CM and the control program CP, the identifier of the at least one block variable, the value thereof, the identifier of the at least one program variable, and the value thereof.

In the present invention, however, the display unit 28 may visually display any one of the execution addresses at the check start points (current in-process monitor points) in the control model CM and the control program CP, the identifier of the at least one block variable, the value thereof, the identifier of the at least one program variable, and the value thereof.

In each of the first and second embodiments, when determining that the difference between the value of at least one block variable at the check start point in the control model CM and that of at least one of corresponding program variable at the corresponding check start point in the control program CP is kept within the predetermined tolerance, the operation of the association instruction unit 26 shifts to step S351 (see FIGS. 10 and 15) so that the simulation of the control model CM and the control program are restarted.

In the present invention, however, the operation of the association instruction unit 26 may shift to step S352 (see FIGS. 10 and 15) so that the check operations may continue.

Each of the first and second embodiments is configured to compare the execution address identifying the location of the simulation executed at a check start point (in-process monitor point) in the control model CM with the execution address identifying the location of the instruction executed at a corresponding check start point (in-process monitor point) in the control program CP. In addition, each of the first and second embodiments is configured to compare the value of each block variable at a check termination point (in-process monitor point) in the control model CM with that of each program variable at a corresponding check termination point (in-process monitor point).

The present invention, however, may be configured to compare the execution address related to the simulation executed at a check termination point (in-process monitor point) in the control model CM with the execution address related to the execution of the instruction at a corresponding check termination point (in-process monitor point) in the control program CP. In addition, the present invention may be configured to compare the value of each block variable at a check start point (in-process monitor point) in the control model CM with that of each program variable at a corresponding check start point (in-process monitor point).

In addition, the present invention may be configured to compare the execution address of the simulation and the value of each block variable at any one of check start and termination points with the execution address of the execution of the instruction and the value of each program variable at corresponding any one of check start and termination points. When the execution address of the control model CM and that of the control program CP are uniformed, the check of the execution address of the control model CM and that of the control program CP may be omitted.

In each of the first to third embodiments, the predetermined tolerance used for checking whether the control model CM and the control program CP contain bugs is changed depending on a data type of a value of each variable, but the tolerance can be arbitrary established. In addition, the tolerance is not necessarily established; whether a value of each block variable in the control model CM coincides with that of each program value in the control program CP may be used as a criterion of judgment with regard to check bugs in the control model CM and the control program CP.

In each of the first to third embodiments, the value of at least one block variable in the control model CM and that of corresponding at least one program variable in the control program CP are uniformed each time the simulation of the control model CM and the execution of the control program CP reach one of the check start points (in-process monitor points) based on the variable correspondence information CI2. It is not necessarily, however, to change their values each time the simulation of the control model CM and the execution of the control program CP reach one of the check start points (in-process monitor points).

That is, the values of at least one block variable in the control model CM and that of corresponding at least one program variable in the control program CP may be uniformed in response to an interrupt externally entered by, for example, the input device 100d. In addition, it is unnecessarily to make uniform the values of at least one block variable in the control model CM and that of corresponding at least one program variable in the control program CP.

Specifically, while the control program CP and the control model CM operate with no bugs, abnormal data as the values of at least one of block variables and program variables may be consciously inputted to the at least one of the control model CM and the control program CP so as to check the behaviors of the simulation of the control model CM and the execution of the control program CP. Moreover, the present invention can be applied to a check system having the same structure related to one of the first to third embodiments without the function of changing the values of the block variables and those of the program variables.

In each of the first to third embodiments, the values of the block and program variables at one of the check termination points (in-process monitor point) are outputted each time the simulation of the control model CM and the execution of the computer program CP reach the corresponding check start points (in-process monitor points) based on the variable correspondence information CI2.

It is not necessarily, however, to output the values each time the simulation of the control model CM and the execution of the control program CP reach the one of the check start points (in-process monitor points).

That is, the values of at least one block variable in the control model CM and that of corresponding at least one program variable in the control program CP may be outputted in response to an interrupt externally entered by, for example, the input device 100d. Moreover, the present invention can be applied to a check system having the same structure related to one of the first to third embodiments without the function of outputting the values of the block variables and those of the program variables.

In each of the first and second embodiments, the check start point and the check termination point are established as break points, but in the present invention, simulation of the control model CM and the execution of the control program are not necessarily interrupted at the check start point and the check termination point.

If capturing at least the execution addresses of the control model CM and the control program CP at least one of the check start point and the check termination point, the captured execution address of the control model CM can be compared with that of the control program CP without establishing the at least one of the check start point and the check termination point as break points, respectively.

Similarly, if capturing either the value of each block variable in the control model CM or the value of each program variable in the control program CP at least one of the check start point and the check termination point, the captured value of each block variable can be compared with the captured value of each program variable without establishing the at least one of the check start point and the check termination point as break points. As an example, the in-process monitor points set forth in the second or third embodiments can be applied in place of the check start and termination points, respectively.

In each of the first to third embodiments, the association instruction unit provides the simulated result of the control model CM and the executed result of the control program CP to the comparing unit 27, causing the comparing unit 27 to compare the simulated result with the executed result. In the present invention, however, the comparing function can be installed in the association instruction unit 26, thereby omitting the comparing unit 27.

For example, the association instruction unit 26 may receive the simulated result of the control model CM by the simulation unit 20 and the executed result of the control program CP by the execution control unit 22 to output them to, for example, the displaying unit 28. In another example, the simulated result of the control model CM by the simulation unit 20 may be directly outputted to, for example, the displaying unit 28, and/or the executed result of the control program CP may be directly outputted to, for example, the displaying unit 28.

As the control program CP automatically generated based on the control model CM, a computer program written in C language is used in each of the first to third embodiments, but a computer program written in another computer language can be used. In this modification, when the computer program newly defines the sequence of instructions corresponding to the operations previously defined by the control model, the present invention can be preferably applied for checking the control program.

In the first to third embodiments, it is important to note that, while the present invention has been and will continue to be described in the context of a fully functional computer system, such as the computer system 100. For example, the correspondence information generating unit 16, the association instruction unit 26, and so on provided in each of the check system 1, 1A, and 1B are implemented in, for example, the computer system 100 having at least one microcomputer 100a composed of, for example, a CPU and a main memory in which programs are installed.

In the present invention, however, the elements provided in each of the check system 1, 1A, and 1B can be implemented as dedicated hardware devices, such as custom LSI (Large-Scale Integration) circuits. In each of the first to third embodiments, as the correspondence information CI, the execution address correspondence information and the variable correspondence information are used; one of them may be used or another information corresponding to one of the execution address correspondence information and the variable correspondence information may be appropriately adopted.

Moreover, those skilled in the art will appreciate that the present invention is capable of being distributed as a program product, for example, the check program P3, in a variety of forms. It is also important to note that the present invention applies equally regardless of the particular type of signal bearing media used to actually carry out the distribution. Examples of suitable signal bearing media include recordable type media such as floppy disks and CD-ROM, and transmission type media such as digital and analog communications links.

In each of the first to third embodiments, the control model CM and the control program CP are generated for controlling an in-vehicle engine as a target, but in the present invention, various targets to be controlled can be applied.

In addition, a term of "computer" according to the present invention is defined to have at least a CPU and a main memory connected thereto so that peripherals are not necessarily included in the scope of "computer" in the present invention.

While there has been described what is at present considered to be these embodiments and modifications of the present invention, it will be understood that various modifications which are not described yet may be made therein, and it is intended to cover in the appended claims all such modifications as fall within the true spirit and scope of the invention.

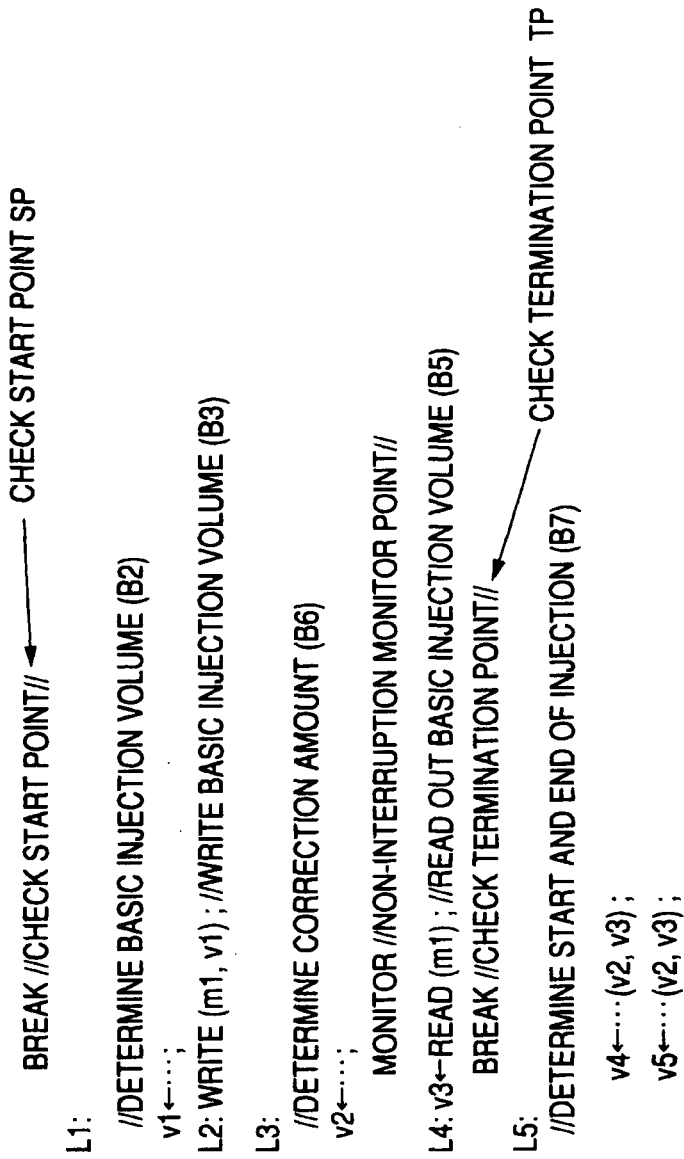

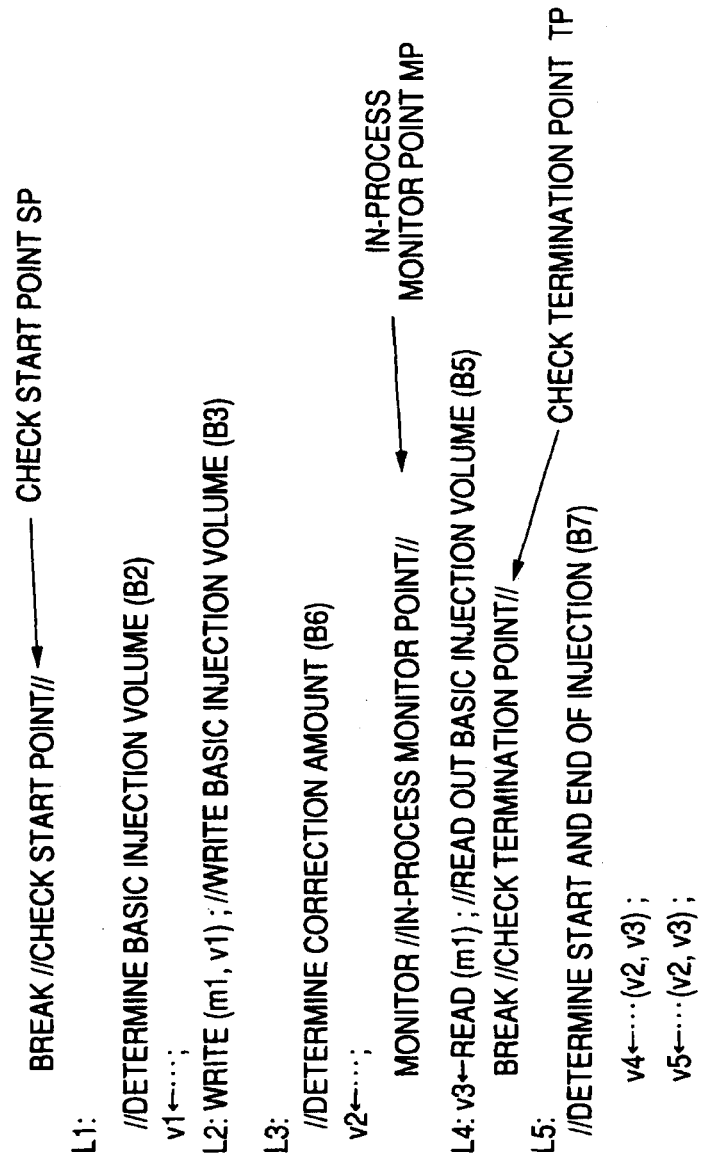

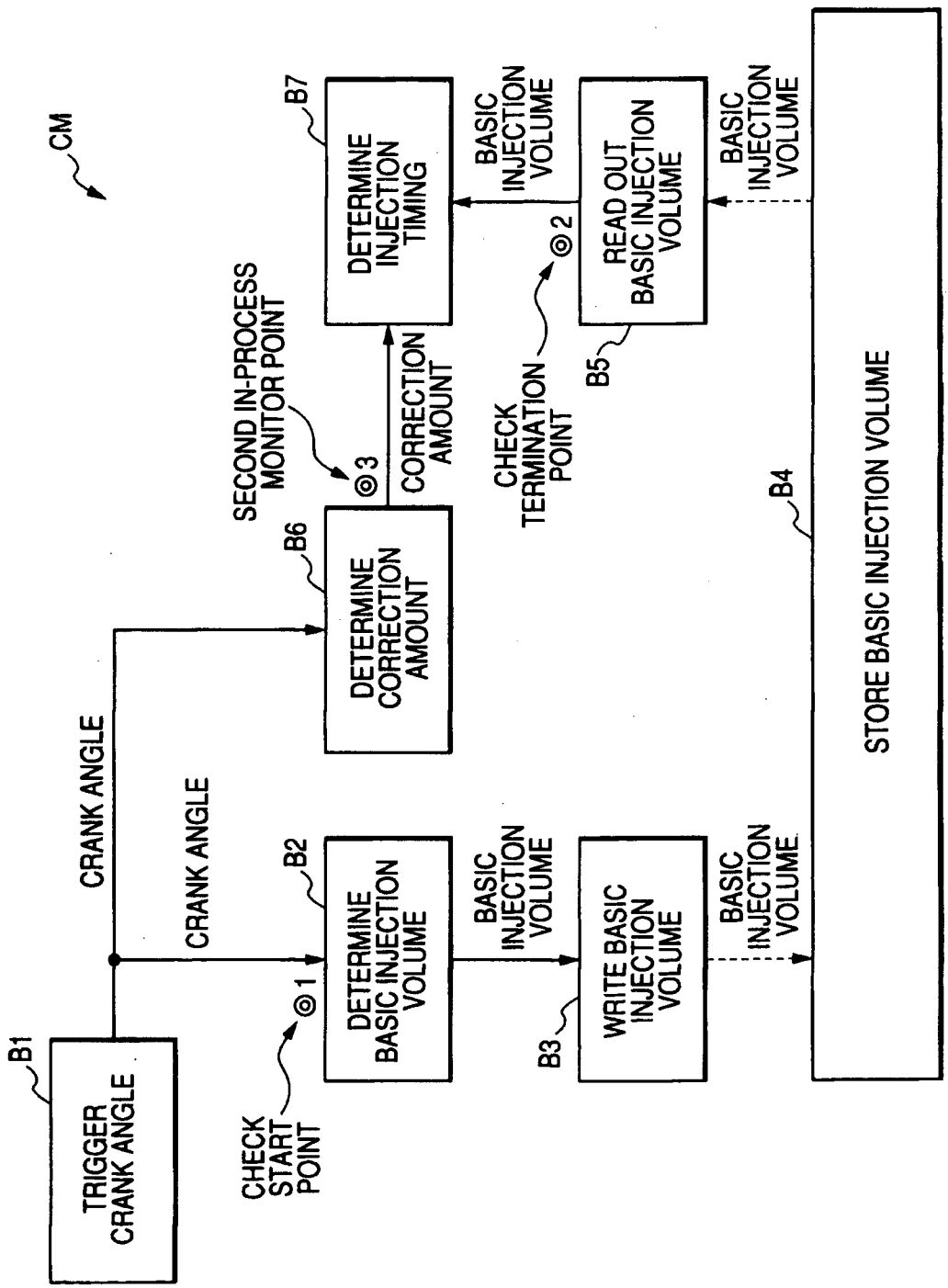

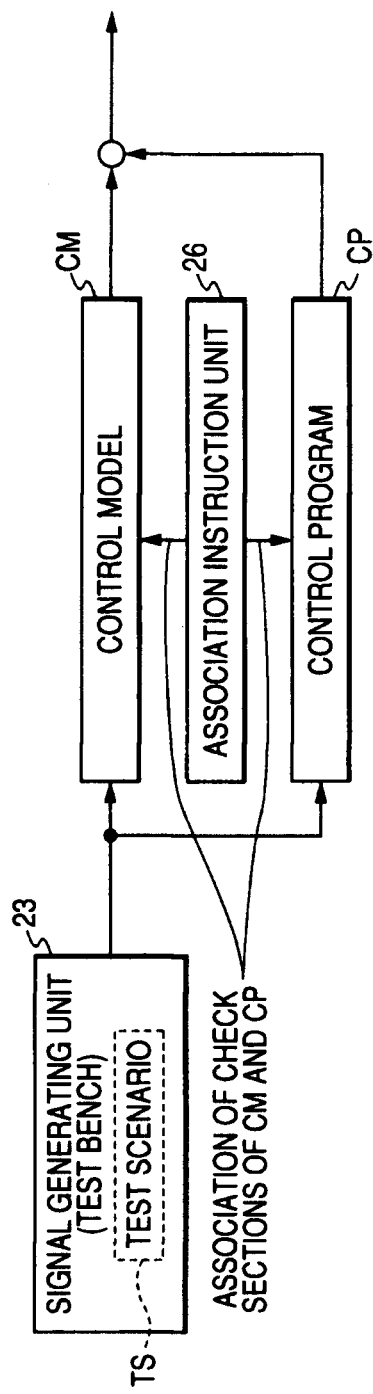

What is claimed is:

1. A check method of checking at least one of a control model in which requested specifications for controlling a target are described and a control program generated based on the control model, the method comprising:

establishing a first monitor section at a first location in the one of the control model and the control program;

automatically identifying a second location in the other of the control model and the control program to establish a second monitor section at the second location in the other thereof, the second location corresponding to the first location of the first monitor section in the one of the control model and the control program;

simulating the control model through a corresponding one of the first monitor section and the second monitor section;

executing the control program through the other of the first monitor section and the second monitor section; and monitoring a result of the simulation at the one of the first monitor section and the second monitor section therein and a result of the execution at the other of the first monitor section and the second monitor section therein to check whether at least one of the control model and the control program contains a bug based on the result of the simulation at the one of the first monitor section and the second monitor section therein and the result of the execution at the other of the first monitor section and the second monitor section therein;

wherein the automatically identifying comprises: referring to first correspondence information to automatically identify the second location based on a result of the referring, the first correspondence information being generated based on predetermined information and including a correspondence relationship between predetermined points in the control model and those in the control program, the predetermined points in the control model corresponding to the predetermined points in the control program, respectively, the predetermined information being captured during a generation of the control program based on the control model.

2. A check method according to claim 1, wherein the one of the first monitor section and the second monitor section is the first monitor section established at the first location in the control model, and the other of the first monitor section and the second monitor section is the second monitor section established at the second location in the control program.

3. A check method according to claim 2, wherein the first monitor section includes a first check start point and a first check termination point, the second monitor section includes a second check start point and a second check termination point, the simulation being executed within the first check start point to the first check termination point, the control program being executed within the second check start point and the second check termination point, further comprising:

establishing the first check start point and first check termination point at locations in the control model, respectively; and automatically identifying locations in the other of the control model and the control program to establish the second check start point and the second check termination point at the identified locations in the other thereof based on the first correspondence information, respectively, the identified locations corresponding to the locations of the first check start and termination points in the one of the control model and the control program, respectively.

4. A check method according to claim 2, wherein the first monitor section includes a first check start point, a first check termination point, and a first in-process monitor point, the second monitor section includes a second check start point, a second check termination point, and a second in-process monitor point, further comprising:

establishing the first check start point, the first check termination point, and the first in-process monitor point at locations in the control model, respectively; and automatically identifying locations in the other of the control model and the control program to establish the second check start point, the second check termination point, and the second in-process monitor point at the identified locations in the other thereof based on the first correspondence information, respectively, the identified locations corresponding to the locations of the first check start point, the first check termination point, and the first in-process monitor point in the one of the control model and the control program, respectively.

5. A check method according to claim 2, wherein the control model comprises a plurality of functional blocks operatively coupled to one another, the control program comprises a sequence of instructions, the instructions corresponding the functional blocks, respectively, each of the predetermined points in the control model are associated with each of the functional blocks therein, each of the predetermined points in the control program are associated with each of the instructions therein.

6. A check method according to claim 4, wherein each of the first check start and termination points are established as breakpoints where the simulation of the control model are interrupted, and each of the second check start and termination points are established as breakpoints where the execution of the control program are interrupted.

7. A check method according to claim 3, wherein the control model comprises a plurality of functional blocks operatively coupled to one another and block variables related to at least one of the blocks, a value of each block variable being changed during the simulation of the control model, the control program comprises a sequence of instructions and program variables used in at least one of the instructions, a value of each program variable being changed during the execution of the control program, further comprising:

changing at least one of the value of each block variable at the first check start point in the control model and that of each program variable at the second check start point in the control program.

8. A check method according to claim 3, wherein the first monitor section consists of a plurality of first monitor sections, the second monitor section consists of a plurality of second monitor sections, each of the first monitor sections includes the first check start point and the first check termination point, each of the second monitor sections includes the second check start point and the second check termination point, and the changing includes:

uniforming at least one of the value of each model variable at each of the first check start points in the control model and that of each program variable at each of the second check start points in the control program each time the simulation of the control model reaches one of the first check start points and the execution of the control program reaches one of the second check start points.

9. A check method according to claim 3, wherein the control model comprises model variables related to an operation of the control model, a value of each model variable being changed during the simulation of the control model, the control program comprises a sequence of instructions and program variables used in at least one of the instructions, each model variable being associated with each program variable, a value of each program variable being changed during the execution of the control program, further comprising:

firstly outputting the value of each model variable maintained at the first check termination point in the control model; and secondly outputting the value of each program variable maintained at the second check termination point in the control program.

10. A check method according to claim 9, wherein the first monitor section consists of a plurality of first monitor sections, the second monitor section consists of a plurality of second monitor sections, each of the first monitor sections includes the first check start point and the first check termination point, each of the second monitor sections includes the second check start point and the second check termination point, the first outputting step includes:

outputting the value of each model variable maintained at each of the first check termination points in the control model each time the simulation of the control model reaches one of the first check termination points, and the second outputting step includes:

outputting the value of each program variable maintained at each of the second check termination points in the control program each time the execution of the control program reaches one of the second check termination points.

11. A check method according to claim 2, wherein the first monitor section includes a plurality of first in-process monitor points, the second monitor section includes a plurality of second in-process monitor points, the simulation being executed through each of the first in-process monitor points, the control program being executed through each of the second in-process monitor points, the establishing step includes establishing the first in-process monitor points at locations in the control model, respectively, and the automatic identifying step includes automatically identifying locations in the other of the control model and the control program to establish the plurality of second in-process monitor points at the identified locations in the other thereof based on the first correspondence information, respectively, the identified locations corresponding to the locations of the plurality of first in-process monitor points in the one of the control model and the control program, respectively.

12. A check method according to claim 11, wherein the control model comprises model variables related to an operation of the control model, a value of each model variable being changed during the simulation of the control model, the control program comprises a sequence of instructions and program variables used in at least one of the instructions, each model variable being associated with each program variable, a value of each program variable being changed during the execution of the control program, further comprising:

firstly outputting the value of each model variable maintained at each of the first in-place monitor points in the control model; and secondly outputting the value of each program variable maintained at each of the second in-place monitor points in the control program.

13. A check method according to claim 12, wherein the first outputting step includes:

outputting the value of each model variable maintained at each of the first in-process monitor points in the control model each time the simulation of the control model reaches one of the first in-process monitor points, and the second outputting step includes:

outputting the value of each program variable maintained at each of the second in-process monitor points in the control program each time the execution of the control program reaches one of the second in-process monitor points.

14. A check method according to claim 1, wherein the monitoring includes firstly comparing the result of the simulation at the one of the first monitor section and the second monitor section therein with the result of the execution at the other of the first monitor section and the second monitor section therein to check whether at least one of the control model and the control program contains a bug based on the compared result.

15. A check method according to claim 14, wherein the control model comprises model variables related to an operation of the control model, a value of each model variable being changed during the simulation of the control model, the control program comprises a sequence of instructions and program variables used in at least one of the instructions, each model variable being associated with each program variable, a value of each program variable being changed during the execution of the control program, the result of the simulation includes the value of each model variable at the first monitor section in the control model, the result of the execution includes the value of each program variable at the second monitor section in the control program, and the first comparing includes:

referring to second correspondence information, the second correspondence information including a correspondence relationship representing that each block variable in the control model corresponds to each program variable in the control model; and secondly comparing the value of each model variable maintained at the first monitor section in the control model with that of each program variable maintained at the second monitor section in the control program based on a result of the referring to check whether at least one of the control model and the control program contains a bug based on the compared result.

16. A check method according to claim 15, wherein the second comparing includes determining whether a difference between the value of each model variable maintained at the first monitor section in the control model and that of each program variable maintained at the second monitor section in the control program based on the result of the referring is kept within a predetermined tolerance to check whether at least one of the control model and the control program contains a bug based on the determination result.

17. A check method according to claim 16, further comprising:

outputting the first monitor section and the second monitor section when at least one of the control model and the control program contains a bug based on the compared result.

18. A check method according to claim 16, further comprising:
executing at least one of:
displaying the checked result representing whether at least one of the control model and the control program contains a bug; and
storing therein the checked result representing whether at least one of the control model and the control program contains a bug.

19. A check system for checking at least one of a control model in which requested specifications for controlling a target are described and a control program generated based on the control model, the check system comprising at least one computer which implements units including:
a first establishing unit configured to establish a first monitor section at a first location in the one of the control model and the control program;
a first identifying unit configured to automatically identify a second location in the other of the control model and the control program to establish a second monitor section at the second location in the other thereof, the second location corresponding to the first location of the first monitor section in the one of the control model and the control program;
a simulating unit configured to simulate the control model through a corresponding one of the first monitor section and the second monitor section;
an executing unit configured to load the control program from a computer readable medium execute the control program through the other of the first monitor section and the second monitor section; and
a monitoring unit configured to monitor a result of the simulation at the one of the first monitor section and the second monitor section therein and a result of the execution at the other of the first monitor section and the second monitor section therein to check whether at least one of the control model and the control program contains a bug based on the result of the simulation at the one of the first monitor section and the second monitor section therein and the result of the execution at the other of the first monitor section and the second monitor section therein;
wherein the first identifying unit comprises: a referring unit configured to first correspondence information to automatically identify the second location based on a result of the referring, the first correspondence information being generated based on predetermined information and including a correspondence relationship between predetermined points in the control model and those in the control program, the redetermined points in the control model corresponding to the predetermined points in the control program, respectively, the predetermined information being captured during a generation of the control pro am based on the control model.

20. A check system according to claim 19, wherein the one of the first monitor section and the second monitor section is the first monitor section established at the first location in the control mode, and the other of the first monitor section and the second monitor section is the second monitor section established at the second location in the control program.

21. A check system according to claim 20, wherein the first monitor section includes a first check start point and a first check termination point, the second monitor section includes a second check start point and a second check termination point, the simulation being executed within the first check start point to the first check termination point, the control program being executed within the second check start point and the second check termination point, further comprising:
a second establishing unit configured to establish the first check start point and first check termination point at locations in the control model, respectively; and
a second identifying unit configured to automatically identify locations in the other of the control model and the control program to establish the second check start point and the second check termination point at the identified locations in the other thereof based on the first correspondence information, respectively, the identified locations corresponding to the locations of the first check start and termination points in the one of the control model and the control program, respectively.

22. A check system according to claim 20, wherein the first monitor section includes a first check start point, a first check termination point, and a first in-process monitor point, the second monitor section includes a second check start point, a second check termination point, and a second in-process monitor point, further comprising:
a third establishing unit configured to establish the first check start point, the first check termination point, and the first in-process monitor point at locations in the control model, respectively; and
a third identifying unit configured to automatically identify locations in the other of the control model and the control program to establish the second check start point, the second check termination point, and the second in-process monitor point at the identified locations in the other thereof based on the first correspondence information, respectively, the identified locations corresponding to the locations of the first check start point, the first check termination point, and the first in-process monitor point in the one of the control model and the control program, respectively.

23. A check system according to claim 21, wherein the control model comprises a plurality of functional blocks operatively coupled to one another, the control program comprises a sequence of instructions, the instructions corresponding the functional blocks, respectively, each of the predetermined points in the control model are associated with each of the functional blocks therein, each of the predetermined points in the control program are associated with each of the instructions therein.

24. A check system according to claim 22, wherein each of the first check start and termination points are established as breakpoints where the simulation of the control model are interrupted, and each of the second check start and termination points are established as breakpoints where the execution of the control program are interrupted.

25. A check system according to claim 21, wherein the control model comprises a plurality of functional blocks operatively coupled to one another and block variables related to at least one of the blocks, a value of each block variable being changed during the simulation of the control model, the control program comprises a sequence of instructions and program variables used in at least one of the instructions, a value of each program variable being changed during the execution of the control program, further comprising:
a first uniforming unit configured to uniform the value of each block variable at the first check start point in the control model with that of each program variable at the second check start point in the control program.

26. A check system according to claim 21, wherein the control model comprises model variables related to an operation of the control model, a value of each model variable being changed during the simulation of the control model, the control program comprises a sequence of instructions and program variables used in at least one of the instructions, each model variable being associated with each program variable, a value of each program variable being changed during the execution of the control program, further comprising:
  a second uniforming unit configured to uniform the value of each model variable at the first check start point in the control model with that of each program variable at the second check start point in the control program.

27. A check system according to claim 21, wherein the control model comprises model variables related to an operation of the control model, a value of each model variable being changed during the simulation of the control model, the control program comprises a sequence of instructions and program variables used in at least one of the instructions, each model variable being associated with each program variable, a value of each program variable being changed during the execution of the control program, further comprising:
  a first outputting unit configured to output the value of each model variable maintained at the first check termination point in the control model; and
  a second outputting unit configured to output the value of each program variable maintained at the second check termination point in the control program.

28. A check system according to claim 27, wherein the first monitor section consists of a plurality of first monitor sections, the second monitor section consists of a plurality of second monitor sections, each of the first monitor sections includes the first check start point and the first check termination point, each of the second monitor sections includes the second check start point and the second check termination point, the first outputting unit comprises:
  a unit configured to output the value of each model variable maintained at each of the first check termination points in the control model each time the simulation of the control model reaches one of the first check termination points,
  and the second outputting unit comprises:
  a unit configured to output the value of each program variable maintained at each of the second check termination points in the control program each time the execution of the control program reaches one of the second check termination points.

29. A check system according to claim 20, wherein the first monitor section includes a plurality of first in-process monitor points, the second monitor section includes a plurality of second in-process monitor points, the simulation being executed through each of the first in-process monitor points, the control program being executed through each of the second in-process monitor points, the first establishing unit comprises a unit configured to establish the first in-process monitor points at locations in the control model, respectively, and the second identifying unit comprises a unit configured to automatically identify locations in the other of the control model and the control program to establish the plurality of second in-process monitor points at the identified locations in the other thereof based on the first correspondence information, respectively, the identified locations corresponding to the locations of the plurality of first in-process monitor points in the one of the control model and the control program, respectively.

30. A check system according to claim 29, wherein the control model comprises model variables related to an operation of the control model, a value of each model variable being changed during the simulation of the control model, the control program comprises a sequence of instructions and program variables used in at least one of the instructions, each model variable being associated with each program variable, a value of each program variable being changed during the execution of the control program, further comprising:
  a first outputting unit configured to output the value of each model variable maintained at each of the first in-place monitor points in the control model; and
  a second outputting unit configured to output the value of each program variable maintained at each of the second in-place monitor points in the control program.

31. A check system according to claim 30, wherein the first outputting unit comprises:
  a unit configured to output the value of each model variable maintained at each of the first in-process monitor points in the control model each time the simulation of the control model reaches one of the first in-process monitor points,
  and the second outputting unit comprises:
  a unit configured to output the value of each program variable maintained at each of the second in-process monitor points in the control program each time the execution of the control program reaches one of the second in-process monitor points.

32. A check system according to claim 19, wherein the monitoring unit comprises:
  a first comparing unit configured to compare the result of the simulation at one of the first monitor section and the second monitor section therein with the result execution at the other of the first monitor section and the second monitor section therein to check whether at least one of the control model and the control program contains a bug based on the compared result.

33. A check system according to claim 32, wherein the control model comprises model variables related to an operation of the control model, a value of each model variable being changed during the simulation of the control model, the control program comprises a sequence of instructions and program variables used in at least one of the instructions, each model variable being associated with each program variable, a value of each program variable being changed during the execution of the control program, the result of the simulation includes the value of each model variable at the first monitor section in the control model, the result of the execution includes the value of each program variable at the second monitor section in the control program, and the first comparing unit comprises:
  a referring unit configured to refer to second correspondence information, the second correspondence information including a correspondence relationship representing that each block variable in the control model corresponds to each program variable in the control model; and
  a second comparing unit configured to compare the value of each model variable maintained at the first monitor section in the control model with that of each program variable maintained at the second monitor section in the control program based on the referred result to check whether at least one of the control model and the control program contains a bug based on the compared result.

34. A check system according to claim 33, wherein the second comparing unit comprises:
  a determining unit configured to determine whether a difference between the value of each model variable maintained at the first monitor section in the control model and that of each program variable maintained at the second monitor section in the control program based on the referred result is kept within a predetermined tolerance to check whether at least one of the control model and the control program contains a bug based on the determination result.

35. A check system according to claim 34, further comprising:
an outputting unit configured to output the first monitor section and the second monitor section when at least one of the control model and the control program contains a bug based on the compared result.

36. A check system according to claim 34, further comprising:
an executing unit configured to execute at least one of:
displaying the checked result representing whether at least one of the control model and the control program contains a bug; and
storing therein the checked result representing whether at least one of the control model and the control program contains a bug.

37. A computer readable storage medium readable by a computer, tangibly embodying a computer program executable by the computer to perform a method of checking at least one of a control model in which requested specifications for controlling a target are described and a control program generated based on the control model, the method comprising:
establishing a first monitor section at a first location in the one of the control model and the control program;
automatically identifying a second location in the other of the control model and the control program to establish a second monitor section at the second location in the other thereof the second location corresponding to the first location of the first monitor section in the one of the control model and the control program;
simulating the control model through a corresponding one of the first monitor section and the second monitor section;
executing the control program through the other of the first monitor section and the second monitor section; and
monitoring a result of the simulation at the one of the first monitor section and the second monitor section therein and a result of the execution at the other of the first monitor section and the second monitor section therein to check whether at least one of the control model and the control program contains a bug based on the result of the simulation at the one of the first monitor section and the second monitor section therein and the result of the execution at the other of the first monitor section and the second monitor section therein;
wherein the automatically identifying comprises: referring to first correspondence information to automatically identify the second location based on a result of the referring, the first correspondence information being generated based on predetermined information and including a correspondence relationship between predetermined points in the control model and those in the control program, the predetermined points in the control model corresponding to the predetermined points in the control program, respectively, the predetermined information being captured during a generation of the control program based on the control model.

38. A program product according to claim 37, wherein the one of the first monitor section and the second monitor section is the first monitor section established at the first location in the control model, and the other of the first monitor section and the second monitor section is the second monitor section established at the second location in the control program.

39. A computer readable storage medium according to claim 38, wherein the first monitor section includes a first check start point and a first check termination point, the second monitor section includes a second check start point and a second check termination point, the simulation being executed within the first check start point to the first check termination point, the control program being executed within the second check start point and the second check termination point, the method further comprising:
establishing the first check start point and first check termination point at locations in the control model, respectively; and
automatically identifying locations in the other of the control model and the control program to establish the second check start point and the second check termination point at the identified locations in the other thereof based on the first correspondence information, respectively, the identified locations corresponding to the locations of the first check start and termination points in the one of the control model and the control program, respectively.

40. A computer readable storage medium according to claim 39, wherein said monitoring comprises detecting when the simulation of the control model reaches each of the first check start and termination points and detecting when the execution of the control program reaches each of the second check start and termination points.

41. A computer readable storage medium according to claim 37, the said monitoring further comprises:
comparing the result of the simulation control model at the one of the first monitor section and the second monitor section therein with the result of the execution at the other of the first monitor section and the second monitor section therein to check whether at least one of the control model and the control program contains a bug based on the compared result.

42. A computer readable storage medium according to claim 41, wherein the control model comprises model variables related to an operation of the control model, a value of each model variable being changed during the simulation of the control model, the control program comprises a sequence of instructions and program variables used in at least one of the instructions, each model variable being associated with each program variable, a value of each program variable being changed during the execution of the control program, the result of the simulation includes the value of each model variable at the first monitor section in the control model, the result of the execution includes the value of each program variable at the second monitor section in the control program, and said comparing comprises:
referring to second correspondence information, the second correspondence information including a correspondence relationship representing that each block variable in the control model corresponds to each program variable in the control model; and
comparing the value of each model variable maintained at the first monitor section in the control model with that of each program variable maintained at the second monitor section in the control program based on the referred result to check whether at least one of the control model and the control program contains a bug based on the compared result.

43. A computer readable storage according to claim 42, wherein said comparing the value of each model variable maintained at the first monitor section in the control model with that of each program variable maintained at the second monitor section in the control program comprises:

determining whether a difference between the value of each model variable maintained at the first monitor section in the control model and that of each program variable maintained at the second monitor section in the control program based on the referred result is kept within a predetermined tolerance to check whether at least one of the control model and the control program contains a bug based on the determination result.

44. A computer readable storage medium readable by a computer, tangibly embodying a computer program executable by a computer to perform a method of checking at least one of a control model in which requested specifications for controlling a target are described by a language used for the requested specifications and a control program generated based on the control model and installed in an electronic control unit, the method comprising:

establishing a first monitor section at a first location in the one of the control model and the control program;

automatically identifying a second location in the other of the control model and the control program to establish a second monitor section at the second location in the other thereof, the second location corresponding to the first location of the first monitor section in the one of the control model and the control program, simulating the control model through a corresponding one of the first monitor section and the second monitor section;

executing the control program through the other of the first monitor section and the second monitor section; and monitoring a result of the simulation at the one of the first monitor section and the second monitor section therein and a result of the execution at the other of the first monitor section and the second monitor section therein to check whether at least one of the control model and the control program contains a bug based on the result of the simulation at the one of the first monitor section and the second monitor section therein and the result of the execution at the other of the first monitor section and the second monitor section therein, wherein the automatically identifying comprises:

referring to first correspondence information to automatically identify the second location based on a result of the referring, the first correspondence information being generated based on predetermined information and including a correspondence relationship between predetermined points in the control model and those in the control program, the predetermined points in the control model corresponding to the predetermined points in the control program, respectively, the predetermined information being captured during a generation of the control program based on the control model.

* * * * *

UNITED STATES PATENT AND TRADEMARK OFFICE
CERTIFICATE OF CORRECTION

PATENT NO.        : 7,681,183 B2
APPLICATION NO.   : 11/015676
DATED             : March 16, 2010
INVENTOR(S)       : Hirotaka Yamamoto It is certified that error appears in the above-identified patent and that said Letters Patent is hereby corrected as shown below:

Please replace title page with the attached title page.

Drawings

Delete Drawing Sheets 1-22 and replace the drawings in the above-noted patent with the attached set of more-formal drawings.

Signed and Sealed this

Eighth Day of June, 2010

David J. Kappos
*Director of the United States Patent and Trademark Office*

(12) United States Patent
Yamamoto

(10) Patent No.: US 7,681,183 B2
(45) Date of Patent: Mar. 16, 2010

(54) METHOD, SYSTEM, AND PROGRAM PRODUCT FOR CHECKING CONTROL MODEL AND/OR CONTROL PROGRAM

(75) Inventor: Hirotaka Yamamoto, Okazaki (JP)

(73) Assignee: DENSO Corporation, Kariya (JP)

(*) Notice: Subject to any disclaimer, the term of this patent is extended or adjusted under 35 U.S.C. 154(b) by 1485 days.

(21) Appl. No.: 11/015,676

(22) Filed: Dec. 20, 2004

(65) Prior Publication Data

US 2005/0138605 A1 Jun. 23, 2005

(30) Foreign Application Priority Data

Dec. 19, 2003 (JP) .......................... 2003-423584
Oct. 15, 2004 (JP) .......................... 2004-302268

(51) Int. Cl.
G06F 9/44 (2006.01)

(52) U.S. Cl. ................ 717/135; 717/106; 717/134

(58) Field of Classification Search ................ 717/124, 717/129, 134–135
See application file for complete search history.

(56) References Cited

U.S. PATENT DOCUMENTS 6,571,204 B1 * 5/2003 Meyer .......................... 703/22
6,587,995 B1 * 7/2003 Duboc et al. ................. 716/4
6,610,968 B1 * 8/2003 Shajii et al. .................. 219/497
6,708,329 B1 * 3/2004 Whitehill et al. ............. 717/136
6,859,892 B2 * 2/2005 Bolding et al. ................ 714/34
6,996,811 B2 * 2/2006 Nishioka et al. ............. 717/135
7,490,596 B2 * 2/2009 Yasui et al. .................. 123/697
2002/0087343 A1 * 7/2002 Reid ............................. 705/1
2004/0148151 A1 * 7/2004 Menter et al. ................ 703/22

FOREIGN PATENT DOCUMENTS

EP 1111483 A1 6/2001
JP 2000-20291 1/2000
JP 2003-15910 1/2003

* cited by examiner

Primary Examiner—Wei Y Zhen
Assistant Examiner—Phillip H Nguyen
(74) Attorney, Agent, or Firm—Nixon & Vanderhye P.C.

(57) ABSTRACT

A check system aims at checking at least one of a control model in which requested specifications for controlling a target are described and a control program generated based on the control model. The system has a first establishing unit configured to establish a first monitor section at a first location in the one of the control model and the control program. The system has a first identifying unit configured to automatically identify a second location in the other of the control model and the control program to establish a second monitor section at the second location in the other thereof. The second location corresponds to the first location of the first monitor section in the one of the control model and the control program.

44 Claims, 22 Drawing Sheets

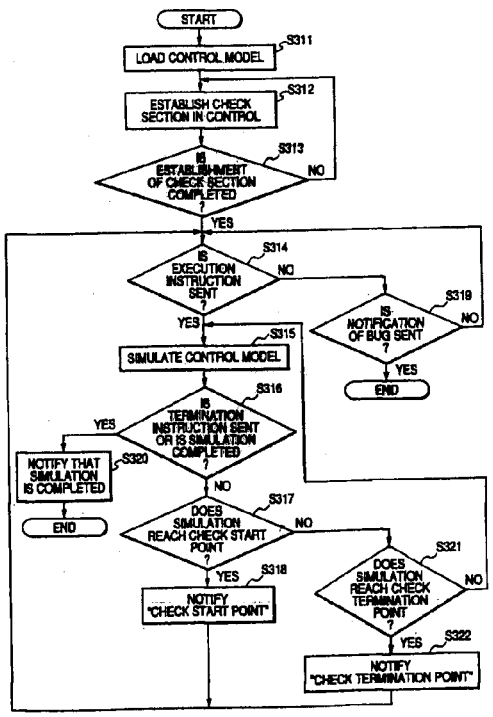

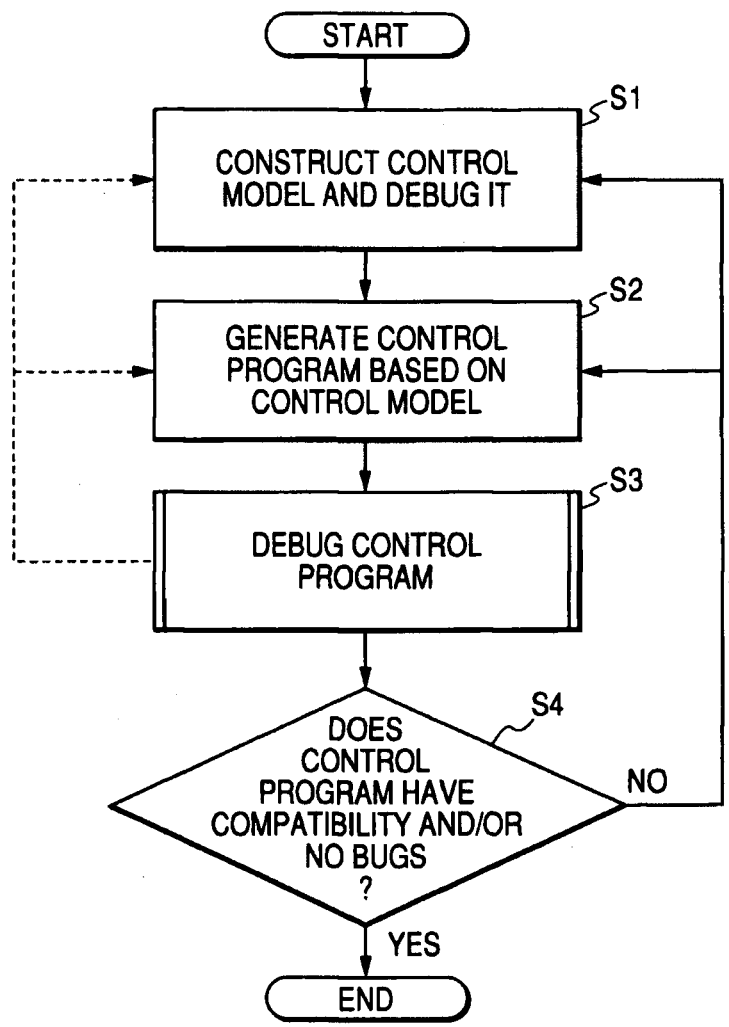

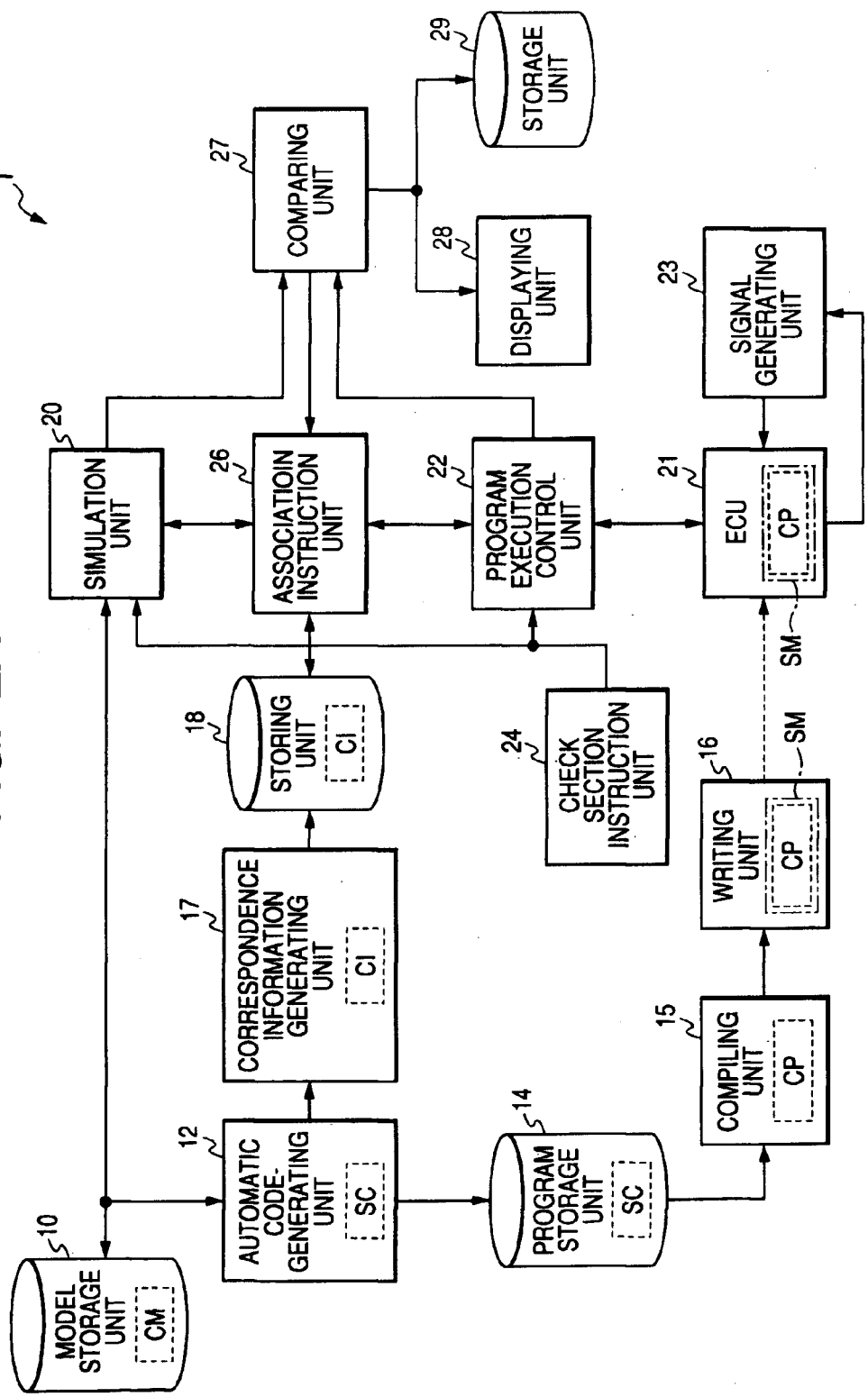

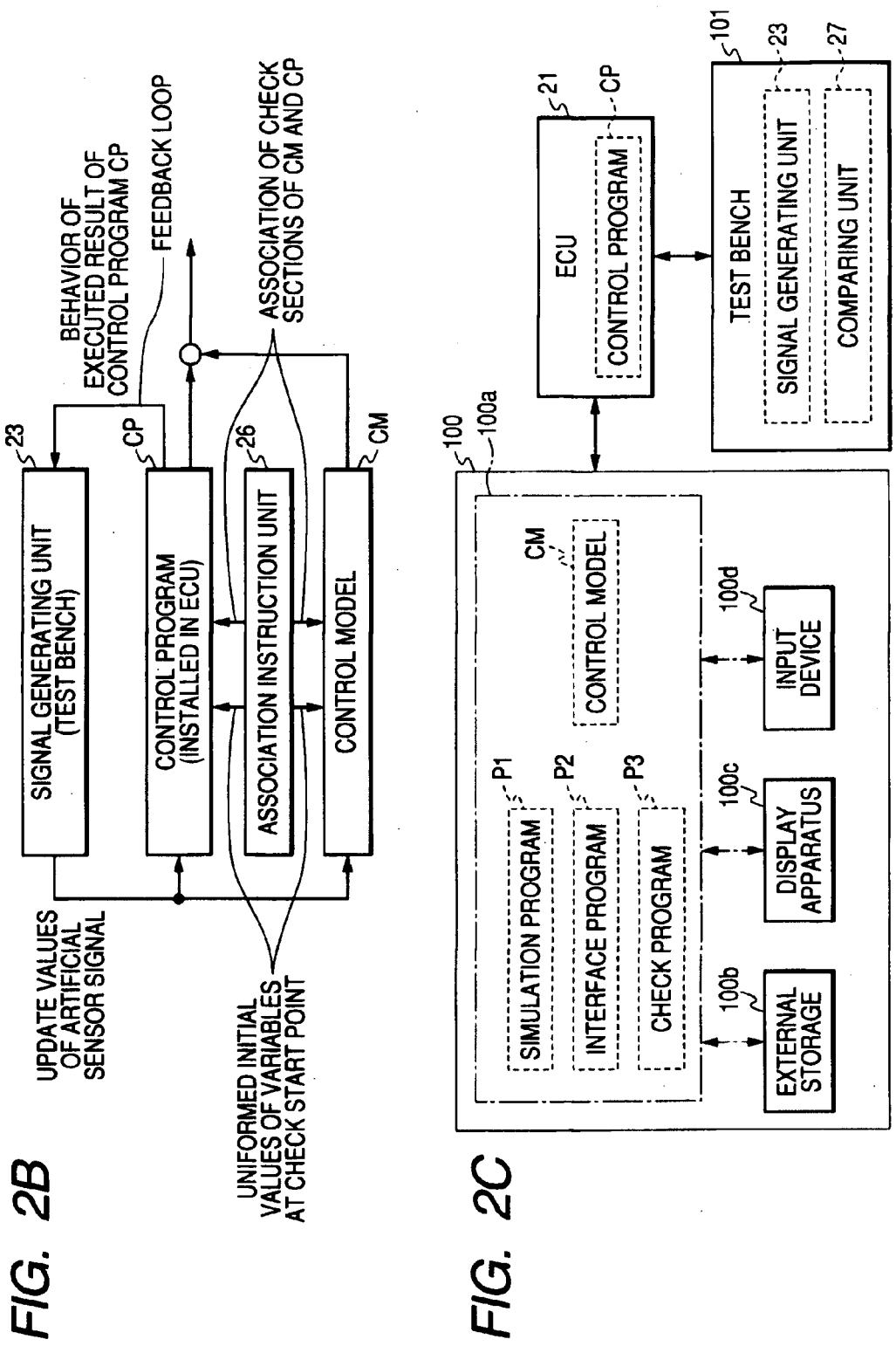

FIG. 4

L1:
  //DETERMINE BASIC INJECTION VOLUME (B2)
  v1←···;
L2: WRITE (m1, v1) ; //WRITE BASIC INJECTION VOLUME (B3)

L3:
  //DETERMINE CORRECTION AMOUNT (B6)
  v2←···;
L4: v3←READ (m1) ; //READ OUT BASIC INJECTION VOLUME (B5)
L5:
  //DETERMINE START AND END OF INJECTION (B7)
      v4←···(v2, v3) ;
      v5←···(v2, v3) ;

FIG. 5

| EXECUTION ADDRESS CORRESPONDENCE INFORMATION C11 | | VARIABLE CORRESPONDENCE INFORMATION C12 | |
|---|---|---|---|
| BLOCK | LABEL | BLOCK VARIABLE | PROGRAM VARIABLE |
| DETERMINATION OF BASIC INJECTION VOLUME (B2) | L1 | BASIC INJECTION VOLUME | v1 |
| WRITING OF BASIC INJECTION VOLUME (B3) | L2 | BASIC INJECTION VOLUME | v1 |
| | | STORED VALUE OF BASIC INJECTION VOLUME | m1 |
| DETERMINATION OF CORRECTION AMOUNT (B6) | L3 | CORRECTION AMOUNT | v2 |
| READOUT OF BASIC INJECTION VOLUME (B5) | L4 | BASIC INJECTION VOLUME | v3 |
| | | STORED VALUE OF BASIC INJECTION VOLUME | m1 |
| DETERMINATION OF START AND END OF INJECTION (B7) | L5 | CORRECTION AMOUNT | v2 |
| | | BASIC INJECTION VOLUME | v3 |
| | | START OF INJECTION | v4 |
| | | END OF INJECTION | v5 |